US006965492B2

(12) United States Patent
Obata et al.

(10) Patent No.: US 6,965,492 B2
(45) Date of Patent: Nov. 15, 2005

(54) ROTOR ASSEMBLY, INFORMATION-RECORDING/-REPRODUCING DEVICE USING THE ROTOR ASSEMBLY AND METHOD OF ASSEMBLING THE ROTOR ASSEMBLY

(75) Inventors: Shigeo Obata, Hyogo (JP); Kaoru Matsuoka, Osaka (JP); Koichi Shinohara, Ibaragi (JP); Yoshihiro Ueno, Osaka (JP); Tatsuhiko Inagaki, Osaka (JP); Hideki Kuwajima, Kyoto (JP); Hiromi Kita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 281 days.

(21) Appl. No.: 10/107,830

(22) Filed: Mar. 26, 2002

(65) Prior Publication Data

US 2002/0181151 A1 Dec. 5, 2002

(30) Foreign Application Priority Data

| | | |
|---|---|---|
| Mar. 29, 2001 | (JP) | 2001-095733 |
| Apr. 17, 2001 | (JP) | 2001-117853 |
| May 29, 2001 | (JP) | 2001-160291 |
| Jun. 13, 2001 | (JP) | 2001-178089 |
| Jun. 13, 2001 | (JP) | 2001-178090 |

(51) Int. Cl.[7] .......... G11B 17/02
(52) U.S. Cl. .......... 360/99.08
(58) Field of Search .......... 360/99.08, 99.12

(56) References Cited

U.S. PATENT DOCUMENTS 5,490,022 A * 2/1996 Hoshina et al. .......... 360/98.08
6,081,990 A * 7/2000 Kuroba et al. .......... 29/603.01

FOREIGN PATENT DOCUMENTS

| | | | |
|---|---|---|---|
| DE | 43 26 296 | | 2/1994 |
| EP | 0 732 694 | | 9/1996 |
| JP | (3-83238) | * | 4/1991 |
| JP | (3-88148) | * | 4/1991 |
| JP | (6-274936) | * | 9/1994 |
| JP | (7-65526) | * | 3/1995 |
| JP | 7-312066 | | 11/1995 |
| JP | 8-255320 | | 10/1996 |
| JP | 2734984 | | 1/1998 |

OTHER PUBLICATIONS

Partial European Search Report corresponding to application No. EP 02 6402 dated Oct. 24, 2003.

* cited by examiner

*Primary Examiner*—Allen Cao
(74) *Attorney, Agent, or Firm*—RatnerPrestia

(57) ABSTRACT

An information-recording/-reproducing device comprises a rotor assembly formed of a disc portion having information recording layer provided on the main surface and an axle portion, the disc portion being connected at the center of a surface opposite to the main surface with the rotating axle so that the rotating axis crosses at right angle with the main surface of disc portion at the center of rotation, a bearing for supporting the axle of disc portion freely rotatable, a rotating magnet fixed to a rotor yoke, a stator disposed opposing to the rotating magnet, and a motor for rotating the disc portion with the rotating axis of the axle as the center of rotation. Preferably, the disc portion with the rotating axle portion having a round column shape or a cylindrical shape, further may have a shallow hollow in the central part of the main surface which being a surface opposite to the surface having the rotating axle.

36 Claims, 32 Drawing Sheets

ROTOR ASSEMBLY, INFORMATION-RECORDING/-REPRODUCING DEVICE USING THE ROTOR ASSEMBLY AND METHOD OF ASSEMBLING THE ROTOR ASSEMBLY

FIELD OF THE INVENTION

The present invention relates to an information-recording/-reproducing device using a magnetic disc, an optical disc or the like information recording medium; more specifically, a rotor assembly for high density recording and reproducing of stored information, and an information-recording/-reproducing device incorporating the rotor assembly. A method of assembling the rotor assembly is also included in the present invention.

BACKGROUND OF THE INVENTION

The technology development is proceeding very fast in the field of information-recording/-reproducing device using a magnetic disc or the like information recording medium (hereinafter which device is referred to also as disc device). As a result, the disc devices are finding many new application fields, besides the conventional computer-related uses, and various portable electronic appliances, such as the cellular phones, PDAs (Personal Digital Assistances), digital cameras, for example, are familiar in our day to day life, and are getting an increasing popularity. Such equipment is in need of a disc device that has a larger storage capacity and a high-speed access capability.

In a conventional disc device, there are a spindle motor for driving and a disc-shape information-recording medium such as a magnetic disc or an optical disc (hereinafter simply referred to as recording medium) fixed on a turntable of the spindle motor. The disc is put into rotation at a certain predetermined rotating speed, and head records and reproduces information on or from the recording medium magnetically or optically. FIG. 32 shows the structure in substantial portion of a hard disc drive, or a disc device using a magnetic disc for the recording medium.

FIG. 32(*a*) is a plan view, FIG. 32(*b*) is a cross sectional view of the P O P' part of a disc device 801. A spindle motor for rotating a recording medium 802 and an actuator 817 for actuating a magnetic head are mounted and fixed in a case 818. It is hermetically sealed by a cover 819 to avoid dusts from the outside and prevent occurrence of turbulence of the air within the case. A magnetic head arm 816 is supported at one end by a bearing to be freely rotatable, and driven by a magnetic head actuator 817 so that a magnetic head slider 815 attached to the magnetic head arm 816 moves to a certain specific track of a recording medium 802. Recording/reproducing of information to and from the recording medium 802 is performed by a magnetic head (not shown), or an optical pickup (not shown) having an object lens for collecting light, through a known procedure.

The recording medium 802 is formed of an axle portion consisting of a rotating axle (spindle) 812 and a hub 811, and a disc-shape substrate having a recording layer of magnetic material provided on the surface thereof connected fixed together. The axle portion is supported to be freely rotatable by a hydrodynamic bearing mounted on a base 803 of the spindle motor at the center of a round hollow, which hydrodynamic bearing consisting of the rotating axle 812, a bearing sleeve 809 and a thrust support plate 810. The rotating axle 812 is coupled with the hub 811 press-fit or glued thereto. The round recording medium 802 is placed on a platform provided by a protrusion extending from the outer circumference of hub 811, and fixed to the rotating axle 812 by means of a round pressing plate 813 and a screw 814. Provided underneath the platform of hub 811, on which the recording medium 802 is disposed, are a ring-shaped rotor yoke 804 and a ring-shaped rotating magnet 805 magnetized in plurality of magnetic poles disposed along the circumference in the central portion. On the other hand, a stator 808 formed of an iron core 806 and a coil 807 is mounted fixed on the base 803 along the inner circumference of the central round hollow so that it opposes to the rotating magnet 805. These complete a spindle motor for rotating the recording medium 802 integrally formed of an axle portion and a recording portion.

Besides the above described inner rotor type motor, an outer rotor type motor may be used for the driving motor; where, a ring-shaped rotor yoke and a ring-shaped rotating magnet magnetized in plurality of magnetic poles are disposed along the outer circumference of a recording medium while a stator formed of iron core and coil is fixed to an axle support member provided in the central part of base. The driving means can be provided in many more variations; a structure where a stator rotates may be considered. As to the bearing of axle, a ball bearing, a metal bearing, etc. can be used instead besides the hydrodynamic bearing. As described in the foregoing, many of the spindle motors of the disc device are trying to make themselves thinner or slimmer by providing a hub in the vicinity of a rotating axle (spindle) for fixing the substrate of recording medium, and providing the rotor magnet thereon, and a stator at the periphery of the hub.

Among the information-recording/-reproducing devices (also called as disc device), the disc portion, on which a disc-form recording medium is mounted, is strongly requested to be smaller in the diameter and thinner in the overall thickness so that the device can be incorporated in a portable apparatus. Operating environments of portable apparatus, however, are much harsher than those of personal computers. Therefore, it needs to be designed so that it can withstand a substantial impact to be given when, for example, it is dropped. The downsized and thinner disc portions are expected to be rigid enough to withstand the shock.

In a case when a disc device is dropped on the ground, the impact acceleration easily reach several thousand times that the normal gravity acceleration. In the disc devices, a gimbaled head assembly with some spring property supports most the heads disposed facing to the flat surface of disc recording medium. So, in the day-to-day operating environments the head can chase the disc and keeps on its operation, even if the disc surface is somewhat deviated out of the rotating plane to a different disc height. However, even if an instantaneous impact caused the rotating portion to be withdrawn from stationary supporting means for a substantial amount, the head supporting mechanism as well as the recording medium itself might be destroyed. In a case of a hard disc drive using a magnetic disc, for example, the amount of dislocation allowable for a rotating body is approximately 0.2 mm at the most. If a rotating body is withdrawn substantially, a lubricant provided in a gap between the axle and bearing sleeve spills out and the bearing becomes unable to operate. Furthermore, the sputtering lubricant may well stain the disc portion. Thus, the amount of dislocation should be suppressed to be as small as possible.

There is a ramp load mechanism, which supports the head apart from the recording medium when head actuator moved in off-duty zone. This is aimed to prevent the head from colliding with magnetic disc at a shock. Several practical means have been proposed for the ramp load mechanism; some make use of outer circumferential edge portion, others make use of inner circumference portion of a disc out of the information storage region.

It has been necessary among the conventional hard disc drives and the like disc devices, where information is recorded in and reproduced from a recording medium using a magnetic technology, to take appropriate countermeasures to suppress influence of the magnetic fields escaping from spindle motor or other magnetic members to be effected on the recording medium. Some technologies have been proposed for avoiding the influence of escaping magnetic fields generated during operation of a disc device; which include provision of a shielding member against the magnetic fields.

In the above-described structure, where the rotating axle 812 is attached to the hub 811 and the recording medium 802 is supported by a platform provided by an extrusion from the outer circumference of the hub 811, it is difficult to connect the platform of hub 811 to the rotating axle 812 so that the face of platform for placing a recording medium, or the recording surface of recording medium 802, at a precise right angle with the axis of rotating axle 812. It is also difficult to bring the centers of flange portion and recording medium 802 to be concentric to the axis of rotation.

If there is an error in the angle formed by the platform of hub 811 and the rotating axis of axle 812, or that formed by the recording surface of recording medium 802 and the rotating axis of axle 812, the recording medium 802 revolves with a tilt on the recording surface. This results in a deviation in the position of recording surface of the recording medium 802, or a deviation in the surface. If there is a dislocation in the center of platform of hub 811 or the center of recording medium 802 from the center of rotation, the rotating recording medium 802 shows a dislocation in the direction parallel to the surface, or a deviation in the rotating axis.

In practice, the deviation in the surface and the deviation in the rotating axis appear integrated together. So, a recording density of a recording medium 802 is subject to these factors, which means that there is a limit in the efforts for increasing the recording density of a recording medium.

In order to suppress the deviations in the surface and in the rotating axis with a rotating recording medium 802, the accuracy in parts machining and in parts assembly have to be raised. Improving the accuracy level with the number of components in the above-described configuration, however, the cost for such production facilities will be substantial, which means that it is not practical.

There have been proposals for improving the machining accuracy of manufacturing a disc portion on which a recording medium is fixed, for making the assembly operations more efficient, or a proposal of new form of disc portion which is suitable for increasing the number of discs to be housed. However, there have been no proposals so far regarding a shape of disc portion that can withstand a shock when it is incorporated in a portable apparatus. There have been still other problems left to be solved; when the diameter of disc portion is reduced it turns out to be difficult to keep a stable levitation of head slider, and to maintain a sufficient strength at the outer circumference.

If a high recording density is to be implemented with a hard disc drive, it is essential to suppress the amount of levitation of a head slider to be approximately 20 nm or less. In reality, however, once a disc portion is deformed by an external impact, the amount of levitation easily go above the 20 nm. Under such a case, the GMR head, among others, which makes use of the effect of gigantic magnetic resistance suffers from a significantly deteriorated signal. Furthermore, the disc portion might get broken when a very great impact is given. So far, there has been no proposal addressing the above problems.

Regarding the ramp load mechanism, there have been several proposals; thinning the outer circumference of a disc portion for providing a ramp portion, providing a round protrusion belt as the ramp portion so that one end of a magnetic head ride thereon for a rest, making the outer circumference of a disc portion thicker for providing a ramp portion thereon, and so on. These structures, however, are accompanied by following problems. Since each disc is provided with a fitting hole at he center, there is an advantage that a disc drive can house a plurality of discs. However, the relationship between the bearing portion and the disc portion for mounting a recording medium remains the same as in the conventional hard disc drive. So, a deviation in the surface and a deviation in the outer circumference of the surface bring about big deviations in the surface and the concentricity, which naturally leads to big deviations in the surface and the concentricity of a ramp portion provided outside the recording region of recording medium. If the accuracy is deteriorated with the ramp portion, it turns out to be difficult for a head to perform a predetermined action of sheltering; the head unable to make the sheltering action might remain on the surface of recording medium.

Furthermore, in the conventional configuration a shaft is press-fit in a hub, and a round circular disc is attached on the hub. Therefore, the accuracy errors in the shaft length, the hub height, the disc thickness, and the processing accuracy in chassis and case cover, as well as the errors in the height of press-fit operation, accumulate. Which makes it difficult to raise the accuracy level, blocking the efforts for a higher recording density. A technical breakthrough is needed to implement a higher recording density.

The technologies so far proposed for suppressing influence of the magnetic fields escaping form rotating magnet of spindle motor on a recording medium are aimed to improve the influence during operation of a finished device. No consideration has been given on an adverse effect on a recording medium caused by the magnetic fields escaping from the motor or other magnetic members of a disc device during assembly. Now, consideration on the above aspect has become necessary in the face of an advanced technology under which the disc devices are being made still smaller and provided with an increasing recording capability; as a result, an influence of the escaping magnetic fields on a recording medium during manufacturing stage has been unable to disregard. However, no fundamental measure has been taken against the problems.

Technical points to be considered when taking measures against the influence of escaping magnetic fields on a recording medium during manufacturing stage include the following phenomena, for example;

(1) When gluing an already-magnetized rotating magnet with a recording medium having a magnetic layer thereon using a thermosetting adhesive, the magnetic layer is magnetized, although very slightly, by an integrated influence created by the magnetic field escaping from rotating magnet and the heat applied during the processing, (2) In the finished state of a disc device, a rotating magnet is disposed opposed to the iron core of stator; so, redundant magnetic flux is converged to the core iron. It hardly escapes to the disc side. However, during the stage of rotor assembly when there is no stator core iron around, there exists a magnetic flux high enough to ill-affect a recording medium disposed in the information storage side.

(3) When a recording medium of hard disc drive is exposed to a substantial noise magnetic field while the magnetic layer is heated, noise signal is overlaid on the magnetic layer of recording medium in accordance with the noise magnetic field. If a servo signal is disturbed, the normal operation of recording/reproducing is impaired.

SUMMARY OF THE INVENTION

The present invention addresses the above problems and aims to offer a disc portion having disc-shape recording medium, or a rotor assembly, of information-recording/-reproducing device and an information-recording/-reproducing device incorporating the rotor assembly, provided with the advantages as described below. The present invention also proposes a method of assembling the rotor assembly.

(1) Deviation in the surface and deviation in the rotating axis of a rotating disc are significantly reduced, and the recording density is increased. At the same time, overall thickness of a disc device can be reduced.

(2) Even when a portable apparatus having a built-in disc device, or a hard disc drive, hit by a big physical impact, for example when the apparatus fell on the ground, deformation in the magnetic disc can be limited to a minimum. Hence, a possible damage of a head slider or on the surface of magnetic disc is prevented. Thus a high reliability is assured with a slim and lightweight hard disc drive.

(3) In a spindle motor having a hydrodynamic bearing, the disc portion, the rotating axle portion and the bearing portion are integrated into a unitized single component, which brings about a reduced parts count and an improved dimensional accuracy of the assembly. The disc portion is provided on the main surface at the central part with a protrusion for preventing withdrawal of the disc portion, or for keeping an amount of location shift of the rotor assembly small. By so doing, the deviation in the surface and the deviation in rotating axis of rotating disc portion can be significantly reduced.

(4) A ramp portion in a truncated cone shape or other sloped form is created on a unitized disc portion, either in the outer circumference or in the inner circumference, at a place outside the information recording region for providing a shelter place which is aimed to avoid a collision between the head portion and the information recording region caused by vibration, etc. Thereby, the recording density as well as the reliability can be raised. Thus a high precision structure can be implemented in a very slim contour.

(5) In the process of assembling a rotor assembly of information-recording/-reproducing device which magnetically records information on a disc shape recording medium, the recording medium can be kept free from the influence of magnetic fields escaping from a magnet of spindle motor or other magnetic components. Thereby, an overlaying of magnetic noise on the recording medium of disc portion can be avoided.

Practical descriptions on a rotor assembly, a disc device incorporating the rotor assembly and a method of assembling the rotor assembly in accordance with the present invention are given below.

A rotor assembly of the present invention comprises a disc portion, having information-recording layer on the main surface and a rotating axle portion, the disc portion being connected at the center of a surface opposite to the main surface with the rotating axle so that the rotating axis crosses at right angle with said main surface. The axle portion has a round column or a cylindrical shape, at least one of the disc portion and the axle portion is made of either one material among the group of glass, resin material and an Al alloy metal. The disc portion may be formed integrally as one piece component, or it may be formed of a disc portion and an axle portion connected together using a junction material, or it may be formed of a disc portion and an axle portion connected together by insert forming, or it may be formed of a disc portion and an axle portion connected together by means of a gluing material or thermal fusion process, or a disc portion may have a shallow hollow in the central part of the main surface which being a surface opposite to the surface having the rotating axle, or a disc portion may have a non-recording/reproducing region at the central part, or diameter of the rotating axle may be smaller than the length of the axle.

By the integration of a disc portion and an axle portion into a single body, overall thickness can be made thinner as compared to a configuration where a magnetic disc is placed on a turntable of rotor. Slim-shape disc devices are more suitable for the portable apparatus. The above structure is specifically advantageous for the magnetic disc substrates made of glass, ceramic or the like brittle material in providing thin and lightweight discs having improved anti-shock property. A clamping member can be eliminated when a disc is connected with axle of driving means using an adhesive agent, etc. Furthermore, central part of the disc portion of a rotor assembly having an axle can be utilized for the CSS (Contact Start Stop) region, and the recording region can be extended as far as the central area. In a case where a disc portion and an axle portion are manufactured separately and then glued or joined together, the disc portion and the axle portion may be provided respectively by using their most suitable materials. Practical examples; combinations of a disc portion of glass or an Al alloy metal and an axle portion of a plastic or a sintered alloy, and a disc portion and an axle portion both made of the same glass may be glued together to form a rotor assembly. Furthermore, the very shallow hollow locating in an area where a rotating axle is provided underneath can be utilized for the purpose of orientation and centering of rotating axis during assembly operation of the rotor assembly. Thus it contributes to a higher precision level.

A rotor assembly of the present invention comprises a disc portion, having an information recording layer formed on the main surface and an axle portion, the disc portion being connected at the center of a surface opposite to the main surface with the rotating axle so that the rotating axis crosses at right angle with the main surface, the disc portion having a configuration in which the disc thickness at a circumference from a certain distance from the center gradually decreasing towards the outer circumference edge, either in a stepped way or in a continuous way.

With the above configuration, a rotor assembly can be made thinner and lighter yet it can withstand a substantial impact; the disc substrate bends less and both the tensile stress and compressive stress can be suppressed, as a result it is not broken easily. When the thickness is decreased in a stepped way, the sloping surface, including a flat area for mounting a rotating magnet, can be designed so as it provides a greatest possible anti-shock property. In a slope where the thickness decreases continuously, it is easy to design an ideal slope that provides the greatest possible anti-shock property despite the minimum thickness. If the continuous slope is formed of a straight-line design or a certain curvature is provided, there will be no edged corner where stress concentrates. So, a strength is well stabilized, and dispersion of the strength suppressed.

A rotor assembly of the present invention comprises a disc portion, having information recording layer formed on the main surface and an axle portion, the disc portion being connected at the center of a surface opposite to the main surface with the rotating axle so that the rotating axis crosses at right angle with the main surface, the disc portion is further provided at the center of main surface with a protrusion.

In the above structure, a disc portion, an axle portion and a bearing portion of a spindle motor having a hydrodynamic bearing can be unitized into a single member. A plurality of components such as a shaft, a hub, a rink form disc, etc. that had been needed in a conventional structure can be integrated into a single component. The decreased parts count contributes to a reduced cost, and accumulation of dimensional allowance among the plurality of parts, processing errors and errors in the press-fit height of a shaft into a hub for fixing a rink form disc on the hub, for example, can be avoided. As a result, the gap distance δ can be reduced to 0.2 mm or smaller. Taking advantage of the improved precision level and the anti-withdrawal effect brought about by the protrusion provided in the disc portion, amount of rotor shift is made smaller, the deviation in the surface as well as the deviation in the rotating axis of the disc can be significantly reduced, as a result the recording density is increased. When the amount of rotor shift is controlled to be small, a head supporting mechanism (gimbaled head assembly) as well as a medium itself can be protected from a possible damage. Also, since the rotating axle hardly withdraws from a sleeve, leakage of the lubricant from bearing portion seldom occurs. If the protrusion is provided instead in a case, which houses the disc drive, at a location opposing to the center of main surface of the disc portion, structure of the disc portion can be simplified, which means a further cost reduction can be expected.

A rotor assembly of the present invention for use in an information-recording/-reproducing device, which device revolves a disc portion having information recording layer provided on the main surface and drives a head actuator so that a head disposed opposing to the information recording layer scans the information recording layer for recording/reproducing information, is provided on the main surface in axis symmetry with a ramp portion where the disc thickness is different from that of information recording layer. The ramp portion is aimed to provide a head during non-operating state with a shelter from the information-recording layer. An axle portion is connected integrally on a surface of disc portion opposite to the main surface so that the rotating axis crosses at right angle with the main surface of disc portion at the center of rotation. The ramp portion may be formed in either one of the following configurations; in a truncated cone shape formed on the central part of the main surface of disc portion where the disc increases its thickness continuously towards the innermost circumference, or in a inclined shape formed on the outer circumference of the main surface of disc portion where the disc increases its thickness continuously towards the outermost circumference, or in a inclined shape formed on the outer circumference of the main surface of disc portion where the disc decreases its thickness continuously towards the outermost circumference. In either of the above configurations, a collision of head portion with information storage region due to vibration, etc. can be avoided, and a possible damage or breakage in a head supporting mechanism (gimbaled head assembly, etc.) and information storage region itself can be prevented.

In a rotor assembly of the present invention, the rotating axle is provided at an end to be connected to the disc portion with a step along the circumferential edge, a yoke support plate is fixed to the step of rotating axle by engaging a round hole of yoke support plate with the step of rotating axle, the rotating axle is fixed at the other end with a round thrust flange having a diameter greater than that of the rotating axle, the thrust flange is provided with groove for dynamic pressure generating on a surface opposite to the surface having the rotating axle, the thrust flange is also provided with separate groove for dynamic pressure generating in a rink arrangement on the surface extruding from the rotating axle. The rotor assembly is provided also with a servo pattern formed on information recording layer of the disc portion, and a phase marker for alignment with the rotating axis formed either at the outer circumference and the central part of disc portion, or the markers at the outer circumference alone. The above-described structure makes it possible to suppress an adverse influence due to a strain caused by expansion/shrinkage or other elements that is arising as a result of fixing a rotor yoke to the disc portion in an area corresponding to the recording medium. This leads to an increased recording density. Furthermore, the servo pattern and the markers formed on the information recording layer contribute to improve the accuracy in alignment, which also contributes to increase the recording density.

In a rotor assembly of the present invention, the rotating axle is provided at an end to be connected to the disc portion with a step along the circumferential edge, a yoke support plate is fixed to the step of rotating axle by engaging a round hole of yoke support plate with the step of rotating axle, the rotating axle is provided at the other end face having no step with a column shape hole having a diameter smaller than that of the axle, and the column shape hole is filled and fixed with a round magnet plate having the same diameter and height as the column shape hole. The same end face of rotating axle is provided in an area between the end of the hole and the outer circumference with groove for dynamic pressure-generating in a rink arrangement. Since the round magnet plate produces a thrust attraction force at the central part of rotating axle, the deviation in the rotating surface of disc portion can be effectively suppressed.

An information-recording/-reproducing device of the present invention comprises a rotor assembly formed of a disc portion having information recording layer provided on the main surface and an axle portion, the disc portion being connected at the center of a surface opposite to the main surface with the rotating axle so that the rotating axis crosses at right angle with the main surface of disc portion at the center of rotation, a bearing for supporting the axle of disc portion freely rotatable, a rotating magnet fixed to a rotor yoke, a stator disposed opposing to the rotating magnet, and a motor for rotating the disc portion with the rotating axis of the axle as the center of rotation. The rotating axle portion having a round column shape or a cylindrical shape, at least one of the disc portion and the axle portion being made of either one material among the group of glass, resin material and an Al alloy. The disc portion may be formed integrally as one piece component, or it may be formed of a disc portion and an axle portion connected together using a junction material, or it may be formed of a disc portion and an axle portion connected together by insert forming, or it may be formed of a disc portion and an axle portion connected together by means of a gluing material or thermal fusion process.

In the above configuration, the right angle formed by the rotation axis with respect to the surface of information recording medium on the disc portion can be realized with a very high precision level. So, the deviation in the surface is substantially reduced to an increased recording density in the information-recording medium. Since the rotor assembly (also called as rotating disc) and the information recording medium share the same rotating center, there is substantially no deviation of the information recording medium in the radius direction. Since the deviation between a rotating center of servo signal transcribed in advance on the information recording surface of disc portion and a rotating center of the rotating disc portion can be suppressed to be very small, a higher recording density can be implemented also by this factor. Furthermore, since a clamping device for clamping a disc on a turntable flange of disc driving motor and the turntable, etc. which had been indispensable in a conventional device can be eliminated in the present invention, the parts count as well as the cost can be reduced. This readily leads to a slimmer device design. When employing a hydrodynamic bearing, it is preferred in view of an easier operation and a higher precision of processing that an axle is provided with herringbone grooves before it is connected with a disc by gluing or other method.

An information-recording/-reproducing device of the present invention comprises a rotor assembly formed of a disc portion having information recording layer provided on the main surface and an axle portion, the disc portion being connected at the center of a surface opposite to the main surface with the rotating axle so that the rotating axis crosses at right angle with the main surface of disc portion at the center of rotation, the disc portion having a configuration in which the disc thickness at a circumference from a certain distance from the center gradually decreasing towards the outer circumference edge, either in a stepped way or in a continuous way, a bearing for supporting the axle of disc portion freely rotatable, a rotating magnet fixed to a rotor yoke, a stator disposed opposing to the rotating magnet, and a motor for rotating the disc portion with the rotating axis of the axle as the center of rotation. A disc device of the above structure is rigid enough and highly reliable, it can not get damaged or broken easily by an impact of dropped shock, etc. More specifically, a disc device that is formed of only one head and one disc of the above configuration can be designed to have a very high anti-impact characteristic in a compact and slim body.

An information-recording/-reproducing device of the present invention comprises a rotor assembly formed of a disc portion having information recording layer provided on the main surface and an axle portion, the disc portion being connected at the center of a surface opposite to the main surface with the rotating axle so that the rotating axis crosses at right angle with the main surface of disc portion at the center of rotation, the disc portion having on the main surface at the central part a protrusion, a bearing for supporting the axle of disc portion freely rotatable, a rotating magnet fixed to a rotor yoke, a stator disposed opposing to the rotating magnet, and a motor for rotating the disc portion with the rotating axis of the axle as the center of rotation.

In the above configuration, a disc portion, an axle portion and a bearing portion of a spindle motor having a hydrodynamic bearing can be unitized into a single member. A plurality of components such as a shaft, a hub, a rink form disc, etc. that had been needed in a conventional structure can be integrated into a single component. The decreased parts count contributes to a reduced cost, and accumulation of dimensional allowance in respective parts, processing errors during assembly operation, and errors in the press-fit height of a shaft into a hub for fixing a rink form disc on the hub can be avoided. As a result, the gap distance δ can be reduced to 0.2 mm or smaller. Taking advantage of the improved precision level and the anti-withdrawal effect brought about by the protrusion provided in the disc portion, amount of rotor shift is made smaller, the deviation in the surface as well as the deviation in the rotating axis of the disc can be significantly reduced, as a result the recording density is increased. When the amount of rotor shift is controlled to be small, a head supporting mechanism (gimbaled head assembly) as well as a medium itself can be protected from a possible damage. Also, since the rotating axle hardly withdraws from a sleeve, leakage of the lubricant from bearing portion seldom occurs.

An information-recording/-reproducing device of the present invention comprises a disc portion having information recording layer on the main surface, a rotating axle, a bearing portion consisting of the rotating axle and a bearing sleeve, a motor for rotating a rotor assembly formed of the disc portion and the rotating axle, a head disposed opposing to the information recording layer, and a head actuator for driving the head to scan the information recording layer, the disc portion having in axis symmetry arrangement on the main surface a ramp portion where the disc thickness is different from that of information recording layer, the axle portion being connected integrally on a surface of disc portion opposite to the main surface so that the rotating axis crosses at right angle with the main surface of disc portion at the center of rotation. The ramp portion is to provide the head, which scans the information-recording layer for recording and reproducing information, with a shelter from the information-recording layer when a non-recording/reading state lasted for a certain specific length of time. The ramp portion may be formed in either one of the following configurations; in a truncated cone shape formed in the central part where the disc thickness increases continuously towards the innermost, or in an inclined shape formed in the outer circumference of the main surface of disc portion where the disc increases its thickness continuously towards the outermost circumference, or in an inclined shape formed on the outer circumference of the main surface of disc portion where the disc decreases its thickness continuously towards the outermost circumference. In the above-described disc devices, the head actuator having a protrusion rides at the protrusion on the slope locating at the inner, or the outer, circumference for sheltering; so as to alleviate a pressure of head on the information recording layer, or to keep the head away from the surface of information recording layer during the off-duty period.

In the above structure of the present invention, a disc portion, an axle portion and a bearing portion of a spindle motor having hydrodynamic bearing can be unitized into a single member. A plurality of parts such as a shaft, a hub, a rink form disc, etc. which had been needed in a conventional configuration can be integrated into a single component. The decreased parts count contributes to a reduced cost, and accumulation of dimensional allowance in respective parts, processing errors during assembly operation, and errors in the press-fit height of a shaft into a hub for fixing a rink form disc on the hub can be avoided. The deviation in the surface as well as the deviation in the rotating axis of the disc can be significantly reduced. The ramp portion provided at the inner circumference of information recording section in a truncated cone shape, or at the outer circumference in an inclined slope shape, contributes to prevent a collision between head portion and information recording portion caused by a vibration, and a possible damage or breakage on the head supporting mechanism or the information recording region itself can be avoided. Thus the recording density as well as the reliability are also increased.

An information-recording/-reproducing device of the present invention comprises a rotor assembly, the rotating axle of which is provided at an end to be connected to the disc portion with a step along the circumferential edge, a yoke support plate which is fixed to the step of rotating axle by engaging a round hole of yoke support plate with the step of rotating axle, the rotating axle is fixed at the other end with a round thrust flange having a diameter greater than that of the rotating axle, the thrust flange is provided with groove for dynamic pressure generating on a surface opposite to the surface having the rotating axle, the thrust flange is also provided with other grooves for dynamic pressure generating in a rink arrangement on the surface extruding from the rotating axle. This configuration of the present invention can suppress an adverse influence caused by distortion due to expansion/shrinkage arising out of the result of fixing a rotor yoke to a disc portion in an area corresponding to the recording medium. This leads to an increased recording density. Furthermore, since the dynamic pressure generating means can have a greater area in the surface opposing to the thrust plate, the deviation in the rotating disc can be suppressed quite effectively. Thus it contributes to implement a highly reliable disc device.

An information-recording/-reproducing device of the present invention comprises a rotor assembly, the rotating axle of which is provided at an end to be connected to the disc portion with a step along the circumferential edge, the rotating axle is provided at an end to be connected to the disc portion with a step along the circumferential edge, a yoke support plate is fixed to the step of rotating axle by engaging a round hole of yoke support plate with the step of rotating axle, the rotating axle is provided at the other end face having no step with a column shape hole having a diameter smaller than that of the axle, and the column shape hole is filled and fixed with a round magnet plate having the same diameter and height as the column shape hole. The same end face of rotating axle is provided in an area between the end of the hole and the outer circumference with groove for dynamic pressure generating in a rink arrangement. Since the round magnet plate produces, when a thrust plate is made of a magnetic material, a thrust attraction force at the central part of rotating axle, the deviation in the rotating surface of disc portion can be effectively suppressed, as compared with a conventional configuration where a thrust attraction plate is disposed opposing to a rotating magnet. Furthermore, since the conventional thrust attraction plate can be eliminated, the parts count is reduced and the space occupied by the thrust attraction can be cut off. Thus it contributes to implement a disc device of very slim contour.

An information-recording/-reproducing device of the present invention comprises anti-withdrawal means disposed between a lid of case for housing the disc device and the main surface of disc at the central part, or the rotating center of a rotor assembly. Under the above structure, amount of the rotor shift is suppressed, and the deviation in the rotating surface as well as the deviation in the rotating axis of a rotating disc portion can be significantly reduced to an increased recording density. Furthermore, a reduced rotor shift contributes to prevent a possible damage on the information recording layer caused by collision between the disc portion and the head assembly occurred as a result of vibration or impact from outside.

A method in the present invention for assembling a rotor assembly, which assembly is formed of at least a rotor yoke made of a soft magnetic material, a rotating magnet magnetized in plural of magnetic poles, and an information recording layer provided on the main surface, comprises at least the steps of; disposing a rotor yoke, a rotating magnet and a disc portion one after the other in a centering jig prepared for co-centering the rotating center of a rotating magnet and the rotating center of a disc portion, and unitizing the disc portion, the rotor yoke and the rotating magnet by press-fitting these together using press means provided above the disc portion.

A method in the present invention for assembling a rotor assembly, which assembly is formed of at least a rotor yoke made of a soft magnetic material, a rotating magnet magnetized in plural of magnetic poles, and an information recording layer provided on the main surface, comprises at least the steps of; disposing a rotating magnet and a disc portion having a rotor yoke one after the other in a centering jig prepared for co-centering the rotating center of a rotating magnet and the rotating center of a disc portion, and unitizing the disc portion having the rotor yoke and the rotating magnet by press-fitting these together using press means provided above the disc portion.

A method in the present invention for assembling a rotor assembly comprises a process of unitizing components by means of a centering jig made of a soft magnetic material and making use of a heat.

The jig made of soft magnetic material enables to have the magnetic fields escaping from rotating magnet concentrated to the soft magnetic material. In the process of bonding a rotating magnet to a disc portion having a recording medium formed thereon, when the disc portion is heated in order to have a thermosetting adhesive, or the like gluing material whose curing can be accelerated by heat, cured, the recording medium whose magnetism has been weakened due to the heat can easily be affected by even a low level escaping magnetic flux reaching the magnetic layer of the recording medium; it remains as noise magnetic fields. The above-described assembly process of the present invention prevents such an ill-affect to happen on the recording medium. Thus, signals recorded/reproduced out of a disc dive can be kept free from a distortion by the magnetic noise.

BRIEF DESCRIPTION OF THE DRAWINGS

FIG. 1(*b*) Plan view showing key portion of the information-recording/-reproducing device.

FIG. 8(*b*) Plan view of the rotor assembly.

FIG. 8(*c*) Cross sectional view of an information-recording/-reproducing device incorporating the above rotor assembly.

FIG. 14(*b*) Cross sectional view showing how other example of a rotor assembly in embodiment 1 is assembled.

FIG. 15(*b*) Partially expanded cross sectional view of the above.

FIG. 17(*b*) Plan view of the above.

FIG. 17(*c*) Cross sectional view of an information-recording/-reproducing device incorporating the above example.

FIG. 20(*b*) Cross sectional views showing the shape of a magnetic disc substrate in embodiment 3 and that of a state deformed by a shock, used to compare the anti-shock property.

FIG. 22(*b*) Cross sectional view showing a state after a magnetic disc of embodiment 3 is fixed in driving means.

FIG. 24(*b*) Cross sectional view used to describe the effect of other method for assembling a rotor assembly in embodiment 4.

FIG. 26(*b*) Drawing used to describe the operation of other head actuator of information-recording/-reproducing device in embodiment 5.

FIG. 30(*b*) Drawing used to describe how a rotor assembly incorporated in an information-recording/-reproducing device in embodiment 8 is assembled.

FIG. 32(*b*) Cross sectional view showing a conventional information-recording/-reproducing device.

DETAILED DESCRIPTION OF THE INVENTION

Exemplary embodiments of the information-recording/-reproducing device of the present invention are described in the following with reference to the drawings.

(Embodiment 1)

Figure 1A:
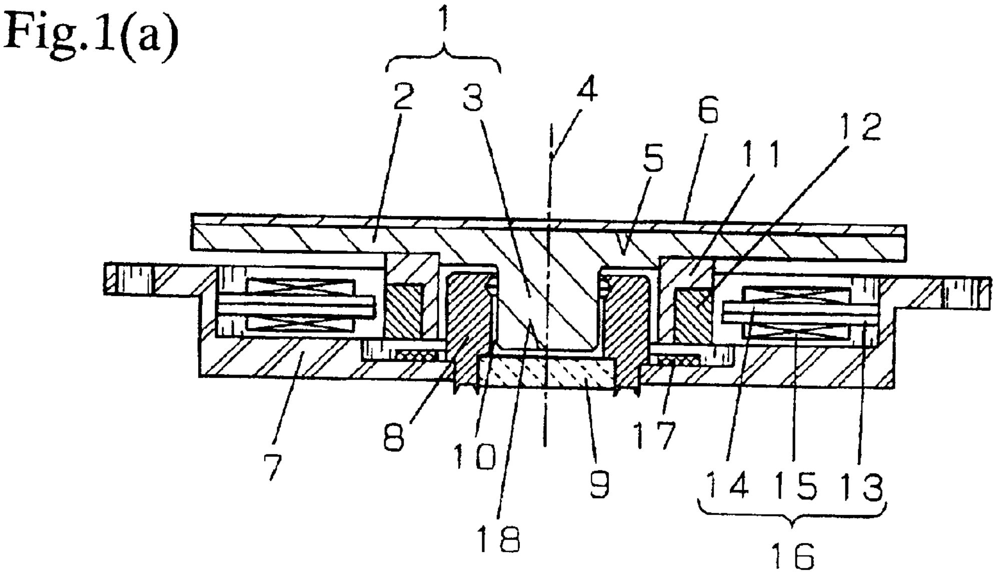
FIG. 1(*a*) Cross sectional view showing key portion of an information-recording/-reproducing device in accordance with a first exemplary embodiment of the present invention.
Figure 1B:
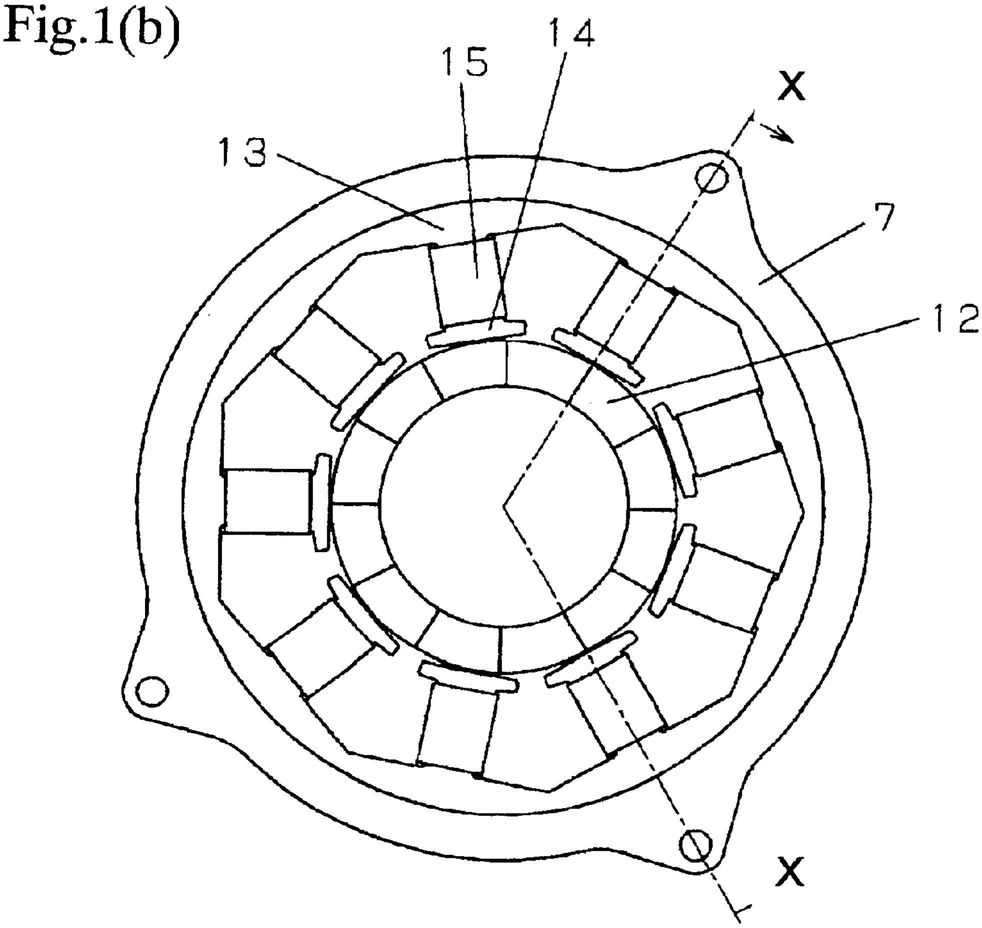

FIG. 1(*a*) and FIG. 1(*b*) show a disc device in accordance with a first exemplary embodiment of the present invention. FIG. 1(*a*) is a cross sectional view sectioned along X—X of FIG. 1(*b*); FIG. 1(*b*) is the plan view with the rotating portion excluded.

Referring to FIG. 1(*a*), a rotating disc (this constitutes the rotor of a motor, so hereinafter referred to as rotor assembly 1) is formed of a disc portion 2 and a round column portion 3. The rotor assembly 1 is integrally formed using, for example, glass, liquid crystal polymer, PPS (polyphenylene sulfide), or the like thermoplastic material, or an Al alloy metal. A thermoplastic material may be formed by means of press formation, or casting formation after melting. There is no specific restriction in selecting the glass material; generally-used soda lime glass, aluminosilicate glass, aluminoborosilicate glass, borosilicate glass, etc, may be used. It may undergo a surface reinforcement process, by a chemical measure or by an air-cooling measure. When using an Al alloy metal, it may be formed by a press process, an extrusion process, or by a grinding process, etc.

A rotor assembly 1 comprises a disc portion 2 which is connected at the center of a surface opposite to the main surface with a round column 3 so that the rotating axis coincides with the rotating axis 4 of rotor assembly 1 and crosses at right angle with the main surface 5, which surface being a surface opposite to the one having the round column 3.

On the main surface 5 of disc portion 2, a layer of information recording medium (information recording layer 6) is formed integrally. The information-recording layer 6 has a plurality of information recording tracks formed concentric. The information-recording layer 6 is formed for a certain specific thickness by depositing, or sputtering, a magnetic material or a magneto-optical material.

TABLE 1

Measured values of the rotor assembly samples.

| | Example 1 | Example 2 | Example 3 |
|---|---|---|---|
| A(mm) | 10.8 | 10.8 | 10.8 |
| B(mm) | 1.75 | 1.75 | 2.5 |
| C(mm) | 0.25 | 0.25 | 0.25 |
| L(mm) | 2.25 | 1.0 | 1.2 |
| H(mm) | 2.5 | 1.25 | 1.45 |

Table 1 shows measured values of the rotor assembly 1 samples; radius A of disc portion 2, radius B of round column 3, thickness C of disc at the central part and axle length L. Height H of rotor assembly is represented by a value of disc thickness C plus axle length L. It is understood from Table 1 that the axle diameter (2×B) is greater than the axle length L.

Figure 2:
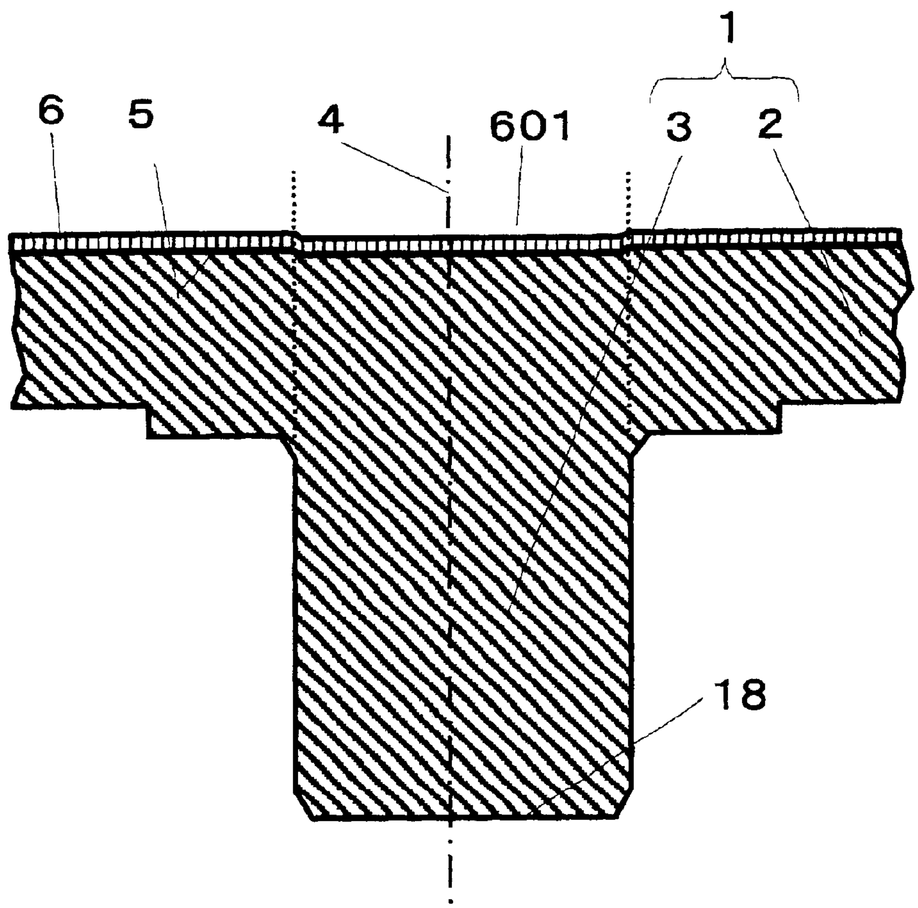
FIG. 2 Partial magnification showing a cross sectional view of a rotor assembly incorporated in an information-recording/-reproducing device in embodiment 1.

The surface of disc portion 2 having information recording layer 6 thereon appears in the macroscopic point of view to be flat, as shown in FIG. 1(*a*). However, when viewed from the microscopic point of view it is not totally flat, but the surface has a hollow 601 of some several $\mu$m deep in an area corresponding to the round column 3 provided underneath, as illustrated in FIG. 2, a magnification in the vicinity of rotating axis 4. The disc portion 2 is not symmetric in the direction of rotating axis 4; a round column 3 unitized to a disc portion 2 produces an uneven heat conduction, which leads to a shrinking deformation in an area where the round column 3 is provided underneath. The micro-scale round hollow 601 is thus formed. The main surface 5 of unitized disc portion 2 in the present invention has a very shallow round hollow 601 thus formed, in an area corresponding to the round column 3. It is preferred that the area is used for a ramp portion where a head takes shelter, rather than for information recording purpose.

Figure 3:
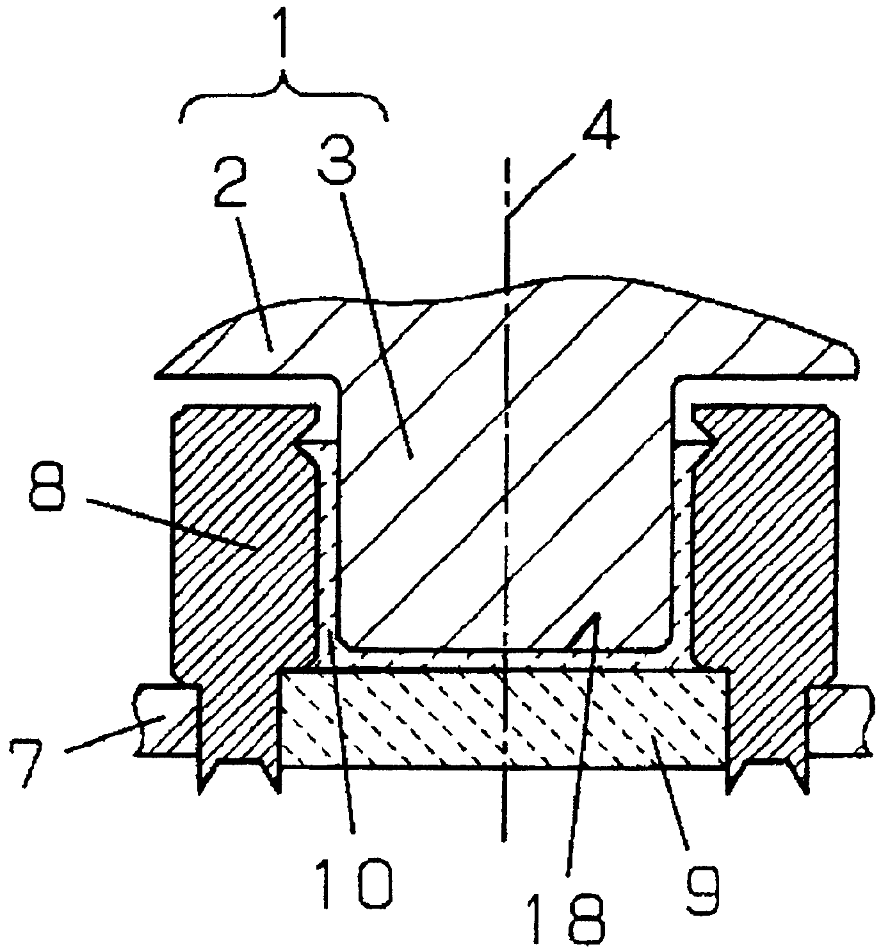
FIG. 3 Partial magnification used to describe the structure of an information-recording/-reproducing device in embodiment 1.

A base 7 is provided with a round bearing sleeve 8 fixed at the center; one end of which sleeve is sealed with a thrust support plate 9. Round column 3 of rotor assembly 1 is inserted to be freely rotatable in the bearing sleeve 8. There is a micro-scale gap between the round column 3 and the bearing sleeve 8, the thrust support plate 9. The micro-scale gap is filled with a dynamic lubricant 10 such as synthetic ester oil, as illustrated in FIG. 3.

On the disc portion 2 in the round column 3 side, there is a round stepped portion in the central part having a thickness greater than that of the rest. A ring-shaped rotor yoke 11 is fixed to the disc portion 2 at the stepped portion. The center of stepped portion is concentric with the rotating axis 4.

As shown in FIGS. 1(*a*), (*b*), (*c*), a ring-shaped rotating magnet 12 magnetized in plural magnetic poles is attached to the rotor yoke 11 by gluing or other method. In the present example, the rotating magnet 12 has been magnetized into the N pole and the S pole alternately, totaling to 12 poles.

In the base 7, a stator 16, formed of an iron core 14 extending from a ring-shaped coupling portion 13 towards the center which is wound around by a coil 15, is press-fit and unitized. In the present example, there are 9 pieces of iron cores 14, disposed opposing to the rotating magnet 12 at equal interval. On the base 7 in the disc portion 2 side, there is a ring-shaped thrust attraction plate 17 fixed opposing to the side face of rotating magnet 12.

There are dynamic pressure generating means formed on the surface (thrust face 18) of round column 3 at the end face opposing to the thrust support plate 9, as well as on the inner surface of the bearing sleeve 8 opposing to the outer surface of round column 3. When the coil 15 is activated by electricity to revolve the rotor assembly 1, rotating motion of the round column 3 provided with the dynamic pressure generating means produces a dynamic pressure with the dynamic lubricant 10. The round column 3 gets the dynamic pressure both in radial and thrust directions and makes a smooth rotation.

Figure 4:
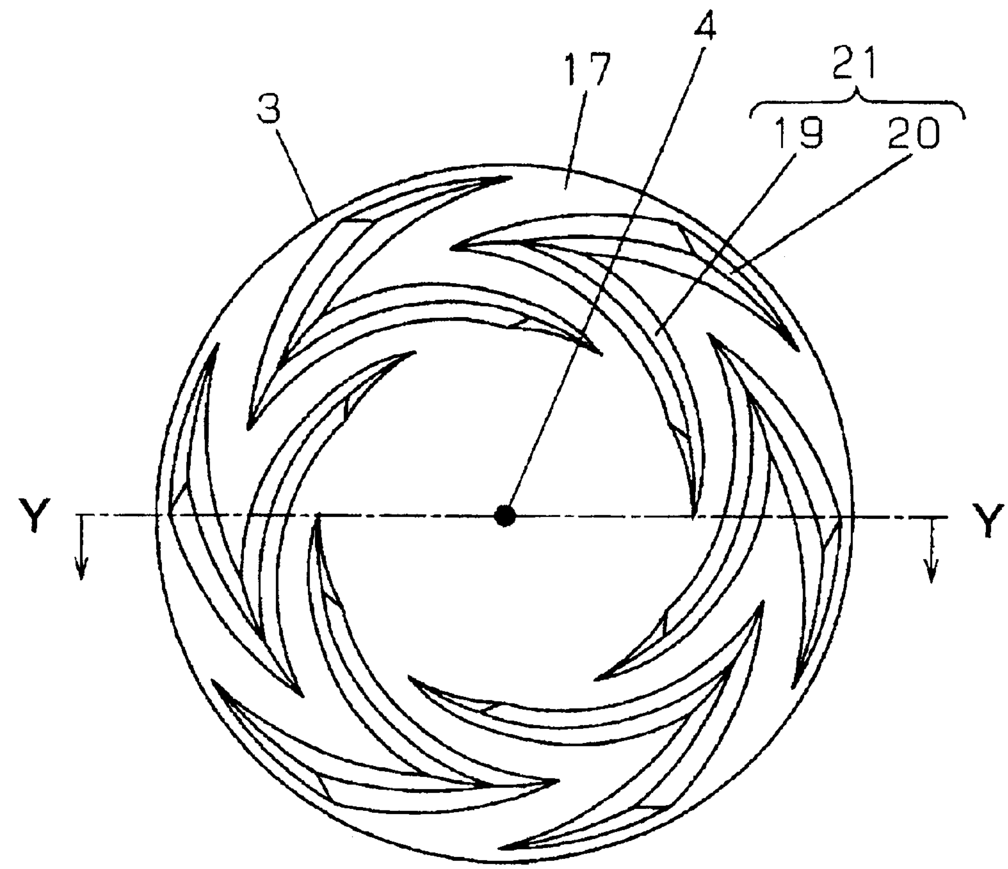
FIG. 4 Plan view showing a pattern of the dynamic pressure generating means in embodiment 1.
Figure 5:
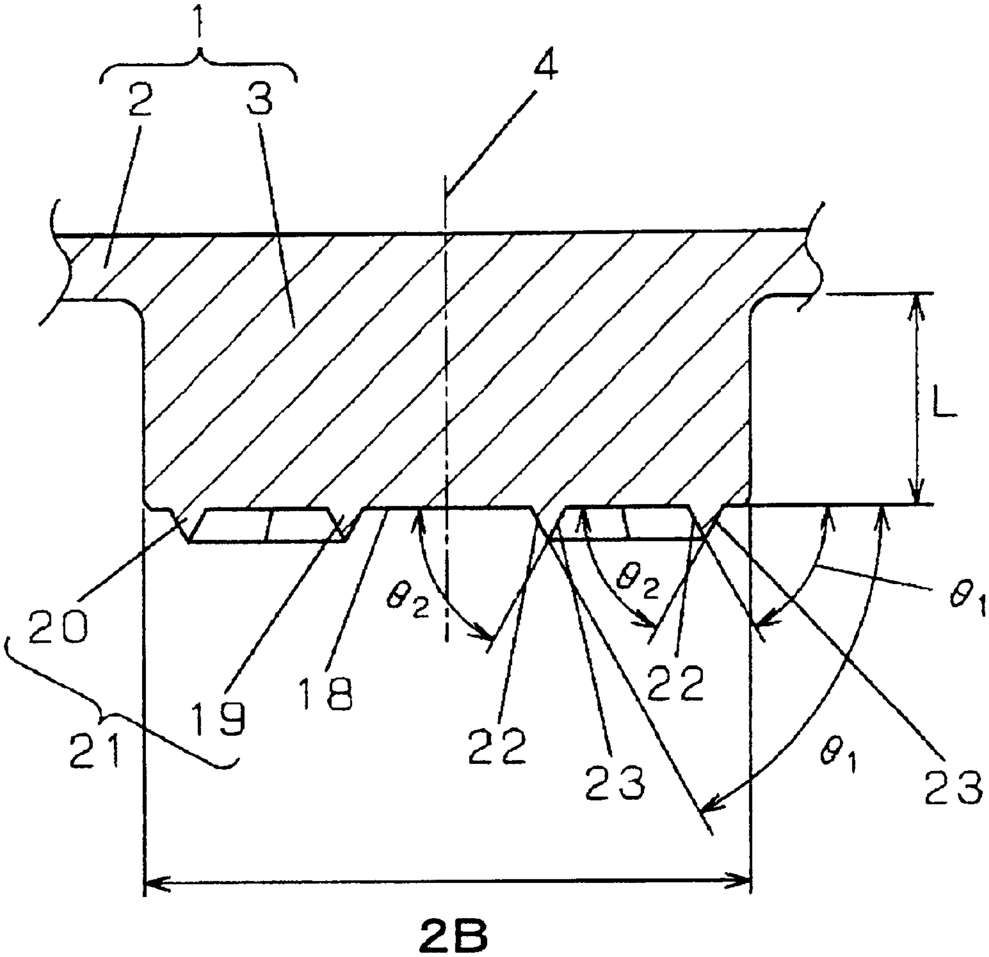
FIG. 5 Cross sectional view showing part of the pattern of dynamic pressure generating means in embodiment 1.
Figure 6:
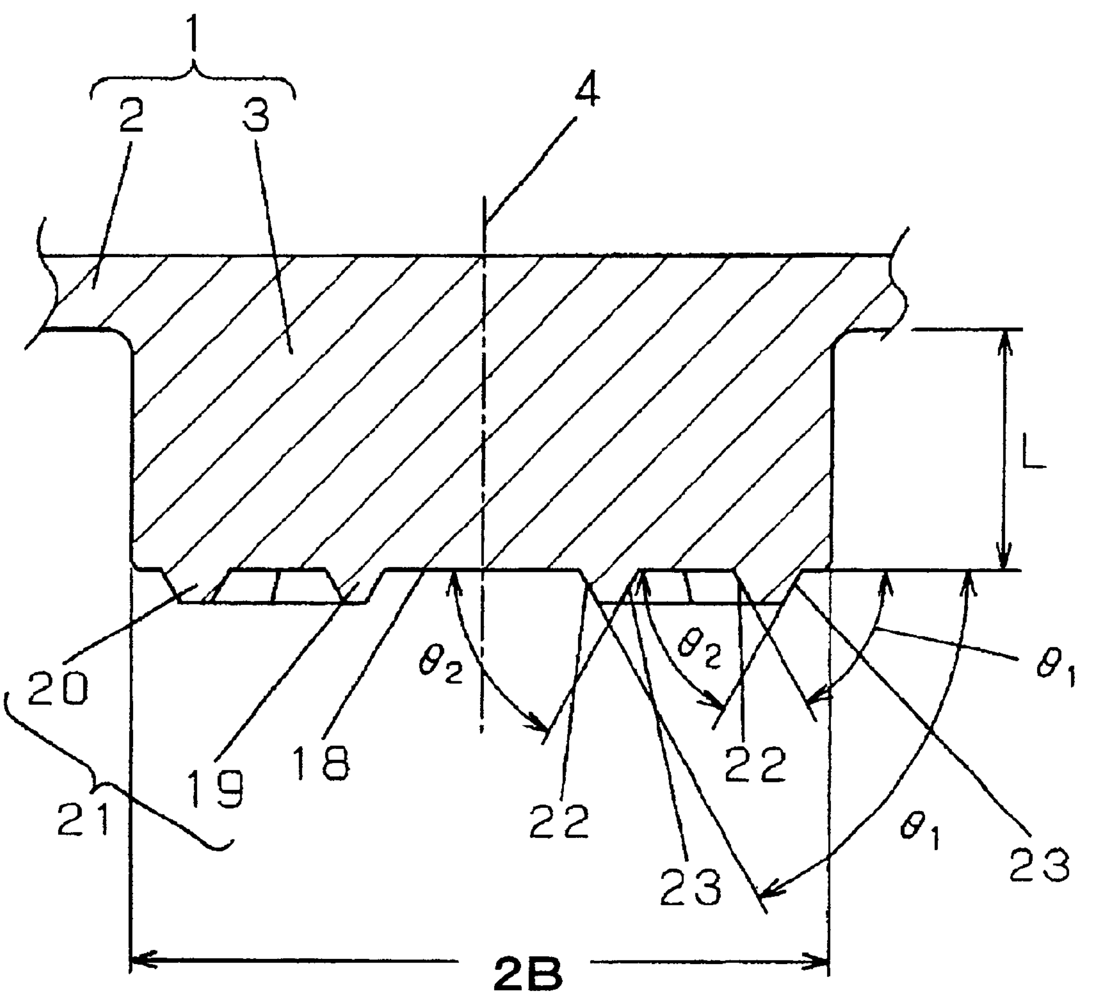
FIG. 6 Cross sectional view showing part of other example of the pattern of dynamic pressure generating means in embodiment 1.

The dynamic pressure generating means formed on the thrust face 18 of round column 3 is described referring to FIG. 4, FIG. 5 and FIG. 6. FIG. 4 is a plan view showing a pattern of the dynamic pressure generating means provided on the thrust face 18 opposing to the thrust support plate 9. FIG. 5 is a cross sectional view sectioned along the line Y—Y of FIG. 4, showing part of the round column 3.

On the thrust face 18 of round column 3, there are a plurality of protruding lines 21 formed of a spiral 19 one end of which is approaching to the rotating axis 4 and a spiral 20 one end of which is approaching to the outer circumference, while the respective other ends of these spirals are shared in common. The protruding lines 21 have a sort of triangular shape when sectioned with a plane crossing at right angle to the length direction.

The protruding lines 21 are designed to satisfy the formulae below:

$$\theta_1 \leqq \tan^{-1}(L/B), \quad (1)$$

$$\theta_2 \leqq \tan^{-1}(L/B), \quad (2)$$

where; $\theta_1$ representing the angle of slope 22 in the axis 4 side relative to the thrust face 18 of round column 18, $\theta_2$ representing the angle of slope 23 opposite to the slope 22 relative to the thrust face 18 of round column 18, L representing length of round column 3, B representing radius of round column 3.

The dynamic pressure generating means can be formed at the same time when a rotor assembly 1 is formed. In this method, the protruding lines 21 can be formed without getting the triangular sectional shape impaired when separating them from a mold.

Although the protruding lines 21 have a triangular sectional shape in the present example, these lines may be formed instead in a shape as illustrated in FIG. 6, where the summit of triangle is cut off to make a trapezoid. The angles $\theta_1$, $\theta_2$ of the two slopes 22, 23 meeting the above formulae (1), (2).

The protruding lines can be formed from the beginning in a trapezoid structure as shown in FIG. 6, at the same time when a rotor assembly 1 is manufactured. Instead, the trapezoid shape may be created by grinding the summit part away from a once-formed triangular protrusion shown in FIG. 5.

The grinding of the triangle summit of the spirals 19, 20 performed for forming a trapezoid provides such spirals 19, 20 of more uniform height, as compared to those of a triangular shape.

A thrust attraction plate 17 provided opposing to the bottom end-face of rotating magnet 12 and the dynamic pressure lubricant 10 filling a gap formed by bearing sleeve 8, thrust support plate 9 and the round column 3 make a device of this structure to be usable at any postures. Namely, the round column 3 of rotor assembly 1 is under the influence of magnetic force working between the rotating magnet 12 and the thrust attraction plate 17, and the atmospheric pressure around the rotor assembly 1; so, there is hardly any risk that it would withdraw form a recess formed by the bearing sleeve 8 and the thrust support plate 9. Actually, there is hardly any risk of the dynamic lubricant 10 escaping therefrom by the viscosity and the surface tension of itself. Thus, in whatever posture a device of the present example may be used, a smooth rotation will be maintained with the relative positioning between the rotor assembly 1 and the base 7 substantially unchanged.

Modifications of the present embodiment are described in the following referring to the cross sectional drawings, FIG. 7(*a*) through FIG. 7(*c*). Those parts equivalent to those in FIG. 1 are represented by using the same symbols.

Figure 7A:
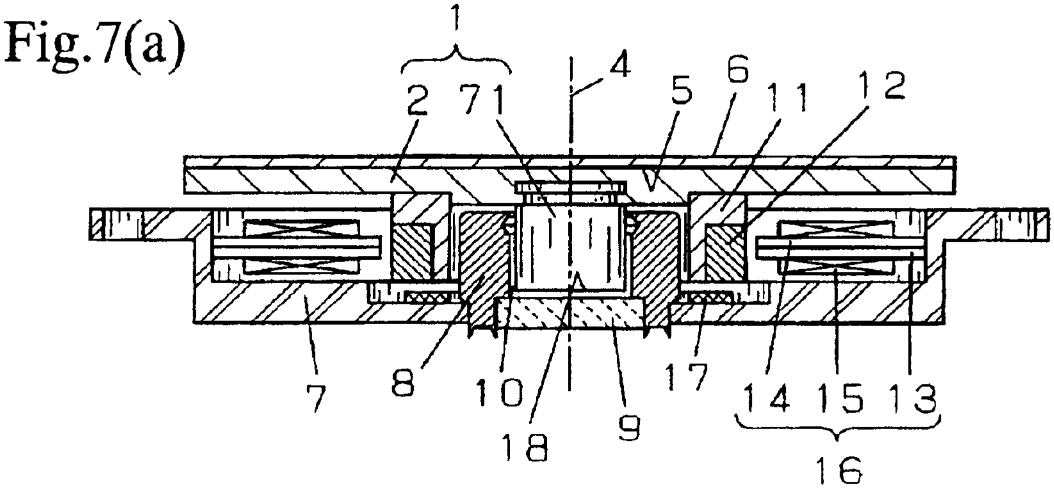
FIGS. 7(*a*), (*b*), (*c*) Cross sectional views showing respectively other examples of information-recording/-reproducing device in accordance with embodiment 1.
Figure 7B:
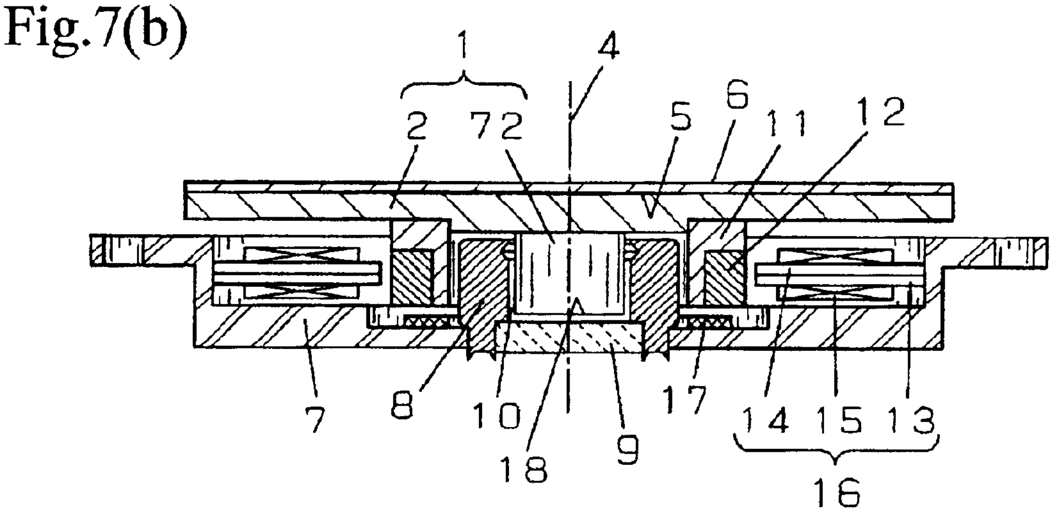
Figure 7C:
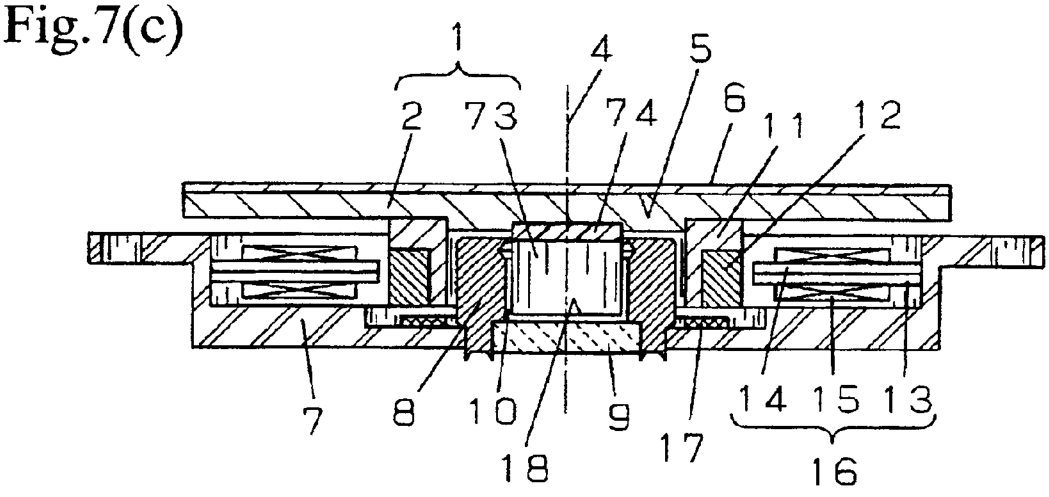

Referring to FIG. 7(*a*), the point of significant difference from the embodiment 1 is that a rotor assembly 1 in the present example is formed by unitizing a solid round column 71 made of the same material as the disc portion 2, or a different thermoplastic material, with the disc portion 2 by insert formation process or the like method on a surface other than the main surface 5 having information recording layer 6.

Referring to FIG. 7(*b*), an integrated rotor assembly 1 may be formed of a disc portion 2 and a round column 72, both of which may be manufactured with the same thermoplastic material, or one of the two is manufactured with a thermoplastic material and the remainder with other material. Integration of the two parts may be performed by means of ultrasonic bonding or thermal fusion using a laser beam.

Or, as shown in FIG. 7(*c*), an integrated rotor assembly 1 may be formed of a disc portion 2 and a round column 73 bonded together by means of thermal fusion placing a thermoplastic junction material 74 between the two. It is preferred that the thermoplastic material used for junction material 74 is those having a glass transition temperature 200° C. or lower.

The round column 71, 72, 73 of rotor assembly 1 may be provided in the outer circumferential surface and/or the thrust face 18 opposing to thrust support plate 9 with a dynamic pressure generating means. Dynamic pressure generated in the lubricant in radial direction and/or thrust direction by rotation of the round column 71, 72, 73 ensures a smooth rotation.

The dynamic pressure generating means formed in the outer circumferntial surface or the thrust face 18 of the round column 71, 72, 73 has the same pattern as that in the embodiment 1. The dynamic pressure generating means may be provided instead in the inner circumferential surface of bearing sleeve or in the thrust support plate opposing to the thrust surface 18 of the round column 71, 72, 73. Also in this arrangement, the same effects as in the embodiment 1 are provided.

In each of the above examples, a rotor yoke 11 may be integrated to the disc portion 2 of rotor assembly 1 by means of gluing or insert formation process.

Figure 8A:
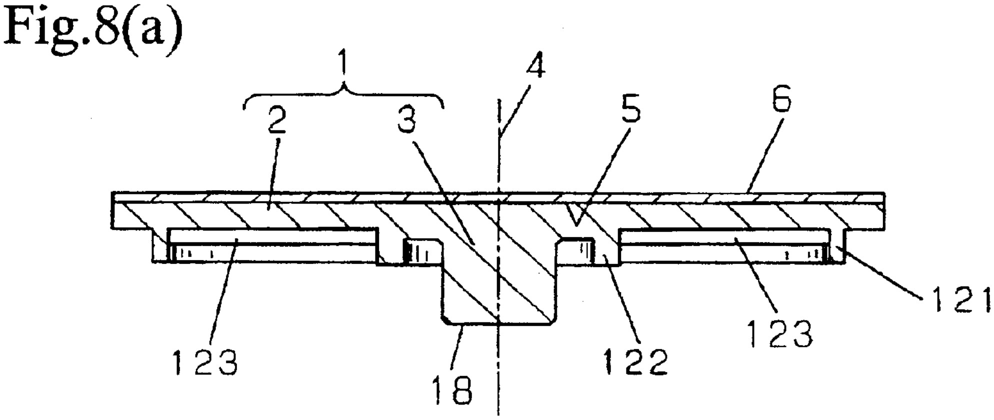
FIG. 8(*a*) Cross sectional view showing other example of rotor assembly in embodiment 1.
Figure 8B:
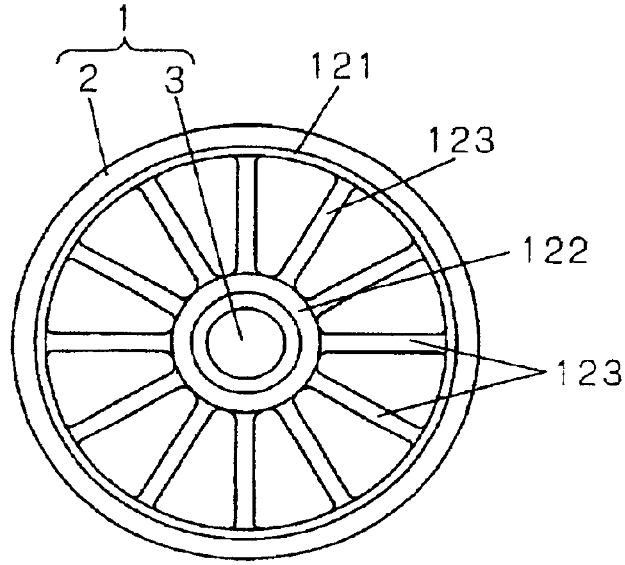
Figure 8C:
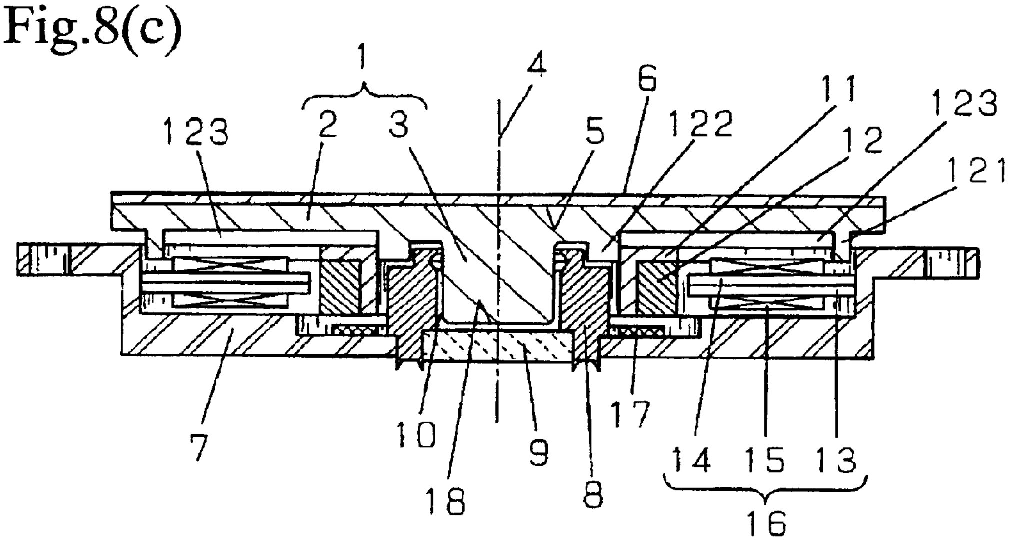

Other modification of the rotor assembly 1 from the structure of the embodiment 1 is shown in FIG. 8(*a*), (*b*). The modification is aimed to suppress warping or waving in the main surface 5 of disc portion 2 so that the surface of information recording layer 6 crosses accurately at right angle with the rotating axis 4. The rotor assembly 1 is provided integrally in the disc portion 2 at the round column 3 side with two ring-shaped ribs, 121 and 122, in concentric arrangement, one in the vicinity of the outer circumference while the other in the vicinity of inner circumference. Provided integrally further are several ribs 123 disposed in radial arrangement which bridge the two ring-shaped ribs, 121 and 122. As shown in FIG. 8(*c*), a rotor yoke 11 is disposed on the radial ribs 123 to be fixed thereon.

Figure 9A:
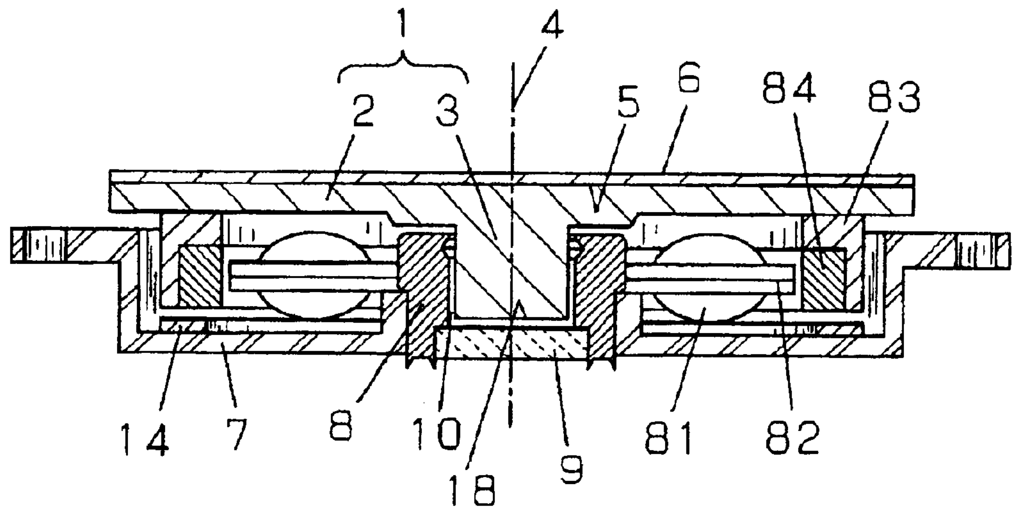
FIG. 9(*a*), (*b*) Cross sectional views showing respectively other examples of information-recording/-reproducing device in embodiment 1.
Figure 9B:
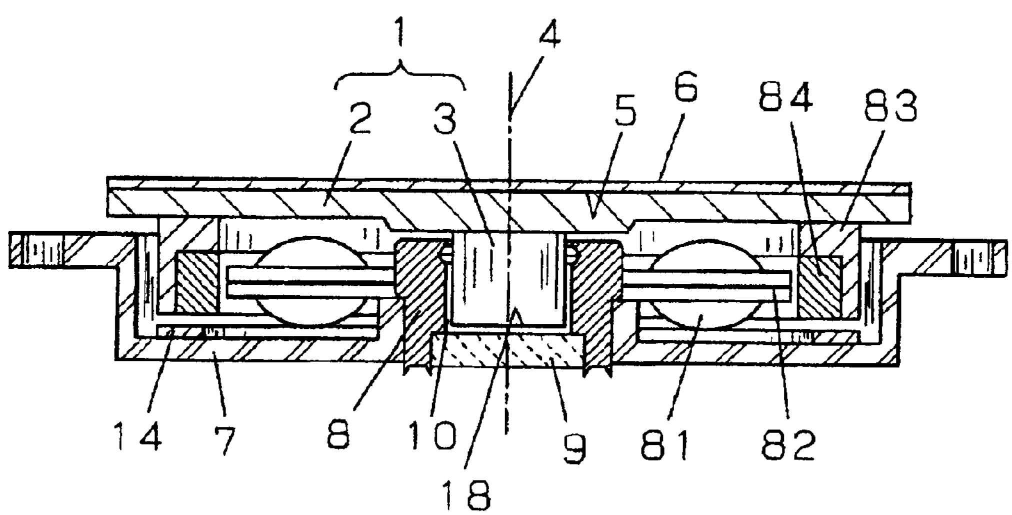

The foregoing description has been based on a inner rotor configuration, where a rotating magnet 12 fixed in a rotor yoke 11 is disposed inside (the rotating axis 4 side) the iron core 14 wound around with coil 15 so that the magnet opposes to the iron core 14. Instead, an iron core 82 wound around with coil 81 may of course be disposed inside of a ring-shaped rotating magnet 84 fixed in a rotor yoke 83, as shown in FIG. 9(*a*), (*b*), to assume an outer rotor configuration.

Although description has been based on a so-called radial gap brushless motor used for the disc driving motor, an axial gap brushless motor may of course be used instead.

Figure 10:
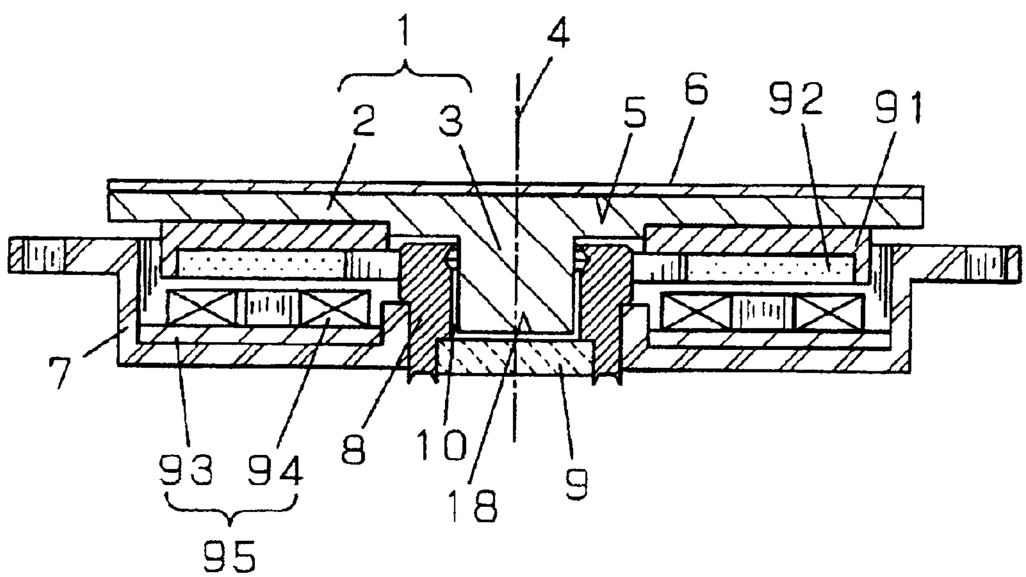
FIG. 10 Cross sectional view showing an example of outer rotor type information-recording/-reproducing device in embodiment 1.

FIG. 10 is a cross sectional view showing key part of an example of disc device incorporating an axial gap brushless motor. Those constituent elements corresponding to those in the embodiment 1 shown in FIG. 1 are represented by using the same symbols.

The point of difference from that shown in FIG. 1 is that a ring-shaped rotor yoke 91 is attached to the disc portion 2 of rotor assembly 1 in the round column 3 side by means of gluing or the like method. A ring-shaped rotating magnet 92 magnetized in several magnetic poles is attached likewise to the rotor yoke 91 by gluing or the like method. Furthermore, a stator 95 comprising several coils 94 of a sort of triangle shape disposed on a printed circuit board 93 made of a soft magnetic material is fixed on a base 7, so that the rotating magnet 92 and the coil 94 are opposing to each other keeping a certain gap in the axis direction.

The devices shown in FIG. 9 and FIG. 10, which incorporate an integrated rotor assembly 1 formed of a disc portion 2 and a round column 3 bonded together by gluing or insert formation, and the devices shown in FIG. 8, which incorporates an integrated rotor assembly 1 provided with concentric ring-shaped ribs 121 and 122, and a plurality of ribs 123 disposed in the radial arrangement, offer the same aforementioned advantages.

Figure 11:
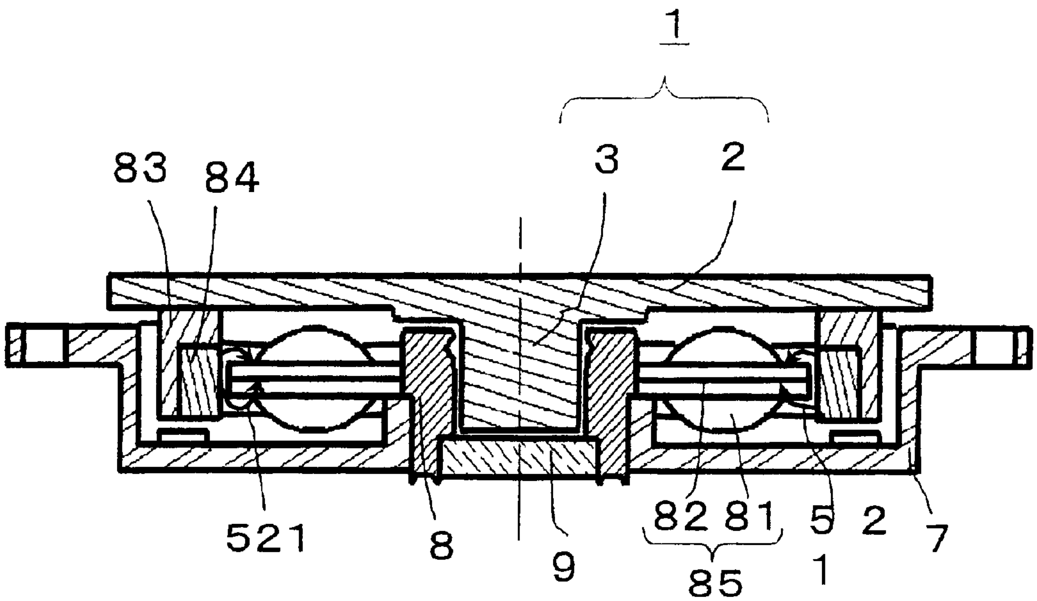
FIG. 11 Cross sectional view showing the structure of an exemplary spindle motor used in an information-recording/-reproducing device of the present invention.
Figure 12:
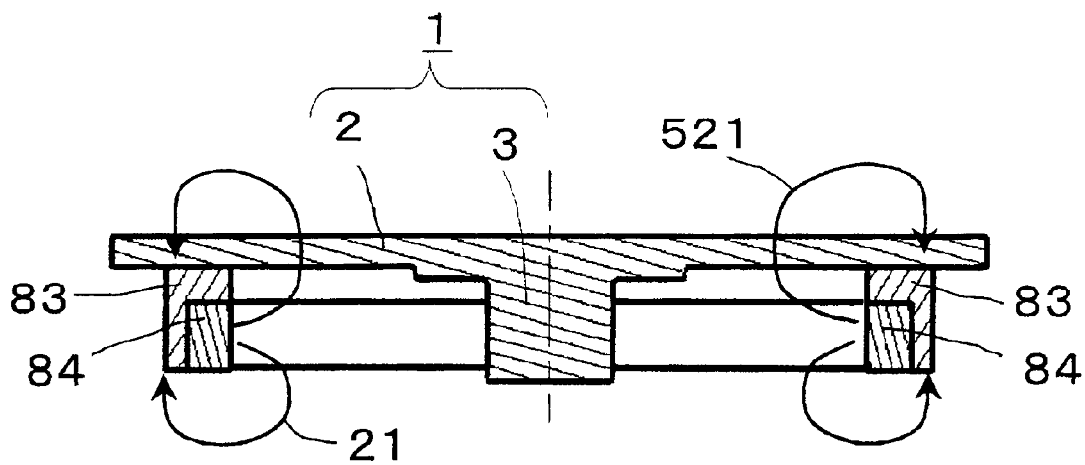
FIG. 12 Cross sectional view showing the structure of an exemplary rotor assembly of spindle motor, used in an information-recording/-reproducing device of the present invention.

Now a method of assembling a rotor assembly in embodiment 1 of the present invention is described. Before making practical explanations, essential points of the assembly is described. Referring to FIG. 11, which cross sectional view was used to describe the structure in key part of an example of disc device in embodiment 1, the magnetic flux 521 escaping from rotating magnet 84 converges to the iron core 82 of stator 85; therefore, the escaping magnetic flux does not reach the information recording layer 6 of a magnetic body on the disc portion 2. Even if a finished spindle motor is heated from outside, there is no magnetic noise caused by escaping magnetic flux, hence, there is no adverse influence to the recording/reproducing of signals. FIG. 12 shows the structure of a rotor assembly 1 in the present invention, before it is assembled in a spindle motor of FIG. 11. The description on a method of assembly will be based on the structure. The integrated rotor assembly 1 is formed of a round column 3, a disc portion 2, a rotor yoke 83 made of a soft magnetic material and a rotating magnet 84 magnetized in plurality of magnetic poles glued together into the form of a single component. Referring to FIG. 12, since there is no other magnetic body for the escaping magnetic flux 521 generated from rotating magnet 84 to converge than the rotor yoke 83, the escaping magnetic flux is reaching as far as the information recording layer 6 of a magnetic body provided on the disc portion 2. If the information-recording layer 6 of a magnetic body is heated in this state, the power of magnetism is deteriorated, and it is easily influenced by the magnetic noise. In many of the practical cases, a thermosetting adhesive is used for gluing a rotor yoke 83 of soft magnetic material and a rotating magnet 84 to the disc portion 2. Therefore, the information recording layer (magnetic layer) can be magnetized, if slightly, under a complex influence of escaping magnetic fields coming from rotating magnet 84 and the heat applied during gluing process. Thus a magnetic noise is recorded overlaid on the magnetic layer. The servo signal recorded in advance in the recording medium through a magnetic transcribing process could be impaired, ill-affecting the normal recording/reproducing operations.

Figure 13:
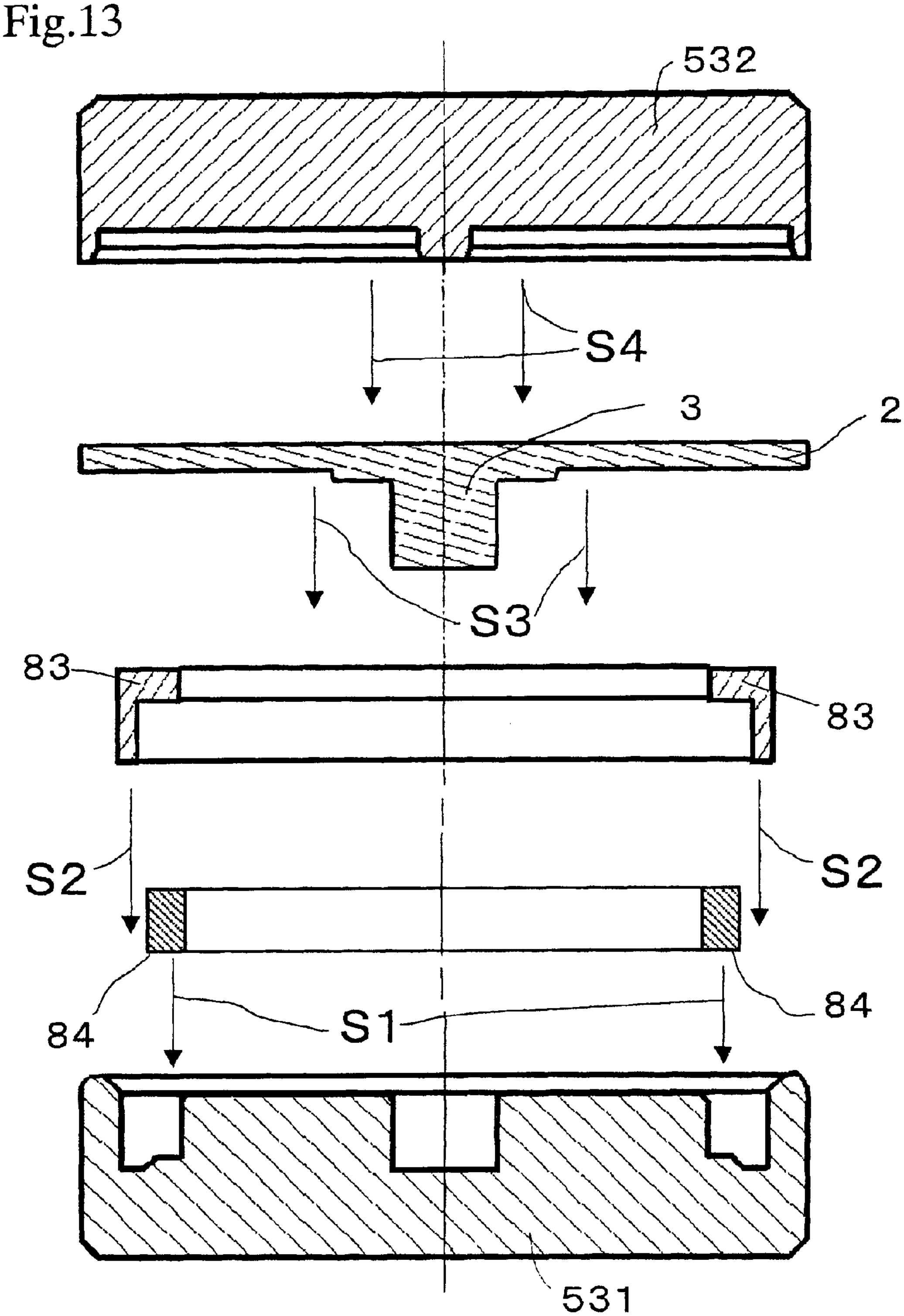
FIG. 13 Drawing used to describe a procedure how a rotor assembly in embodiment 1 is assembled.

Now, practical example of assembling method is described. FIG. 13 shows an outline how a rotor yoke 83 made of a soft magnetic material and a rotating magnet 84 magnetized in plural magnetic poles are glued to an integrated rotor assembly 1 formed of a round column 3, which works as the rotating axle, and a disc portion 3. Referring to FIG. 13, a rotating magnet 84 is provided with a thermosetting adhesive, or an adhesive agent whose curing is accelerated by heat, disposed to cover a specified gluing area, and placed in a specified place of a centering jig 531, which jig is made of a soft magnetic material (Step 1). A rotor yoke 83 made of a soft magnetic material is also provided with a thermosetting adhesive disposed to cover a specified gluing area, and placed in a specified place of the centering jig 531 (Step 2). An integrated rotor assembly 1 formed of a round column 3 and a disc portion 2 is placed in a specified area of the centering jig 531 (Step 3). Finally, a weight 532 made of a non-magnetic material, or pressure means, is provided on the disc portion 2 (Step 4); under which weight, the centering jig 531 made of a soft magnetic material is loaded with the entire parts members aligned in the finished state. It is preferred that the weight 532 gives load on the main surface of disc portion 2 making contact either at the central part or the outermost periphery. The order of Step 1 and Step 2 may be reversed, or both of the steps can be performed at the same time. The press means is not limited to a weight as illustrated in the drawing, but it can be a clamping device. It is preferred that the pressure means is made of a non-magnetic material.

Description on assembly method has been based so far on a rotor assembly of spindle motor comprising a disc portion whose cross sectional shape has an approximate shape of a letter T. However, the structure and the shape of a disc portion in the present invention are not limited to the above examples. For example, a disc portion may be formed with a hub made of soft magnetic material which is press-fit to a rotating axle, disposing a round rink-shaped disc medium on a platform formed by an extension from the outer circumference of the hub and bonding the disc medium thereon by means of press-fitting or gluing so that the upper surface of the rotating axle and the surface of the disc medium share a same straight plane; or, it may be formed by integrating a rotating axle and a hub each made of a soft magnetic material, and disposing a round disc medium on the upper surface of hub and bonding thereon by gluing or the like process. In these two latter cases, however, it is essential that a rotor yoke 83 and a hub of soft magnetic material have been formed integrally. In these cases, the process Step 3 turns out to be unnecessary, but the rest of the process steps are conducted in the same procedure as described referring to FIG. 13.

Figure 14A:
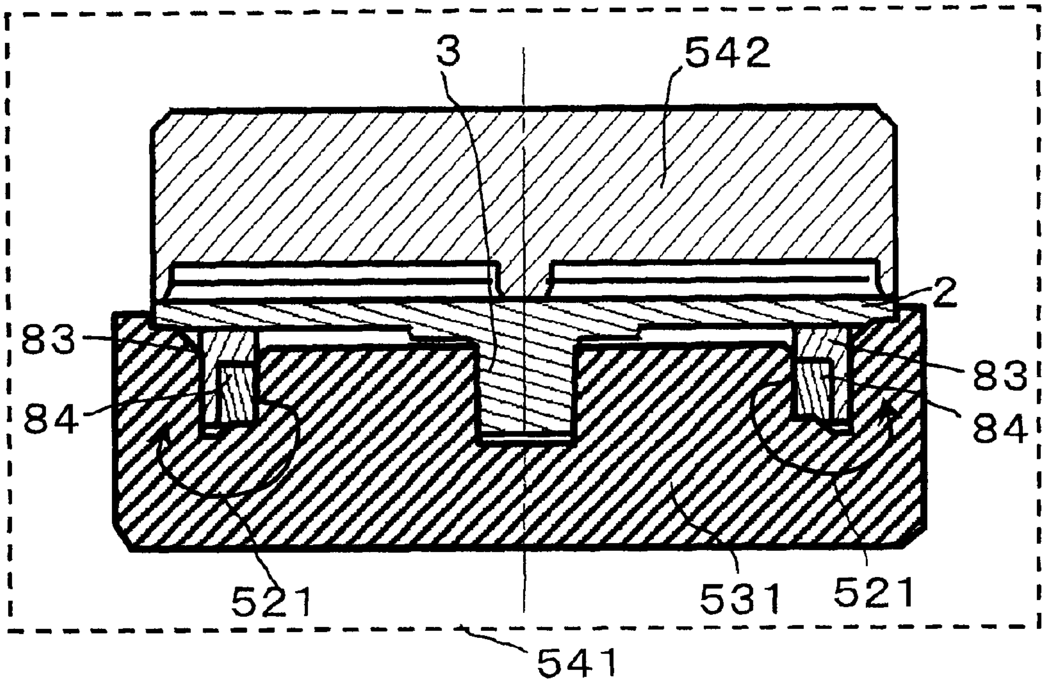
FIG. 14(*a*) Cross sectional view showing how a rotor assembly in embodiment 1 is assembled.
Figure 14B:
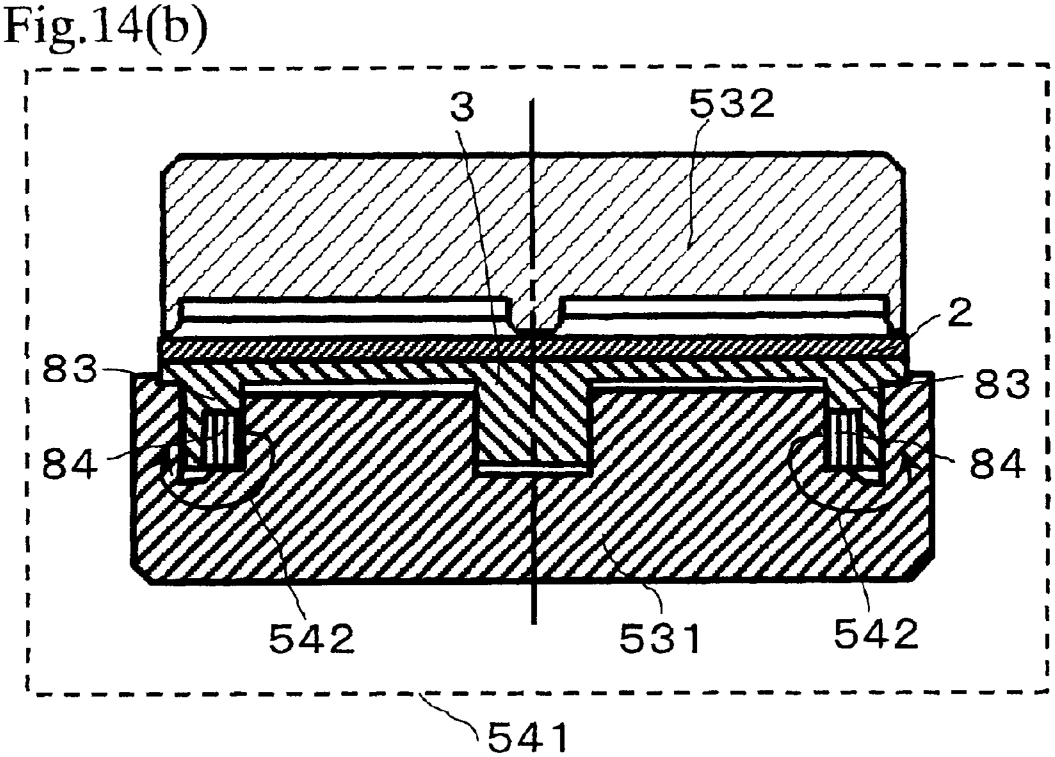

FIG. 14(*a*) shows a state where the assembled parts are disposed in a heating oven 541 for curing an adhesive with heat. The rotor yoke 83 made of a soft magnetic material and the rotating magnet 84 magnetized in plural magnetic poles are thus fixed to the rotor assembly 1 whose cross sectional shape is an approximate letter T. As seen in FIG. 14(*a*), since the centering jig 531 is made of a soft magnetic material, the escaping magnetic flux 521 coming from the rotating magnet 84 is converging at the centering jig 531, it is not in a position of reaching as far as the information recording layer formed of a magnetic body on the disc portion 2. If the centering jig 531 is made of a non-magnetic material, the magnetic flux does not converge at the centering jig 531, it will be reaching as far as the information recording layer in the same way as shown in FIG. 12. Namely, such a jig made of a non-magnetic material is not effective. Any and all magnetic materials are not suitable to the centering jig. Preferred material for the centering jig is those having a soft magnetic property; more preferably, a soft magnetic material having a high magnetic permeability.

FIG. 14(*b*) shows an example of assembly process. A disc portion 2 is formed by first integrating a rotating axle, a hub and a rotor yoke 83, each made of a soft magnetic material, and then placing a round disc medium on the upper surface of the hub. After assembling respective components together, the entire assembly is put in a heating oven 541 to have the adhesive applied to the assembly cured. A rotating magnet 84 magnetized in several magnetic poles is thus fixed to the rotor yoke 83 of disc portion 2. It can be understood also from FIG. 14(*b*) that the escaping magnetic flux 521 is converging to the centering jig 531 made of soft magnetic material, it is not reaching the information recording layer of magnetic body disposed on the disc portion 2.

Besides the disc portions as described in FIGS. 14(*a*) (*b*), disc portions of different structures may be used; for example, a disc portion formed with a hub made of soft magnetic material which is press-fit to a rotating axle, disposing a round rink-shaped disc medium on a platform formed by an extension from the outer circumference of the hub to be bonded by means of press-fitting or gluing. The present method of assembly is also usable when assembling a rotor assembly using such other disc portions of different structures. Also in this case, the escaping magnetic flux 521 converges to the centering jig 531 made of soft magnetic material. Thus an information recording layer of magnetic body formed on the disc portion 2 is not ill-affected.

In a case where the disc portion 2 has a T-shape in the cross section formed of a rotating axle and a round disc substrate integrated together, or a case where a rotating axle and a hub, each made of a soft magnetic material, are unitized into a single body and then a round disc medium is fixed on the upper surface of the hub, the centering operation is performed by making use of the outer circumference of disc portion, since there is no round circumference available in the central part usable for the purpose of centering operation. In these cases, the centering jig 531 of soft magnetic material needs to have an outer diameter that is greater than that of the disc portion, as understandable from FIGS. 14(*a*), (*b*). In a case where a disc portion having a structure, wherein it is formed of a round rink-shaped medium press-fit or glued on a platform provided by an extension from the outer circumference of soft magnetic hub which had been press-fit with a rotating axle, the centering operation may be performed by making use of the outer circumference of hub or an inner circumference of the round rink-shaped medium.

Although the foregoing descriptions have been based on a concept where each of the rotor yoke 83 made of a soft magnetic material and the rotating magnet 84 magnetized in plural magnetic poles is treated as an individual component during the process of fixing and gluing them to a disc portion, a rotor yoke 83 and a rotating magnet 84 may be connected together in advance into the form of a rotor unit, and then attaching the unit to a disc portion. Also in this way, a spindle motor of disc device can be completed without having the recording medium being overlaid by magnetic noise. Besides the above example, where an integrated component of hub and rotor yoke 83 made of soft magnetic material for mounting a recording medium thereon is used, it may be provided by first fixing a rotor yoke 83 made of soft magnetic material to a disc portion, and then gluing a rotating magnet magnetized in plural magnetic poles thereon. In this case either, a spindle motor of disc device can be finished in accordance with the present assembly method using the same jig, without having the recording medium being overlaid by magnetic noise.

Although the foregoing assembly method has been described based on a disc device using an outer rotor spindle motor, it is not the intention of the present invention to limit it to the outer rotor type motor. The spindle motor may take an inner rotor configuration, subject to the following adaptations; in the outer rotor motor, ring-shaped rotor yoke of soft magnetic material and a ring-shaped rotating magnet magnetized in plural magnetic poles are disposed along the outer circumference at the bottom of disc portion, on the other hand, those of the inner rotor motor need to be disposed along a circumference in the central side at the bottom of disc portion. Also a stator, which consists of iron core and coil and disposed opposing to the rotating magnet, is to be placed accordingly. With these necessary adaptations, rotor assemblies of inner rotor type can be assembled in accordance with the same method of assembly.

In FIG. 7 through FIG. 10, the surface of disc portion 2 having information recording layer 6 is shown to be totally flat. However, it is to be noted that in reality the surface is not that flat, but there is a hollow of several $\mu$m deep in an area corresponding to the round column 3 disposed on the bottom surface, as shown in FIG. 2, a cross sectional magnified view showing the vicinity of rotating axle 4.

Although the foregoing descriptions have been based on a concept where each of the rotor yoke made of soft magnetic material and the rotating magnet magnetized in plural magnetic poles is treated as an individual component during the process of fixing and gluing them to a disc portion, a rotor yoke and a rotating magnet may be connected together in advance into the form of a rotor unit, and then attaching the unit to a disc portion. Also in this way, a spindle motor of disc device can be completed without having the recording medium being overlaid by magnetic noise. Besides the above example, where an integrated component of hub and rotor yoke made of soft magnetic material for mounting a recording medium thereon is used, it may be provided by first fixing a rotor yoke made of soft magnetic material to a disc portion, and then gluing a rotating magnet magnetized in plural magnetic poles thereon. In this case either, a spindle motor of disc device can be finished in accordance with the present assembly method using the same jig, without having the recording medium being overlaid by magnetic noise.

As compared to a case where a disc portion is attached on a platform provided by an extension from the outer circumference of hub of a driving spindle motor, the embodiment 1 of the present invention, where a disc portion and a round column are formed integrally or these parts are connected together into a single body by means of gluing or insert formation, can insure at a significantly high precision level that the surface of information recording layer on the disc portion is crossing at right angle with the rotating axis, because the hollow existing in an area corresponding to the rotating axle provided underneath can be utilized for the purpose of correct aligning and centering during assembly operation of a rotor assembly, and the fact that the hollow is very shallow provides an additional advantage. Therefore, the deviation in the recording surface of information recording layer caused by errors with the crossing right angle, which is not rare among the conventional configurations, can be significantly reduced. The round circular rib and the plurality of radial ribs provided on the disc contribute to suppress warping and waving of the recording disc surface. These altogether makes it possible to revolve the surface of information recording layer keeping a highly precise right angle with the rotating axis, to increase resonance frequency of the disc portion, and to implement a smoother rotation of the rotor assembly (also called as rotating disc). This readily leads to an increased recording density, the center of information recording layer can be brought into a precise coincidence with the center of rotation, so a deviation in the radial direction can be suppressed to be very small. Within an information recording layer, a dislocation between the rotating center of servo signal transcribed in advance for enabling a head element to correctly follow a plurality of recording tracks disposed in a concentric arrangement and the rotating center of a rotating disc portion can be kept to be within a very small value. Thus a disc device that is suitable to high-density recording is implemented. Furthermore, since the rotor assembly is assembled in accordance with the method in which a magnetic noise hardly ill-affects the magnetic layer of disc portion even when heat is applied, the risk of magnetic layer being magnetized, if very slightly, by a complex influence by an escaping magnetic flux and a heat applied during processing can be avoided, and the magnetic layer of disc portion will hardly be overlaid by magnetic noise. Therefore, even in a case where servo signal is transcribed in advance on a recording medium, normal information-recording/-reproducing performance will not be disturbed. A disc drive of very high reliability is thus offered.

Furthermore, since a rotating disc (rotor assembly) plays also the role of rotor portion of a driving spindle motor, the hub of a spindle motor as well as the clamping device for clamping a disc portion onto a platform, which are indispensable in the conventional devices, can be eliminated. As a result, the devices can be made slimmer in shape and lower in cost. If the rotating columns are manufactured separately, which are to be unitized later with the disc portion for forming an integrated rotating disc (rotor assembly), the dynamic pressure generating means can be provided efficiently and easily. Thus a further cost reduction can be expected.

(Embodiment 2)

Figure 15A:
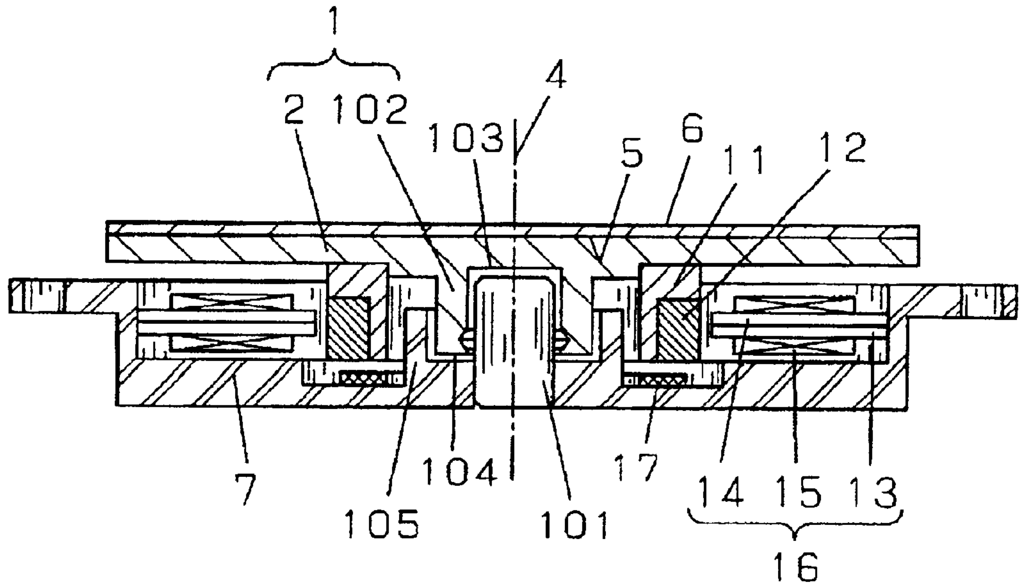
FIG. 15(*a*) Cross sectional view used to describe the structure of an information-recording/-reproducing device in accordance with a second exemplary embodiment of the present invention.
Figure 15B:
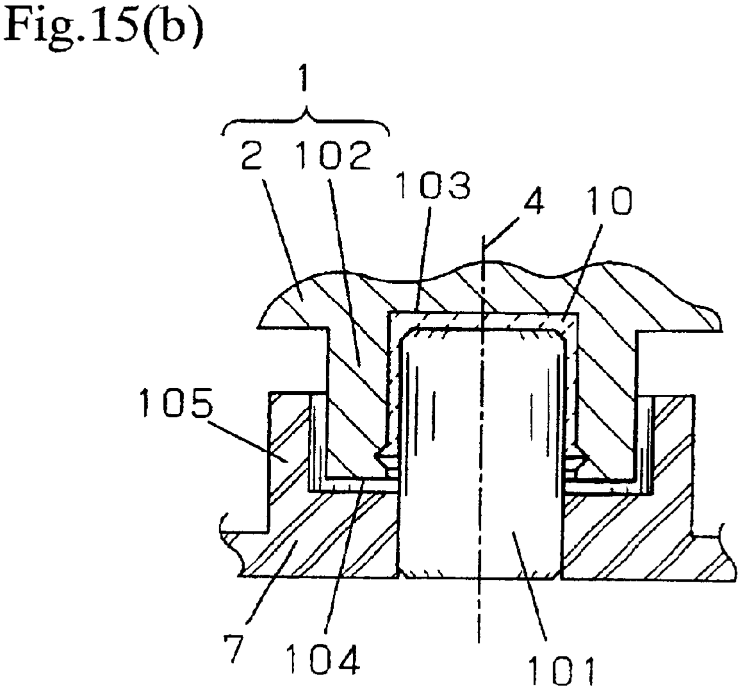

A second exemplary embodiment of the present invention is described with reference to FIG. 15. FIG. 15(*a*) is a cross sectional view of the key portion with a focus on the bearing part, FIG. 15(*b*) is a partial magnification. Those parts having the functions identical to those in the embodiment 1 are represented by using the same symbols as in FIG. 1.

Referring to FIG. 15(*a*), an axle 101 containing within it the rotating axis 4 is fixed on the base 7. A rotor assembly 1 is formed of a disc portion 2 provided with information recording layer 6 of a certain thickness disposed on the main surface 5 so that it crosses at right angle with the rotating axis 4 and a rotating cylindrical portion 102 provided integrally on the disc portion 2 in a surface opposite to the main surface 5. The rotor assembly 1 may be formed in the same manner as in embodiment 1, using a liquid polymer, PPS, or the like thermoplastic material, or an Al alloy metal.

The surface of disc portion 2 having information recording layer 6 appears to be totally flat in FIG. 15(*a*). In reality, however, it is not that flat; it has a shallow hollow of several μm deep in an area corresponding to the rotating cylindrical portion provided underneath, as shown in FIG. 2. A presumed reason for the hollow is that the disc portion 1 is not symmetric in the direction of rotating axis 4, but when the rotating cylindrical portion and the disc portion are unitized together an unevenness is created in the thermal conduction. This is considered to incur a shrinking deformation in the area corresponding to the rotating cylindrical portion provided underneath. Thus the main surface of the unitized disc portion 2 has the very shallow hollow. Therefore, it is preferred, also in the present embodiment 2, that the area is used for a ramp portion for providing a head with shelter, rather than for information-recording/-reproducing purpose.

The axle 101 is inserted in a space formed by the disc portion 2 and the inner circumferential surface of the rotating cylindrical portion 102; the rotor assembly 1 is supported in this way. The gap between the inner circumferenctial surface of rotating cylindrical portion 102 of rotor assembly and the axle 101 is filled, like in the embodiment 1, with a dynamic pressure lubricant 10 (e.g. an ester system synthetic oil), as shown in FIG. 15(*b*).

A rotor yoke 11 is attached to the rotor assembly 1 on the surface in the rotating cylindrical portion 102 side. A ring-shaped rotating magnet 12 magnetized in plural magnetic poles is attached to the rotor yoke 11 by gluing or the like method. A stator 16 formed of iron core 14 wound around with coil 15 is fixed on the base 7 by press-fitting or the like method so that the iron core 14 opposes to the rotating magnet 12. A thrust attraction plate 17 is fixed on the base 7 opposing to the bottom face in the axis direction of rotating magnet 12.

A dynamic pressure generating means having the same pattern as illustrated in FIG. 4, FIG. 5 and FIG. 6 is provided on the outer circumferential surface of axle 101 facing the inner circumferential surface of rotating cylindrical portion 102, and on the end face 103 in the cylindrical portion 102.

When a rotor assembly 1 is put into rotation, a dynamic pressure is generated with a lubricant 10 sealed in a gap between the rotating cylindrical portion 102 and the axle 101. The rotating cylindrical portion 102 receives the dynamic pressure in the radial and the thrust directions for a smooth rotation of rotor assembly 1.

The formulae (1), (2) described in the embodiment 1 also apply to the dynamic pressure generating means in the present embodiment 2, in the angles formed by the slopes of the protruding lines and the surface having the dynamic pressure generating means. In applying the formulae, note that L signifies length of the rotating cylindrical portion 102 in the axis direction, while B signifies inner diameter of the rotating cylindrical portion 102.

A dynamic pressure generating means for generating the pressure in thrust direction may of course be provided on the circumferential end face 104 of the rotating cylindrical portion 102 at the opening end. In this case, a ring-shaped bearing wall 105 needs to be provided on the base 7 for preserving a dynamic pressure lubricant in place. The gaps between the bearing wall 105 and the rotating cylindrical portion 102, and between the rotating cylindrical portion 102 and the axle 101 are filled with the lubricant.

The dynamic pressure generating means may of course be provided on the end face of axle 101 in the same pattern as illustrated in FIG. 4, FIG. 5 and FIG. 6, in place of forming it on the end face 103 within the rotating cylindrical portion 102.

The thrust attraction plate 17 provided opposing to the bottom end face of rotating magnet 12 and the dynamic pressure lubricant 10 filling the gap between the inner circumferential surface of rotating cylindrical portion 102/the disc portion 2 of rotor assembly 1 and the axle 101 work together to prevent the rotating cylindrical portion 102 of rotor assembly 1 from withdrawing apart from the axle 101, taking advantage of the magnetic force effecting between the rotating magnet 12 and the thrust attraction plate 17 and the atmospheric pressure, whatever posture the device may be used in. Or, substantially there is no risk that the dynamic lubricant 10 would spill out and disappear from the place, thanks to the viscosity and the surface tension of the lubricant 10. Thus, the rotor assembly 1 keeps on making a smooth rotation in an equilibrium among the dynamic pressure generated with the lubricant 10, self weight of the rotor assembly 1, magnetic force between the rotating magnet 12 and the thrust attraction plate 17, and the atmospheric pressure.

Some of the partial modifications of the present embodiment 2 are described in the following with reference to FIG. 16(*a*), (*b*). Those parts identical to those of FIG. 15 are represented by using the same symbols.

Figure 16A:
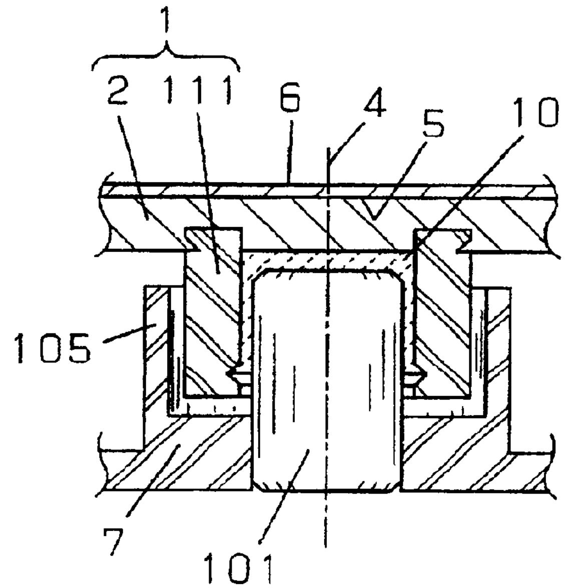
FIG. 16(*a*), (*b*) Cross sectional views respectively showing key portion of other examples of information-recording/-reproducing device in embodiment 2.
Figure 16B:
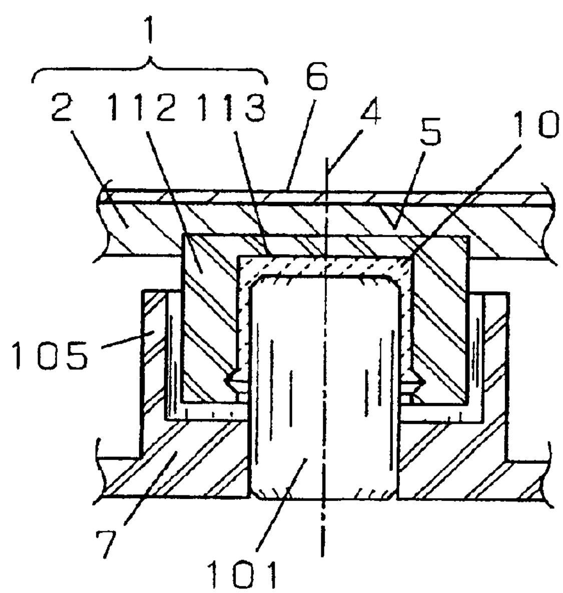

As shown in FIG. 16(*a*), a rotating cylindrical portion 111 made of the same material as disc portion 2 or a different material, e.g. a thermoplastic material, is integrated to the disc portion 2 in a surface opposite to the main surface 5 by means of insert formation or the like method. The rest part remains the same as that of the embodiment shown in FIG. 15.

Producing the rotating cylindrical portion 111 as a member independent of the disc portion 2 makes it easy to provide a dynamic pressure generating means. Instead of providing a dynamic pressure generating means on the outer circumferential surface of axle 101, it may of course be formed on the inner circumferential surface of rotating cylindrical portion 111 in the same manner as that formed on the inner circumferential surface of bearing sleeve 8 in the embodiment 1 .

An example in FIG. 16(*b*) shows that a rotating cylindrical portion 112 is integrated with the disc portion 2 by insert formation with the closed end of the cylinder slightly buried in the disc portion 2. The rest parts remain the same as those shown in FIG. 15.

Although both of the disc portion 2 and the rotating cylindrical portion 111, 112 are made of a thermoplastic material in the present example, it may be provided instead by manufacturing at least either one of disc portion 2 and rotating cylindrical portion with a thermoplastic material and the other item with a different material. In the latter case, the disc portion 2 and the rotating cylindrical portion 111, 112 can be connected together by an ultrasonic means or a thermal fusion using a laser beam, besides the insert formation.

Or, a disc portion and a rotating cylindrical portion may be unitized by means of thermal fusion placing a thermoplastic junction material in between. It is preferred for the thermoplastic junction to use the material whose glass transition temperature is 200° C., or lower.

Like in the example of embodiment 1, a rotor yoke 11 can be fixed to the disc portion 2 of rotor assembly 1 by gluing or insert formation.

Figure 17A:
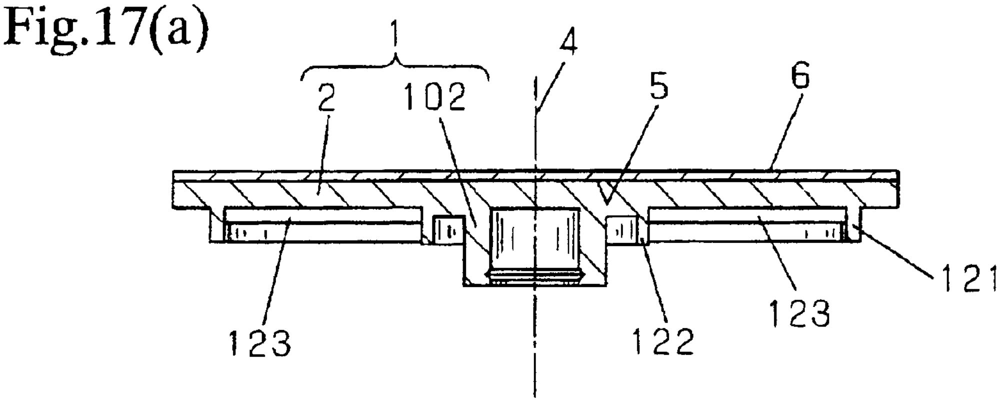
FIG. 17(*a*) Cross sectional view showing an information-recording/-reproducing device incorporating other example of rotating disc in embodiment 2.
Figure 17B:
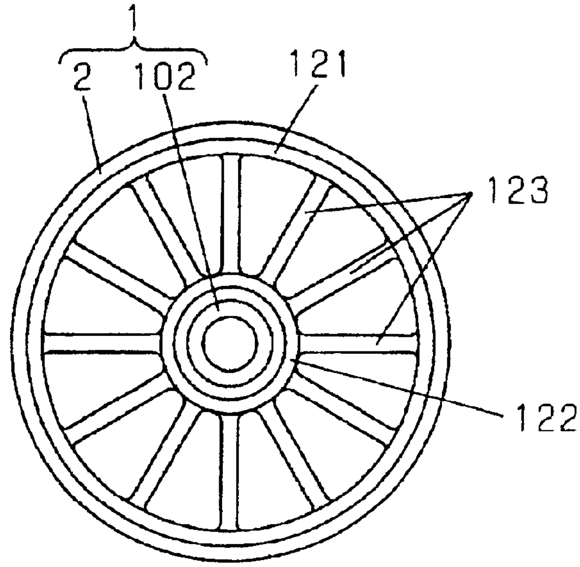
Figure 17C:
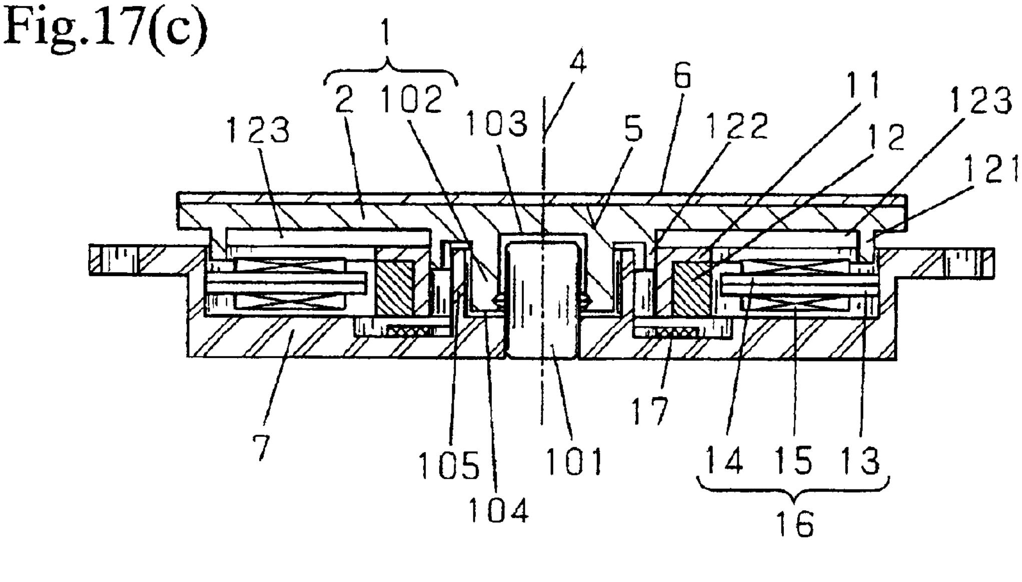

In the same manner as in the embodiment 1, a rotor assembly 1 in FIG. 15 may be structured employing the rib. Namely, as shown in FIGS. 17(*a*), (*b*), the rotor assembly 1 is provided in the rotating cylindrical portion 102 side with a ring-shaped ribs 121 and 122 in concentric ring arrangement, one in the outer circumference while the other at the vicinity of rotating cylindrical portion 102. Further provided integrally are several pieces of ribs 123 disposed in radial arrangement bridging the ring-shaped ribs 121 and 122. As shown in FIG. 17(*c*), a rotor yoke 11 is disposed on the radial rib 123 and fixed thereto. The rotor yoke 11 may be disposed on the rib 123 without having contact with the inner ring-shaped rib 122, or on the ring-shaped rib 122 to be fixed thereto.

Like in the embodiment 1, the above configurations may be adapted to an inner rotor arrangement and an outer rotor arrangement. Also, to a radial gap arrangement and an axial gap arrangement.

In the rotor assembly 1 illustrated in FIG. 17, the surface of disc portion 2 having information recording layer 6 is shown to be totally flat. In reality, however, it is to be noted also in the present example that the surface is not that flat, but there is a hollow (of rink-shape in the present embodiment 2) of several $\mu$m deep in a region corresponding to the rotating cylindrical portion 102 disposed on the bottom surface, like the example shown in FIG. 2, a cross sectional magnification showing the vicinity of rotating axis 4.

The rotor assemblies in the present embodiment 2 can be provided through the same assembly method described in the embodiment 1. In the present embodiment, the axle of disc portion is replaced from a round column by a rotating cylindrical portion; for the rest, there is no basic difference. So, detailed description is omitted here.

As compared to a case where a disc is attached on a flange portion of turntable of driving spindle motor, those in the present embodiment 2, like in the embodiment 1, whose disc portion and rotating cylindrical portion are formed integrally or unitized to make a single component, insure that the surface of disc portion on which the information signals are recorded is crossing at right angle with the rotating axis at a significantly high precision level despite there is a shallow hollow formed in an area corresponding to the rotating cylindrical portion provided underneath. The round circular ribs and the radial ribs provided on the disc contribute to suppress the warping and the waving of recording surface, to raise the resonance frequency of the disc portion, and to revolve the rotor assembly (also called as rotating disc) smoothly. The deviation in the rotating surface of an information-recording layer can be remarkably reduced, also the out-of-surface vibration can be suppressed, which readily leads to an increased recording density. When the rotating cylindrical portions are manufactured separately to be unitized later with disc portion, dynamic pressure generating means can be formed efficiently and easily, which contributes to a lower cost. When rotor assemblies are assembled in accordance with the method of present invention, the magnetic layer is hardly ill-affected, if slightly, by complex effects of the magnetic fields escaping from the rotating magnet and the heat applied during processing. The magnetic noise is seldom recorded overlaid on the magnetic layer of the disc portion. Thus a disc drive that has a very high reliability and a superior S/N ratio is offered.

(Embodiment 3)

Figure 18:
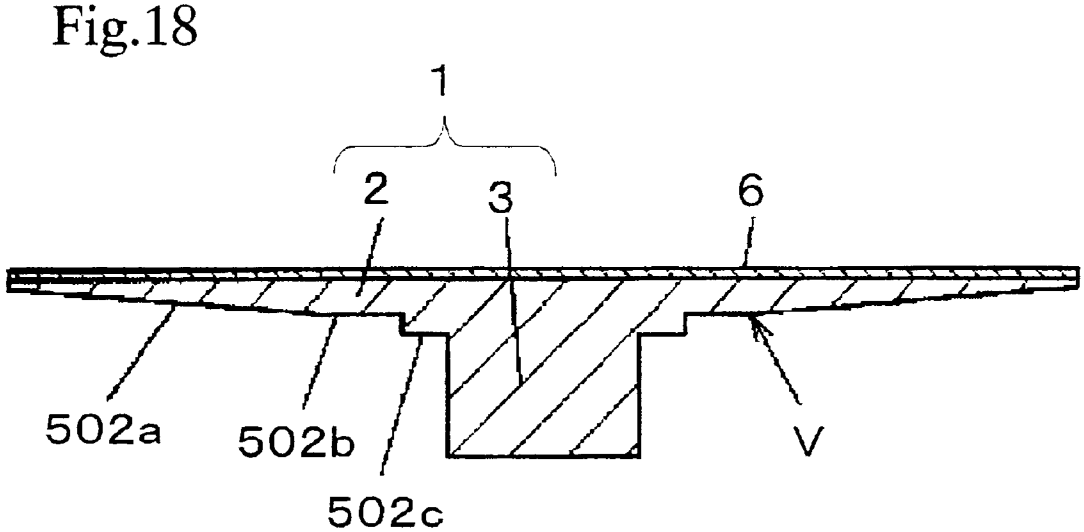
FIG. 18 Cross sectional view showing the shape of a magnetic disc in accordance with a third exemplary embodiment of the present invention.
Figure 19:
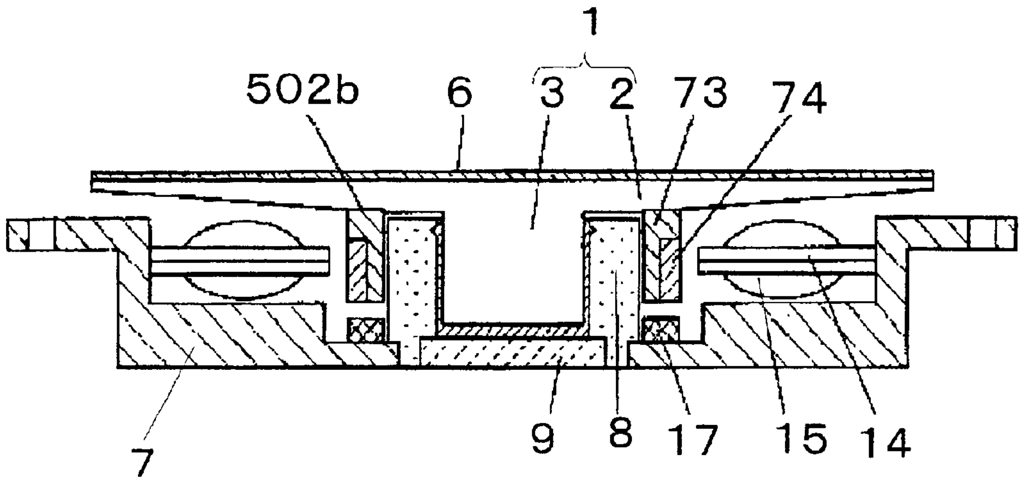
FIG. 19 Cross sectional view showing key portion of driving means mounted with a magnetic disc in embodiment 3.

A third exemplary embodiment of the present invention is a modification in the shape of disc portions in the embodiments 1 and 2. The modification is aimed to reduce amount of flexion caused by a shock, and to reduce a possibility of damage due to collision of head slider and the disc caused by an impact given on the disc portion. FIG. 18 shows shape of a rotor assembly in embodiment 3. FIG. 19 is a cross sectional view showing key part of the magnetic disc attached to driving means. The rotor assembly 1 is integrally formed of a disc portion 2 having at one of the surfaces a flat surface and a round column portion 3, or the rotating axle, provided at the center of the other surface. The disc portion 2 is provided on the surface having the round column 3 with a slope 502*a* stretching continuously in a straight line from a place of circle V towards the outer circumference edge, a magnet surface 502*b* for fixing a rotor yoke 73 and a rotating magnet 74, and a flat surface 502*c* opposing to the opening end face of bearing sleeve 8 which is a part of a hydrodynamic bearing consisting of a bearing sleeve 8 and a thrust support plate 9. The rotor assembly 1 (also called as rotating disc) may be formed of, like in the embodiments 1 and 2, glass, liquid crystal polymer, PPS, or the like thermoplastic material, or an Al alloy metal. An information recording layer 6 of magnetic body is provided on the one surface of the disc portion 2 to complete a rotor assembly 1. In some cases, the information recording layer 6 is accompanied by an under layer for improving the sticking property and a hard protective layer for improving the anti-abrasive characteristic.

In FIG. 18, the surface of disc portion 2 having information recording layer 6 is shown to be totally flat. In reality, however, it is to be noted also in the present embodiment 3 that the surface is not that flat, but there is a hollow of several $\mu$m deep in an area corresponding to the round column disposed on the bottom surface, like the example shown in FIG. 2.

As shown in FIG. 19, a rotating magnet 74 is fixed via rotor yoke 73 to the surface 502*b* for fixing magnet, and the rotor assembly 1 plays also the role of rotor of a motor. A stator consisting of a plurality of coils 15 and iron cores 14 is fixed on the base 7 so that it opposes to the rotating magnet 74. Thus the stator and the rotor assembly 1 working also as the rotor of a motor complete a spindle motor. The structure of a disc device incorporating a spindle motor having the integrated rotor assembly 1 remains the same as that described in the embodiments 1 and 2; so, the operating principle also remains the same. Therefore, duplicating description is omitted here.

Figure 20A:
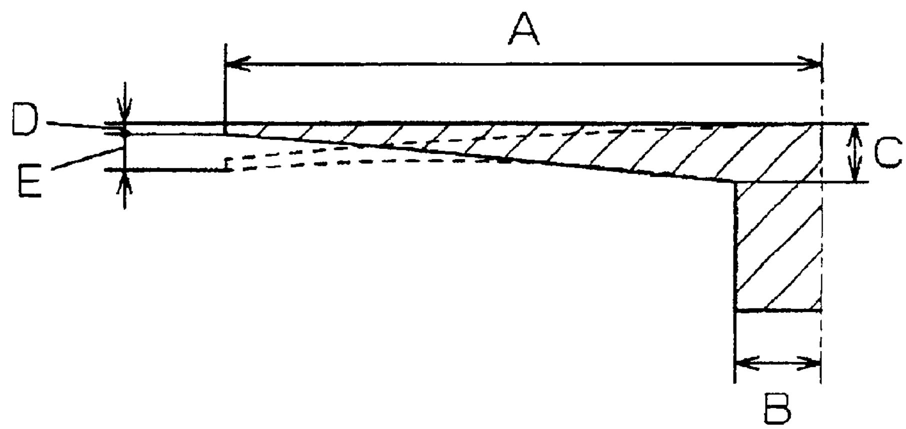
FIG. 20(*a*) Cross sectional views showing the shape of a conventional magnetic disc substrate and that of a state deformed by a shock, used to compare the anti-shock property.
Figure 20B:
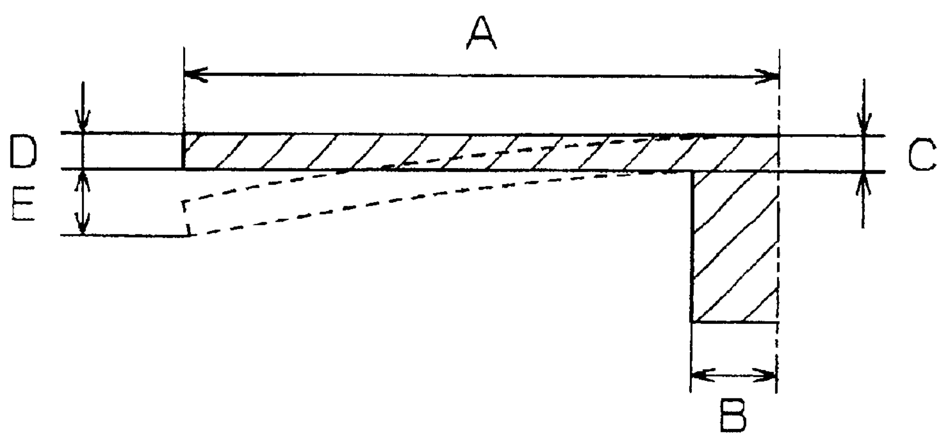

Now in the following, the anti-shock property of the rotating disc in the present embodiment 3 is compared with that in the embodiments 1 and 2. For the sake of a simplified calculation, the comparative samples were provided in the configurations as shown in FIG. 20. Although the drawing shows the sample shapes only in a half section in the radial direction, both the samples have the same overall size and axle shape, etc. The rotating disc in the present embodiment 3 is shown in FIG. 20(*a*), which disc having a thickness 0.4 mm at the edge of the rotating axle (represented as C in the drawing), and 0.1 mm or 0.26 mm at the outer circumference (D); the sample was prepared in two versions for comparison. The disc thickness decreases continuously in a straight-line mode from the outer edge of rotating axle towards the outer circumference edge forming a slope, in both of the two versions. FIG. 20(*b*) shows those discs in the embodiments 1 and 2; none of them assume sloping surface. The disc thickness remains even at 0.2 mm from the inner part (C) whole through the outer part (D).

TABLE 2

Overall dimensions and of samples Characteristic values of Samples.

| | | Discs in the present embodiment 3 | | Existing disc |
|---|---|---|---|---|
| | | Sample (a1) | Sample (a2) | Sample (b) |
| Dimensions | A(mm) | 11.5 | 11.5 | 11.5 |
| | B(mm) | 1.75 | 1.75 | 1.75 |
| | C(mm) | 0.4 | 0.4 | 0.2 |
| | D(mm) | 0.1 | 0.26 | 0.2 |
| Characteristic values | Amount of flexion at the circumferential edge: E (μm) | 17 | 20 | 70 |
| | Max. tensile stress (N/m m$^2$) | 12 | 19 | 49 |
| | Max. compressive stress (N/m m$^2$) | −19 | −28.5 | −57 |

Overall dimensions of these samples are shown in Table 2. Those illustrated with dotted lines in FIG. 20 represent a deformation at an impact acceleration 1000G effected perpendicular to the disc surface. Amount of flexion E at the circumferential edge, as well as the tensile stress and the compressive stress are shown in their maximum values also in Table 2.

As seen from Table 2, two sample rotating discs in accordance with the present embodiment 3 produced a flexion of 17 μm (a1), 20 μm (a2), respectively, against an impact acceleration 1000G; while it was 70 μm in the conventional rotating disc. Thus it has been confirmed that the flexion due to impact is significantly less with the rotating discs in the present embodiment 3 as shown in FIG. 20(*a*). The greatest tensile stress is as less as approximately ⅓, the greatest compressive stress approximately ½ that the conventional. Amount of flexion E at the circumferential edge has been lowered to approximately ¼, so the deformation in the whole surface of disc portion can be lowered accordingly. Thus, a possibility of collision between head slider and disc is reduced further from that which would arise among the discs in the embodiments 1 and 2. Besides, a variation in the reproducing output from a head is also reduced. Also, since both the greatest tensile stress and the greatest compressive stress have been lowered, the discs in the present embodiment 3 are more resilient against breakage caused by a pulling force or a compressive force, as compared to the conventional ones. Thus it contributes to implement a light and slim disc device that has a high reliability.

When the thickness D at outer circumferential edge is increased to 0.26 mm or more, the amount of flexion and stress increases; in addition, the power consumption at a spindle motor, or driving means, increases due to an increased weight of the disc portion. On the other hand, if the thickness D at circumferential edge is less than 0.1 mm, it can be broken easily at the edge if it is made of glass or other fragile material. Taking the amount of flexion, stress to be caused on a disc upon impact, the power consumption at driving means, possible breakage due to rough handling, etc. into consideration, the thickness D at the circumferential edge should preferably be within a range from 0.1 mm to 0.26 mm. In the discs greater than 23 mm in diameter, the amount of flexion and the stress increase, while those smaller than 12 mm in diameter may be too small for a required capacity of recording; so, it is preferred that the diameter of discs falls within a range of 12 mm to 23 mm.

Figure 21:
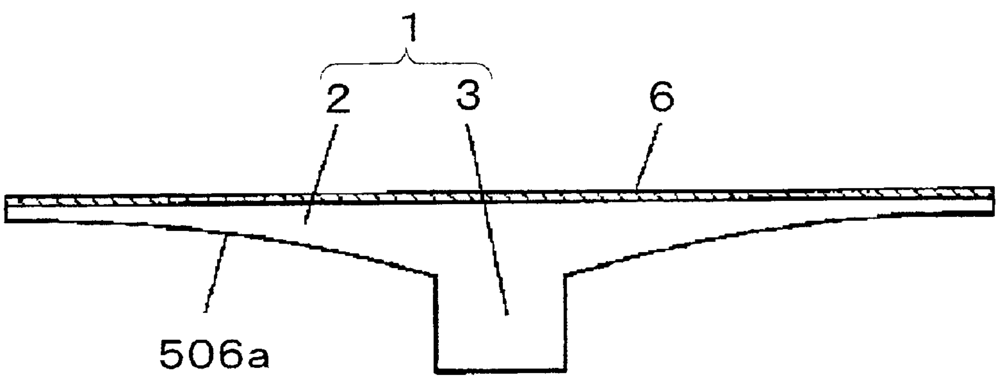
FIG. 21 Cross sectional view showing an example of deformed magnetic disc in embodiment 3.

Although the description has been based on a rotor assembly (rotating disc) whose sloping surface is straight lined, the present invention is not intended to limit the shape of rotor assembly as such. For example, a rotor assembly 1 may take a shape as shown in FIG. 21, the slope surface 506*a* of which is continuously curved with the thickness decreasing from a place at the outer circumference of round column 3 towards circumferential edge of disc portion 2. The slope 506*a* may take a stepped arrangement; also, the starting place of slope is not limited to the outer circumference of round column 3, but it may start at a place of certain distance from the outer circumference of round column 3.

Figure 22A:
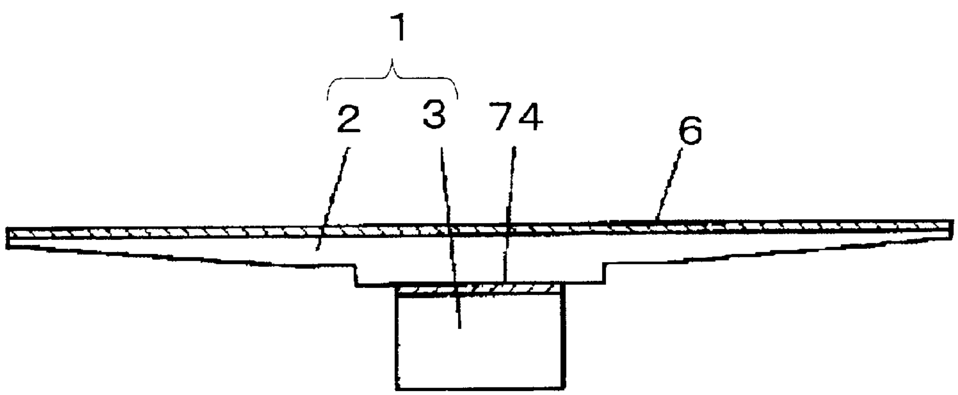
FIG. 22(*a*) Cross sectional view of a magnetic disc in embodiment 3.
Figure 22B:
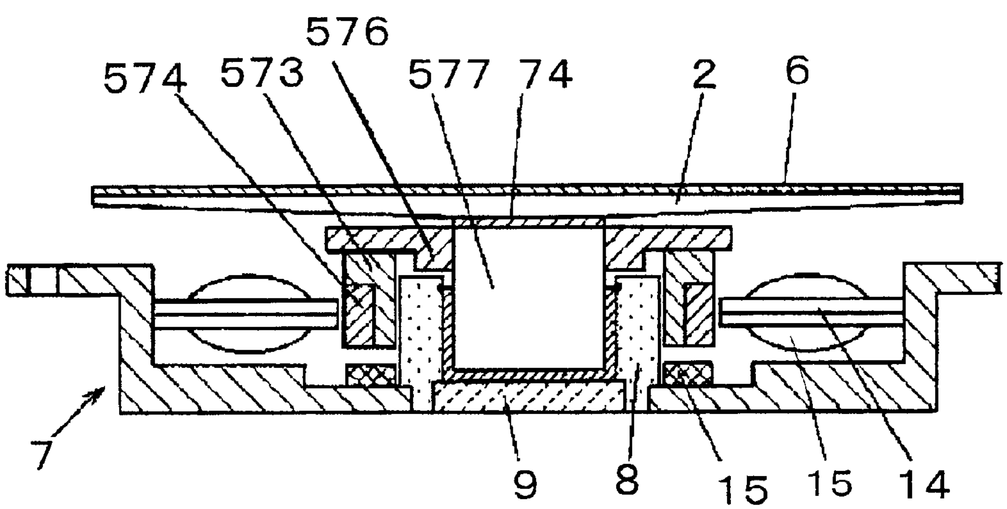

Although in the present embodiment 3 the description has been based on an integrated rotor assembly 1 formed of a round column 3 and a disc portion 2 made of the same material, it is not the intention of the present invention to limit a configuration of rotor assembly to such a structure. For example, a disc and an axle may be manufactured separately to be unitized together into a disc portion 2 at a later stage by means of a junction area or a junction material, or by insert formation, etc., as shown in FIG. 22. On one surface of the disc portion 2 an information recording layer 6 of magnetic body is provided to complete a finished rotor assembly 1. As for the means for connection, gluing with a commonly used adhesive agent, depositing, welding, or anode bonding and the like direct bonding process may be used.

FIG. 22(*b*) is a cross sectional view showing a spindle motor incorporating the rotor assembly of the present example. A turntable 576 and a rotating axle 577 are disposed so that they share a common upper surface plane, or the rotating axle 577 is slightly extruding above the turntable 576. For the rest part, it remains the same as that in the embodiment 1. The structure and the operation of the present disc device incorporating the rotor assembly are almost identical to those of the other examples described in the embodiment 2. So, the respective identical parts are represented by using the same symbols, and detailed description of which is omitted here.

Although the above descriptions have been based on a rotating disc (rotor assembly) consisting of a disc portion and a round column, the round column may be replaced with a rotating cylindrical portion, like in the embodiment 2. The latter configuration of course provides the same advantage as that of the present embodiment 3.

The foregoing descriptions have been based on a spindle motor of the inner rotor configuration which comprises a rotor consisting of a disc portion and a rotating magnet, etc., and a stator which is formed of a coil, iron core, etc. However, the present invention is not intended to limit the type of a motor to the inner rotor type. The present invention may of course be applied to those devices incorporating an outer rotor type spindle motor, or a coaxial motor.

As described in the foregoing, magnetic discs in the present embodiment 3 are thinner, more compact and lighter in weight as compared with the conventional discs. However, the amount of flexion due to impact is smaller, also both the greatest tensile stress and the greatest compressive stress are smaller with the discs in embodiment 3; which means that they are not easily broken. Furthermore, since the discs take a simple round disc shape, the magnetic disc substrates can be easily provided by a press formation or the like process. Still further, a disc device incorporating the present magnetic disc can eliminate a clamping component, so the device thickness can be reduced a step further. Still further, since there is a modification only in the axle and the turntable of driving means, the already existing assembling facilities may be used as they are.

(Embodiment 4)

A point of significance in a fourth exemplary embodiment of the present invention is in the shape of disc portion. A disc portion 2 in embodiment 4 is provided on the main surface (the surface without having axle) with a protrusion 27 formed of the same material as the rotating disc (also called as rotor assembly 1). The protrusion 27 is provided aiming to prevent the rotating disc from withdrawing; thereby preventing a possible collision between the information recording surface and the head to be caused by a mechanical shock given from the outside.

Figure 23A:
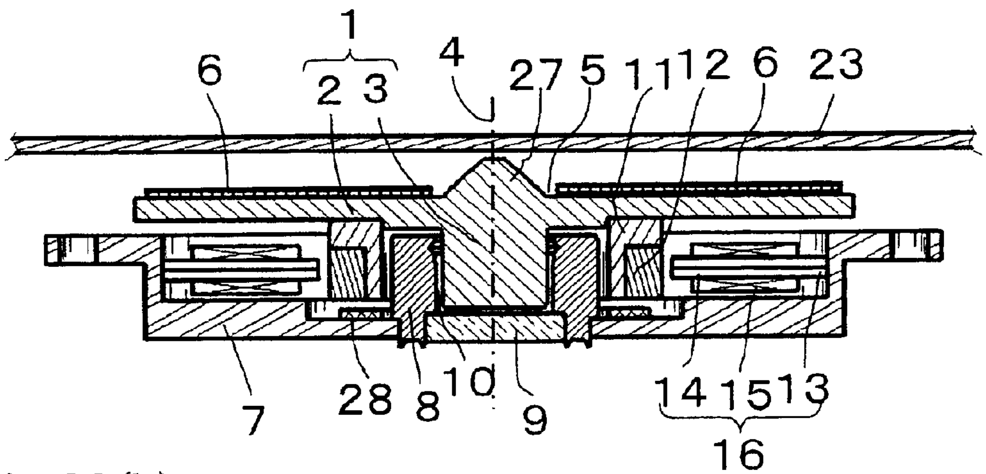
FIGS. 23(*a*), (*b*), (*c*) Cross sectional views respectively used to describe the structure of information-recording/-reproducing devices in accordance with a fourth exemplary embodiment of the present invention.
Figure 23B:
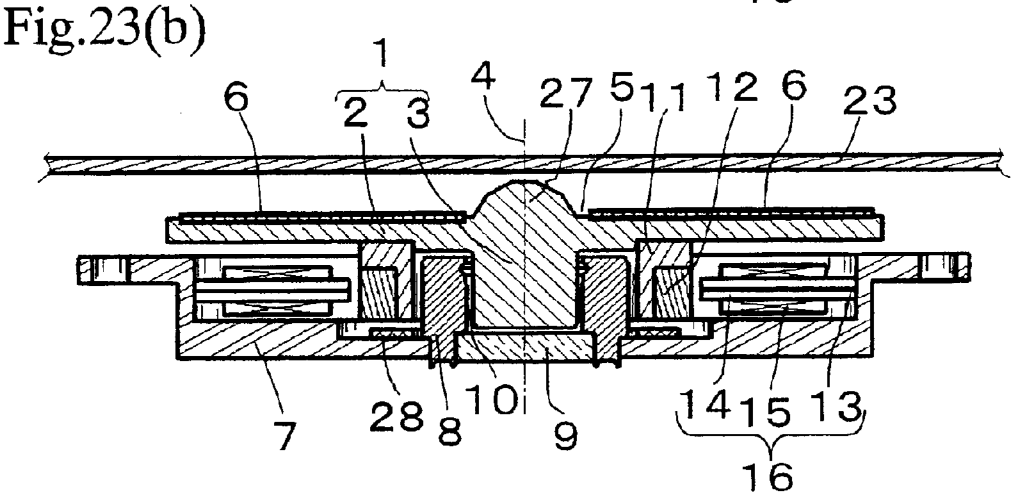
Figure 23C:
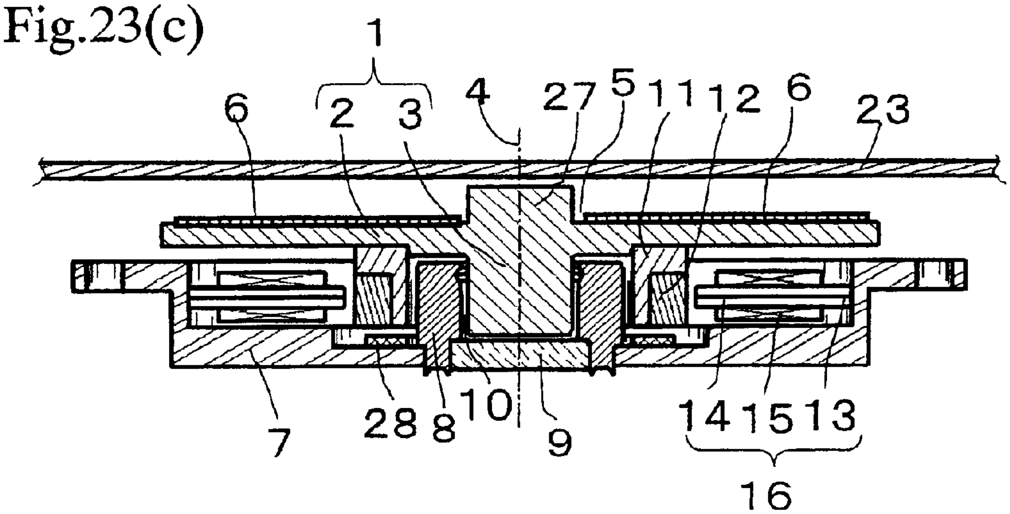

FIG. 23 shows cross sectional views of exemplary spindle motors in embodiment 4 used in disc devices.

As shown in FIG. 23, an integrated rotor assembly 1 is formed of a disc portion 2 and a round column portion 3 using, for example, glass, liquid crystal polymer, PPS (polyphenylene sulfide), or the like thermoplastic material, or an Al alloy metal. The round column 3 is connected to the disc portion 2 at the center of a surface opposite to the main surface, with the center axis in coincidence with the rotating axis 4 of rotor assembly 1 and it is crossing at right angle with the main surface 5 of disc portion 2. The main surface 5 of disc portion 2 is provided at the center with a protrusion 27 formed of the same material as the rotor assembly 1. On the flat surface of disc portion excluding the central part and the outer circumference, a layer of information recording medium (information recording layer 6) is provided in a round rink layout. The information-recording layer 6 is provided with a plurality of information recording tracks formed concentric.

In the rotor assembly 1, the disc portion 2 is provided with a round stepped portion on a surface opposite to the main surface having the protrusion 27. The round stepped portion is formed at the center of the surface having round column 3, with the thickness of disc in that area being thicker than the rest part. A ring-shaped rotating magnet 12 is fixed via rotor yoke 11 to the stepped portion. The rotor assembly 1 functions also as the rotor of a motor. A stator 16 formed of a plurality of iron cores 15 wound around with coils 14 is fixed on a base 7, keeping a certain specific gap to the rotating magnet 12. A cylindrical bearing sleeve 8 with the one end sealed with a thrust support plate 9 is fixed on the base 7 at the center. The bearing sleeve 8 supports the round column 3 of rotor assembly 1 to be freely rotatable. A finished spindle motor is thus assembled. Although it is not shown in the drawings in FIG. 23, groove for dynamic pressure generating is provided on a thrust surface opposing to the thrust support plate 9 and on the inner circumferential surface of bearing sleeve 8 opposing to the outer circumferential surface of round column 3. On the surface of base 7 facing the disc portion 2, a ring-shaped thrust attraction plate 28 is fixed so that it opposes to the end face, in the base 7 side, of rotating magnet 12. The structure and the operation of a disc device incorporating the spindle motor that employs the integrated rotor assembly 1 are almost identical to those in the embodiment 1. The respective identical parts are represented by using the same symbols, and detailed description is omitted here.

FIG. 23 shows some examples of the shape of protrusion 27; a truncated cone (FIG. 23(*a*), a trapezoid in the cross section), a half ellipsoid (FIG. 23(*b*), a half oval in the cross section), and a round column (FIG. 23(*c*), a rectangle in the cross section). The shape of the protrusion 27 is not limited to the above examples; it may be provided in other shapes, for example, a truncated polygonal cone, a half sphere, a half spheroid, a half polyhedron, a polyhedron of rotation, a drum shape, etc. Although the protrusion 27 has been described to have been formed with the same material as rotor assembly 1, it may be formed using a different material. Or, it may be provided separately using the same, or different, material as rotor assembly 1, and then attached to the rotor assembly 1 by means of gluing, fusing, press-fitting, screwing, etc.

Although the description in embodiment 4 is based on an integrated rotating disc (also called as rotor assembly) formed of an axle portion and a disc portion using the same material, it is not the intention of the present invention to limit the configuration to the above-described. The disc portion and the axle portion may be manufactured separately to be unitized together at a later stage by providing a junction area or using a junction material, or by insert formation in the same way as described in the embodiment 1 referring to FIG. 7. An information recording layer 6 of magnetic body is formed on the flat surface of the disc portion 2 to complete a finished rotor assembly 1. As for the means for connection, gluing with a commonly used adhesive agent, depositing, welding, or anode bonding and the like direct bonding process may be used. Preferred thermoplastic material for the junction material is that which has the glass transition temperature of 200° C. or lower.

Although the description on the above examples has been based on a magnetic disc formed of a disc portion and an axle portion consisting of a round column, the axle portion may be consisting of a rotating cylinder, in the same manner as described in the embodiment 2. Those devices having the latter configuration also provide the same advantage.

Although the foregoing description has been based on an inner rotor type spindle motor formed of a rotor consisting of disc portion, rotating magnet, etc. and a stator consisting of coil, iron core, etc., it is not the intention of the present embodiment 4 to limit a motor to such an inner rotor type. The present invention can of course be applied to the motors of outer rotor type as well as the coaxial type motors.

Figure 24A:
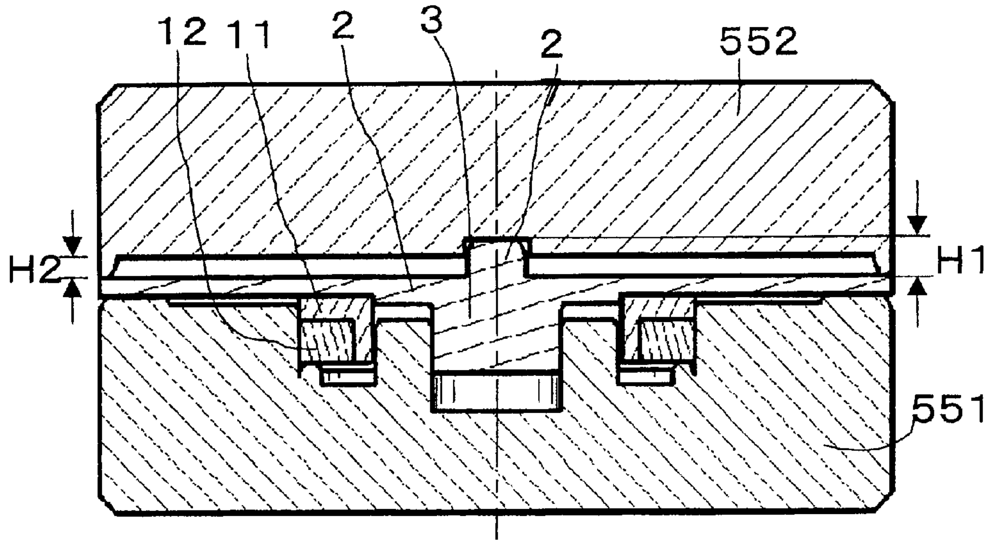
FIG. 24(*a*) Cross sectional view used to describe how a rotor assembly in embodiment 4 is assembled.
Figure 24B:
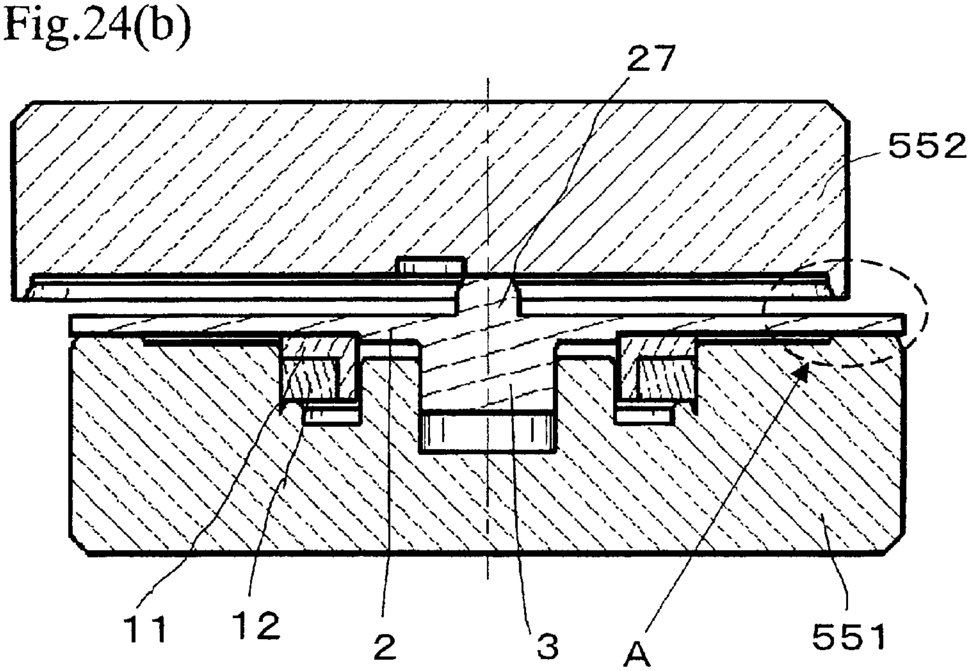

Drawings in FIG. 24 are used to describe a method of assembling a disc portion in accordance with the present embodiment 4. The drawings are provided with focus on the point of difference in relation to the assembly method in the embodiment 1. Referring to FIG. 24(*a*), a rotor yoke 11 and a rotating magnet 12 are placed on a centering jig 551, and a disc portion 2 having protrusion 27 at the center of the main surface is placed on top of them, and then an weight jig 552, or loading means, is placed thereon. These are assembled and connected together for forming a rotor assembly using an adhesive agent, etc. The weight jig has a height H2 of outer circumferential rim that is smaller than a height H1 that represents the height of protrusion 27. By so arranging the weight jig, the outer circumferential rim would not get into a direct contact with the surface of disc portion providing a contamination or a damage thereon, even when the jig is disposed eccentric to the disc portion 2, as illustrated in FIG. 24(*b*).

As described in the foregoing, a disc portion having protrusion at the center of main surface, a rotating axle portion and a bearing portion of a spindle motor with hydrodynamic bearing can be integrated into a single component in accordance with the present embodiment 4. A plurality of components such as shaft, hub, rink form disc, etc., which being indispensable items in the conventional device, can be integrated into a single component. The decreased parts count contributes to a reduced cost. In addition, accumulation of dimensional allowance among the plurality of parts, processing errors and errors in the press-fit height of a shaft into a hub for fixing a rink form disc on the hub, for example, can be avoided. As a result, the gap distance to the protrusion can be reduced to 0.2 mm or smaller. Taking advantage of the improved precision level and the anti-withdrawal effect brought about by the protrusion provided in the disc portion, amount of rotor shift is made smaller, the deviation in the surface as well as the deviation in the rotating axis of the disc can be significantly reduced, as a result the recording density can be increased with ease.

Since the center of information recording layer can be brought to coincide with the center of rotation with a high precision level, deviation in the radial direction can also be suppressed to be very small. Deviation between the center of rotation and the center of a disc under rotating operation can also be suppressed to be very small. Taking advantage of these improvements the recording density can be increased significantly. When the amount of rotor shift is controlled to be small, a head supporting mechanism (gimbaled head assembly) as well as a medium itself can be protected from a possible damage. Also, since the axle hardly withdraws from sleeve, leakage of the lubricant from bearing portion seldom occurs. Still further, the protrusion disposed at the center of the main surface of disc portion contributes to preventing a possible contamination or damage on the information recording layer during a procedure for assembling it to a finished rotor.

(Embodiment 5)

A point of significance in a fifth exemplary embodiment of the present invention is in the shape of disc portion. The disc portion 2 is provided at the outermost circumference, or at the innermost circumference of the central part, with a ramp portion. The ramp portion is intended to provide a magnetic head 24 disposed in a head arm with a shelter from the information recording layer 6. Even in a case when it is affected by a vibration, etc. from outside, a magnetic head under the shelter would not harm the surface of a recording medium, or the surface of magnetic head would not get damaged thereby.

Figure 25:
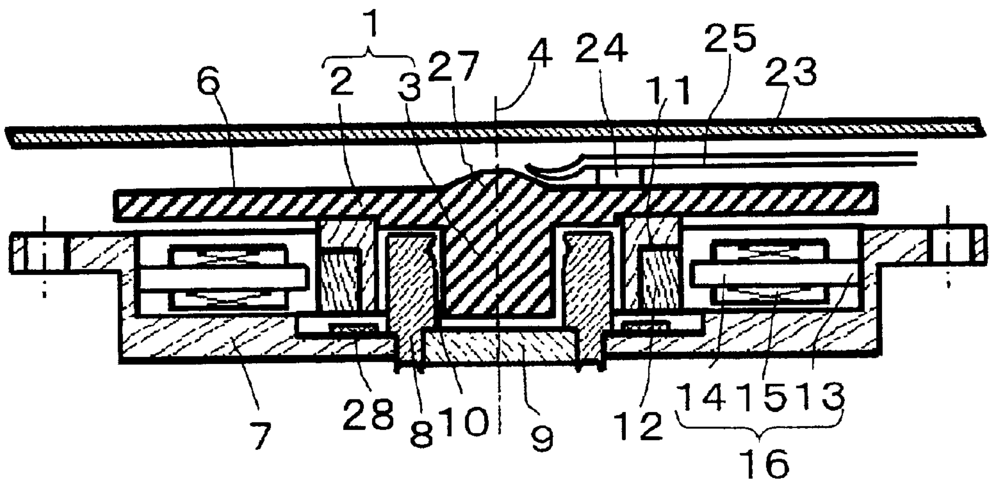
FIG. 25 Cross sectional view used to describe the structure of information-recording/-reproducing device in a fifth exemplary embodiment of the present invention.

FIG. 25 is a cross sectional view showing the structure of spindle motor incorporated in a disc device in accordance with a fifth exemplary embodiment of the present invention.

As shown in FIG. 25, a rotor assembly 1 (also called as rotating disc) is formed of a disc portion 2 and a round column portion 3 working as the rotating axle, manufactured using, for example, glass, liquid crystal polymer, PPS (polyphenylene sulfide), or the like thermoplastic material, or an Al alloy metal. The round column 3 is connected to the disc portion 2 at the center of a surface opposite to the main surface, with the center axis in coincidence with the rotating axis 4 of rotor assembly 1 and it is crossing at right angle with the main surface 5 of disc portion 2.

The main surface 5 of disc portion 2 is provided at the center with a protrusion 27 formed of the same material as the rotor assembly 1. On the flat surface excluding the center and the outer circumference, an information-recording layer 6 is provided in a round rink layout. The information-recording layer 6 has a plurality of information recording tracks formed concentric. The protrusion 27 is provided as the ramp portion in a truncated cone shape where the disc thickness continuously increase towards the innermost. The ramp portion is a place that provides an actuator having magnetic head 24 with a shelter while it is out of recording/reproducing operation.

A disc portion 2 of rotor assembly 1 is provided with a round stepped portion in the central part of a surface having round column 3, the stepped portion having a disc thickness greater than the rest part. A ring-shaped rotating magnet 12 is fixed via rotor yoke 11 to the stepped portion. The rotor assembly 1 thus formed functions also as the rotor of a motor. A stator 16 formed of a plurality of iron cores 15 wound around with coil 14 is fixed on a base 7 keeping a certain specific gap to the rotating magnet 12. A cylindrical bearing sleeve 8 with the one end sealed with a thrust support plate 9 is fixed on the base 7 at the center. The bearing sleeve 8 supports the round column 3 of rotor assembly 1 to be freely rotatable to complete a finished spindle motor. Although it is not shown in the drawing of FIG. 25, dynamic pressure generating means is formed on a thrust surface opposing to the thrust support plate 9 and on the inner circumferential surface of bearing sleeve 8 opposing to the outer surface of round column 3. On the surface of base 7 facing to the disc portion 2, a ring-shaped thrust attraction plate 28 is fixed so that it opposes to the end face in the base 7 side of rotating magnet 12. The structure and the operation of the present disc device incorporating the spindle motor having the unitized rotor assembly 1 are almost identical to those in the embodiment 1. The respective identical parts are represented by using the same symbols, and detailed description of which is omitted here.

Figure 26A:
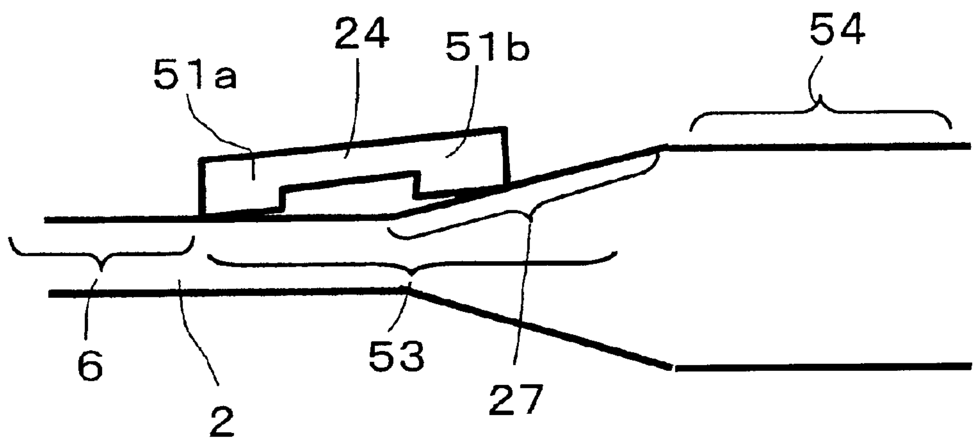
FIG. 26(*a*) Drawing used to describe the operation of head actuator of information-recording/-reproducing device in embodiment 5.
Figure 26B:
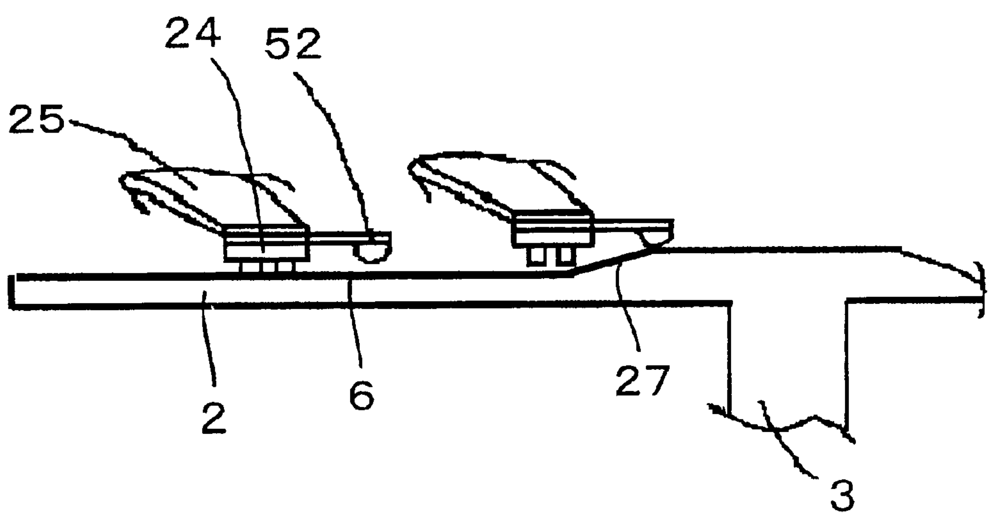

FIG. 26(*a*) illustrates a process how a pressure of magnetic head 24 on the information recording layer 6 is alleviated during sheltering; where, a magnetic head 24 disposed at an end of head actuator arm is provided with protrusions 51*a* and 51*b*, and the protrusion 51*b* is riding on the ramp portion 27 of truncated cone shape when the magnetic head 24 proceeds to a pause section 53. FIG. 26(*b*) shows other example of the protrusion, a protrusion 52 having different shape attached at the tip end of a head actuator arm; which protrusion 52 is riding on the ramp portion 27 of truncated cone shape when the magnetic head 24 is sheltering, so that a pressure of magnetic head 24 on the information recording layer 6 is alleviated, or it is kept away from the information recording layer 6.

As seen in FIGS. 26(*a*), (*b*), a disc device in embodiment 5 is structured so that a magnetic head 24 rides on the truncated cone ramp 27 while it is out of operation; so, the contact between disc portion 2 and magnetic head 24 is limited to a minimum. This contributes to minimize a possibility of getting damage on the surface of recording medium or on the surface of magnetic head, due to vibration, etc. exerted from outside. Furthermore, since a magnetic head 24 out of operation is not in a position of conducting data recording/reproducing, the data stored in the disc is not impaired even if the magnetic head 24 gets in contact with the surface of information medium at the time of stop/start. Thus the disc device of the present invention has a high reliability.

Although the description in embodiment 5 is based on an integrated magnetic disc substrate and rotating disc (also called as rotor assembly) formed of an axle portion and a disc portion made of the same material, it is not the intention of the present invention to limit the configuration to the above-described. The rotating disc and the axle portion may be manufactured separately to be unitized together at a later stage into a disc portion 2 by providing a junction area or using a junction material, or by insert formation in the same way as described in the embodiment 1 referring to FIG. 7. An information recording layer 6 of magnetic body is formed on the flat surface of the disc portion 2 to complete a finished rotor assembly 1. As for the means for connection, gluing with a commonly used adhesive agent, depositing, welding, or anode bonding and the like direct bonding process may be used. Preferred thermoplastic material for the junction material is that which has the glass transition temperature of 200° C. or lower.

Although the description on the above examples has been based on a magnetic disc which is formed of a disc portion and a round column working as the axle, the axle portion can be a rotating cylinder, as described in the embodiment 2. The latter configuration of course provides the same advantages of embodiment 5.

Although the foregoing descriptions have been based on an inner rotor type spindle motor formed of a rotor consisting of disc portion, rotating magnet, etc. and a stator consisting of coil, iron core, etc., it is not the intention of the present embodiment 5 to limit the type of a motor to the above described. The present invention can of course be applied on the outer rotor type motors and the coaxial type motors.

As described in the foregoing, a disc portion having ramp portion of truncated cone shape provided in an area inner of the information recording region, a rotating axle portion and a bearing portion of a spindle motor having a hydrodynamic bearing can be unitized into a single component in accordance with the present embodiment 5. A plurality of components such as a shaft, a hub, a rink form disc, etc., which are the items indispensable in the conventional structure are integrated into a single component. The decreased parts count contributes to a reduced cost, and accumulation of dimensional allowance among the plurality of parts, processing errors and errors in the press-fit height of a shaft into a hub for fixing a rink form disc on the hub, for example, can be avoided. As a result, the deviation in the rotating disc surface and the deviation in the rotating axis are significantly reduced. The ramp portion of a truncated cone shape provided in an area outside or inside, the information-recording region of disc portion contributes to prevent a possible collision between head portion and information recording portion due to vibration, etc. Thus a head supporting mechanism (gimbaled head assembly) as well as a recording medium itself can be protected from getting damaged or destructed. These altogether increase the recording density and the reliability.

(Embodiment 6)

Figure 27:
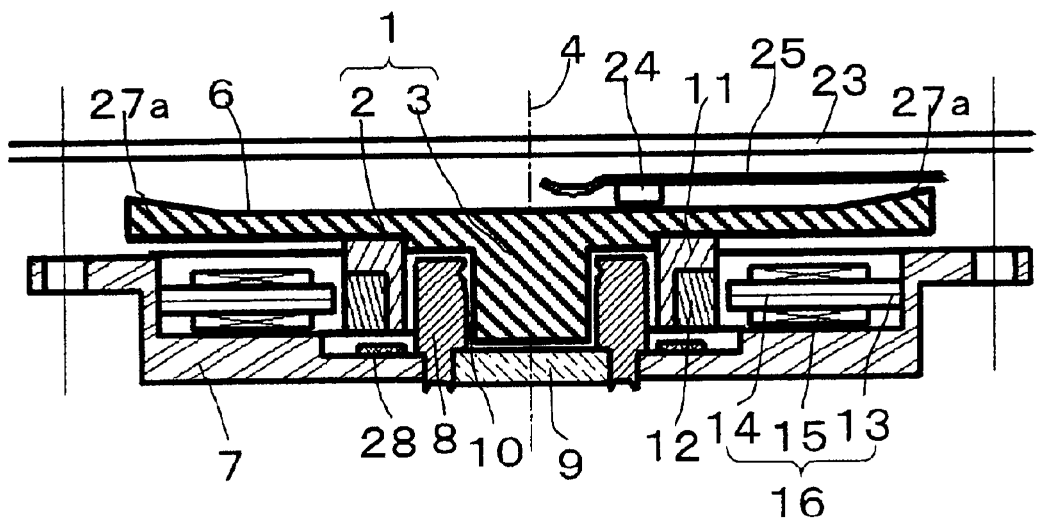
FIG. 27 Cross sectional view used to describe the structure of information-recording/-reproducing device in accordance with a sixth exemplary embodiment of the present invention.

FIG. 27 is a cross sectional view showing the structure of a disc device in accordance with a sixth exemplary embodiment of the present invention. In FIG. 27, those portions having identical functions as those in the embodiment 5 are represented using the same symbols as in FIG. 25.

Different from the disc portion 2 in the embodiment 5, the present disc portion 2 in embodiment 6 is provided with a slop ramp in the outer circumference, where the disc thickness continuously increases towards the outermost of the information recording layer 6; while in the embodiment 5 a ramp portion of truncated cone shape is provided at the central area inside the information recording layer 6, where the disc thickness continuously increases towards the center. The surface of disc portion 2 having the information-recording layer 6 appears flat, but it is not totally flat when observed with a microscopic point of view. Like those in the embodiments 1 through 3, the present rotor assembly in embodiment 6 also has a hollow of several $\mu$m's deep in the central part corresponding to a round column disposed underneath. Structure of the rest of the parts remains the same as in the embodiment 5, so duplicated description is omitted here.

The ramp portion provided at the outer edge of disc portion 2 with a continuously increasing disc thickness towards the outermost circumference of information recording region 6 provides the same effects and advantages as those described in the embodiment 5.

Although FIG. 27 illustrates a disc device incorporating an integrated rotor assembly 1 formed of a disc portion 2 having in the outermost circumference outside the information recording portion 6 a slope ramp portion 27*a* where the disc thickness continuously increases towards the outermost and a rotating column 3 provided at the center of other surface of the disc portion 2, it is not the intention of the present invention to limit it to the above-described configuration. For example, a disc device may have instead a rotor assembly 1 whose disc portion 2 has a rotating cylindrical portion in place of the rotating round column 3. A rotor assembly 1 may be formed by unitizing a solid round column 3 made with the same material as the disc portion 2, or a different thermoplastic material or an Al alloy metal, with the disc portion 2 on a surface opposite to the main surface 5 having information recording layer 6 by means of insert formation or the like method. Also, a rotor assembly 1 may be formed by providing the disc portion 2 and the round column 3 separately using either the same thermoplastic material or an Al alloy metal, or, either one item with a thermoplastic material while the other item with a different material, and then unitizing these components together by means of gluing, etc. Or, a rotor assembly 1 may be formed by placing a junction material between a disc portion 2 and a round column 3 for thermal fusing. There may be still other means for providing a rotor assembly. Although FIG. 27 illustrates a disc device incorporating an inner rotor type spindle motor, an outer rotor type or a face coupling type motor may of course be used instead. Furthermore, other disc device may be formed by providing a magnetic head 24 with a protrusion and using the slope ramp 27*a*, 27*b* disposed along the outer edge of disc portion 2 as the ramp portion. In the present embodiment 6, the protrusion provided at the magnetic head 24 rides on the ramp portion locating at the outer circumference, not inner circumference, of disc portion 2 for alleviating a pressure of magnetic head on the recording medium layer 6 or to keep the magnetic head 24 away from the recording medium 6 during sheltering.

As described in the foregoing, in the disc device in embodiment 6 of the present invention, a disc portion, a rotating axle and a bearing portion of a spindle motor having hydrodynamic bearing can be unitized into a single component. A plurality of components such as a shaft, a hub, a rink form disc, etc., which are the items indispensable in the conventional structure are integrated into a single component. The decreased parts count contributes to a reduced cost, and accumulation of dimensional allowance among the plurality of parts, processing errors and errors in the press-fit height of a shaft into a hub for fixing a rink form disc on the hub, for example, can be avoided. As a result, the deviation in the rotating disc surface and the deviation in the rotating axis are significantly reduced. The slope ramp portion provided in outer circumference of the information recording region of disc portion contributes to prevent a possible collision between head portion and information recording portion due to vibration, etc. Thus a head supporting mechanism (gimbaled head assembly) as well as a recording medium itself can be protected from getting damaged or destructed. These altogether increase the recording density and the reliability.

(Embodiment 7)

Figure 28:
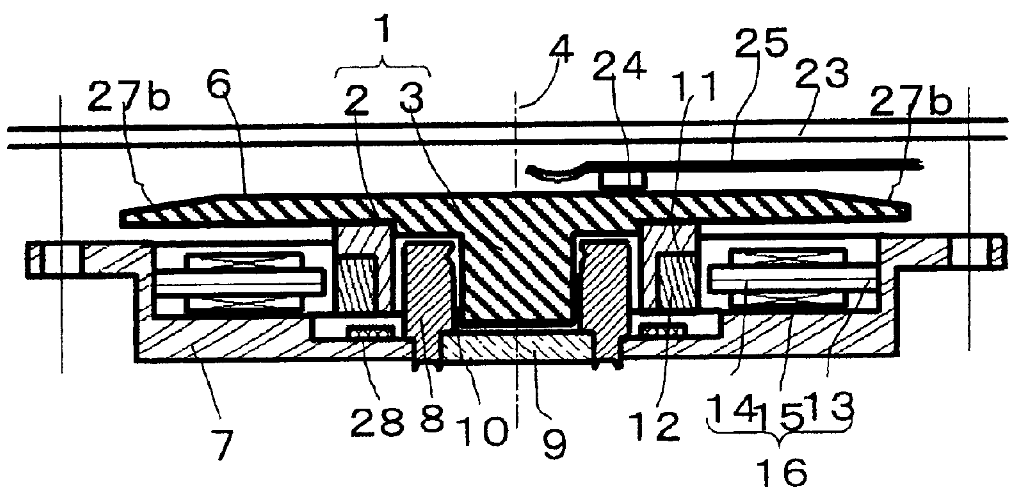
FIG. 28 Cross sectional view used to describe the structure of information-recording/-reproducing device in accordance with a seventh exemplary embodiment of the present invention.

FIG. 28 is a cross sectional view showing the structure of a disc device in accordance with a seventh exemplary embodiment of the present invention. In FIG. 28, those portions identical to those in the embodiments 5 and 6 are represented by using the same symbols as those used in FIG. 25 and FIG. 27.

Different from disc portions 2 in the embodiments 5 and 6, the present disc portion 2 in embodiment 7 is provided with a slope ramp at the outer edge where the disc thickness continuously decreases towards the outermost circumference, as illustrated in FIG. 28. The surface of disc portion 2 having the information-recording layer 6 appears flat, but it is not totally flat when observed with a microscopic point of view. Like those cases in the embodiments 1, 2, 3 and 6, there is a hollow of several μm deep also in the present rotor assembly in embodiment 7 at the central part corresponding to a round column disposed underneath. Structures of the rest remain the same as those in the embodiments 5 and 6, so duplicated description are omitted here. The slope ramp which is formed at the outer edge of disc portion 2 with the disc thickness continuously decreasing towards the outermost circumference provides the same effects and advantages as those provided in the embodiments 5 and 6.

Although FIG. 28 illustrates a disc device incorporating an integrated rotor assembly 1 formed of a disc portion 2 having a slope ramp 27*b* provided at the outer circumference of information recording area where the disc thickness continuously decreases towards the outermost and a round column 3 connected at the center of a surface opposite to the main surface of the disc portion 2, it is not the intention of the present invention to limit it to that described above. For example, a disc device may incorporate instead a rotor assembly 1 whose disc portion 2 is provided with a rotating cylindrical portion in place of the rotating round column 3. A rotor assembly 1 may be formed by unitizing a solid round column 3 manufactured separately with the same material as the disc portion 2, or a different thermoplastic material, with a disc portion 2 on a surface opposite to the main surface 5 provided with information recording layer 6, by means of insert formation or the like method. Or, a rotor assembly 1 may be formed by providing the disc portion 2 and the round column 3 separately using either the same thermoplastic material, or either one of them with a thermoplastic material while the other item with a different material, and then unitizing these together by means of gluing, etc. Other example of forming a rotor assembly 1 is connecting them together by thermal fusion placing a junction material between the disc portion 2 and the rotating column 3. There may be still other means for providing a rotor assembly. Although FIG. 28 illustrates a disc device incorporating an inner rotor type spindle motor, an outer rotor type or a face coupling type motor may of course be used instead.

Although the descriptions on bearing portion has been based mainly on a hydrodynamic bearing working on dynamic pressure generating means and a dynamic pressure lubricant in the embodiments 1 through 7, it is not the intention of the present invention to limit it to the above-described. For example, the bearing portion can be a so-called sliding bearing whose sleeve and thrust support plate are formed of an oil-containing sintered metal.

(Embodiment 8)

Figure 29:
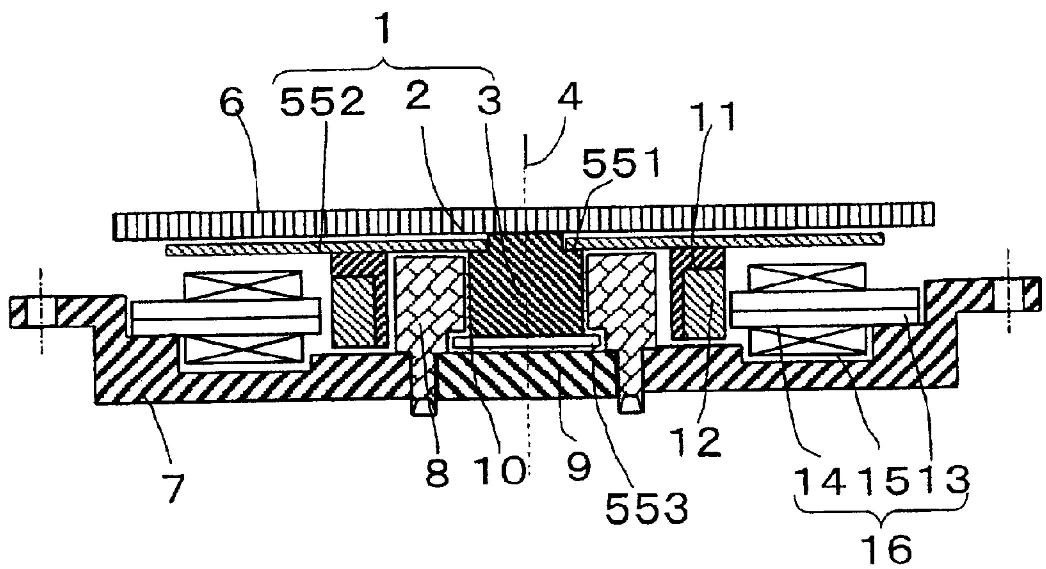
FIG. 29 Cross sectional view used to describe the structure of information-recording/-reproducing device in accordance with an eighth exemplary embodiment of the present invention.

FIG. 29 is a cross sectional view showing the structure of a disc device in accordance with an eighth exemplary embodiment of the present invention.

The rotor assembly 1 in the present embodiment 8 is a partial modification in the structure of the aforementioned embodiments 1 through 7. In FIG. 29, the portions identical to those in the above-described examples are represented by using the same symbols.

A significant point of difference in the present embodiment 8 from the other examples is that the disc portion 2 is formed in a totally round plate and that a rotor yoke 11 for fixing a rotating magnet 12 thereon is not attached direct to a surface of disc portion 2 opposite to the main surface, but the rotating axle 3 is provided at a place adjacent to a part for engagement to the disc portion 2 with a step in the circumferential edge, which edge forming a pedestal 551, a round yoke support plate 552 for mounting a rotor yoke 11 thereon and having a hole at the center is engaged to the pedestal 551, and then the disc portion 2 and rotating axle 3 at the end face at the pedestal 551 side are glued together after centering the disc portion 2 with the rotating axis 4. Thus the components are integrated to form an integrated rotor assembly 1. The above-described structure can suppress an adverse influence caused by distortion due to expansion/shrinkage arising out of the result of fixing a rotor yoke to a disc portion 2 in an area corresponding to the recording medium 6. This leads to an increased recording density.

Another point of significant difference is that the rotating axle 3 is provided at the other end face having no pedestal with a round thrust flange 553 having a diameter greater than that of rotating axle 3 fixed concentric to the rotating axis 4. The thrust flange 553 is provided on the surface opposing to the thrust plate 9 with groove for dynamic pressure generating similar to that shown in FIG. 4. The thrust flange 553 is also provided with other grooves for dynamic pressure generating in a rink form area on the surface extruding from the rotating axle 3, not facing to the thrust plate 9. The groove for dynamic pressure forming and a dynamic pressure lubricant 10 constitute a hydrodynamic bearing in the thrust direction, which insures a smooth rotation of the round column portion. In a rotor assembly of the above structure, the dynamic pressure generating portion can be provided for a greater area on the surface opposing to the thrust plate; in addition, another hydro-dynamic bearing is formed in the thrust direction between a stepped part formed in the bearing sleeve and the dynamic pressure generating portion provided on the surface of thrust flange 553 extruding from rotating axle 3. Therefore, the deviation in the rotating surface can be suppressed effectively.

The dynamic pressure generating portion may be provided instead on the thrust plate 9 in the surface opposing to the thrust flange 553, or on the bearing sleeve 8 in the surface opposing to the portion of thrust flange 553 extruding from the rotating axle 3.

Figure 30A:
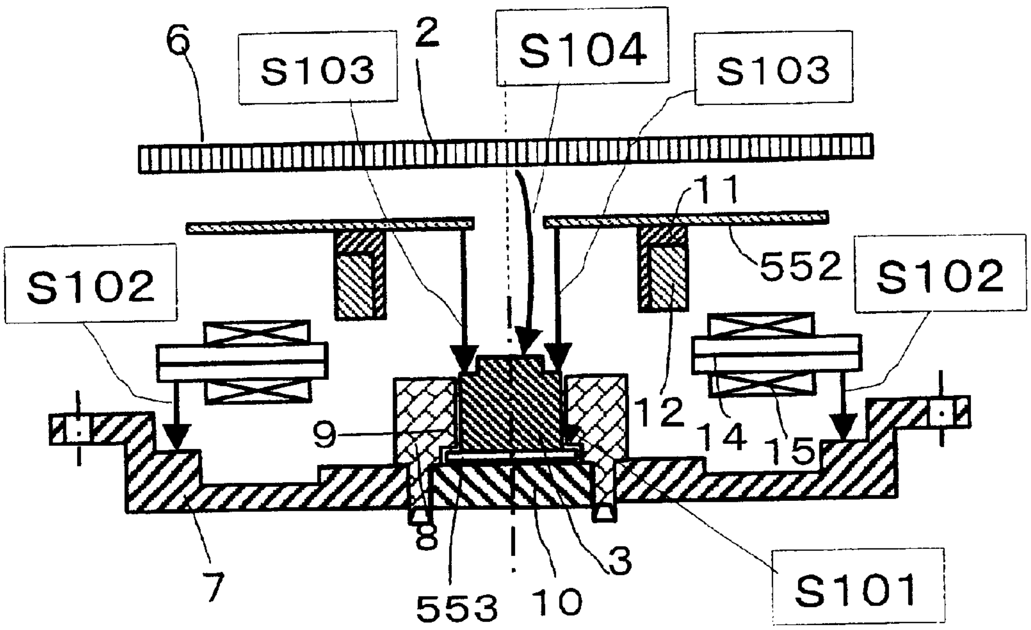
FIG. 30(*a*) Outline drawing used to describe how an information-recording/-reproducing device in embodiment 8 is assembled.
Figure 30B:
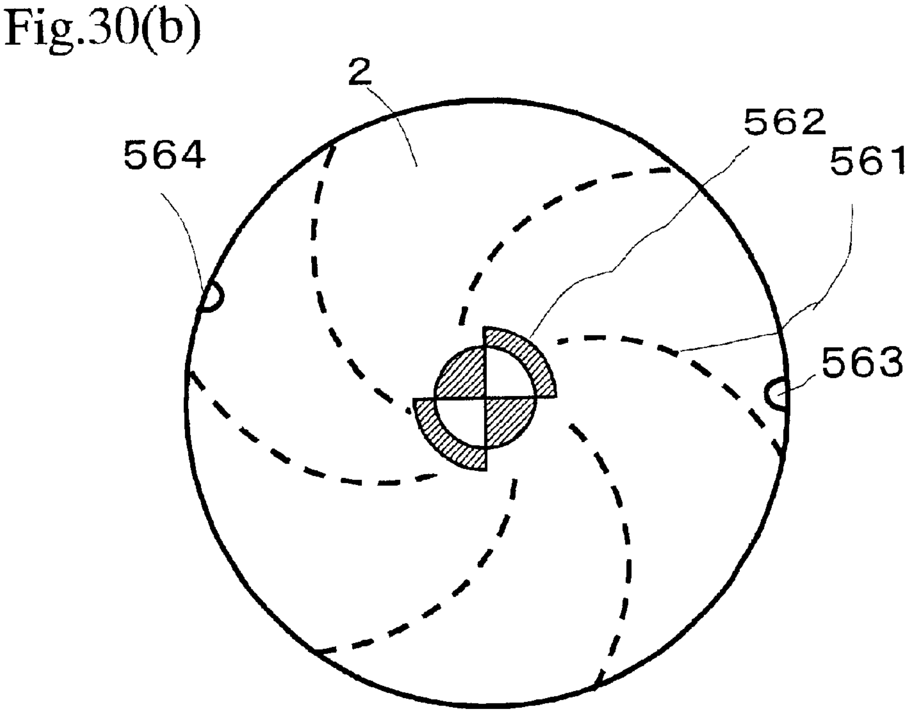

A rotor assembly in the present embodiment 8 is assembled through a procedure different from that described in the embodiment 1. FIG. 30(*a*) illustrates how a spindle motor, including a rotor assembly, for use in a disc device is assembled; in the model steps S101 through S104. In the first place, a round thrust flange 553 and a rotating axle 3 are fixed together concentric to the rotating axis 4; next, it is inserted in a bearing sleeve 8 and then fixed on a base 7 having a thrust plate 10 to a predetermined place by means of press-fitting, welding or the like process. The gap of bearing portion is filled with a dynamic lubricant 9 in a vacuum environment (S101). A stator formed of iron core 14 wound around with coil 15 is attached on the base 7 (S102). A round yoke support plate 552 having a hole at the center is mounted with a rotor yoke 11 and a rotating magnet 12 at the respective places; which is then fixed to the rotating axle 3 at the pedestal 551 (S103). The rotating axle 3 is glued at the end face having the pedestal 551 side to the disc portion 2 concentric with the rotating axis 4 (S104) to complete a finished spindle motor. The order of the step 101 and the step 102 may be reversed each other.

In the step S101, connection of the thrust flange 553 and the rotating axle 3 may be conducted in various ways depending on the kind of respective materials used. Generally speaking, connection by fusion is preferred to gluing.

FIG. 30(*b*) shows an example of disc portion 2 provided with a phase marker as an auxiliary means for aligning the disc portion 2 and the rotating axle 3 to be concentric with the rotating axis 4 in the assembly step S104. The phase marker can be provided by applying a mask when a layer of medium such as a magnetic layer or a protection layer is formed on the disc portion 2. A disc portion 2 is provided in advance with a plurality of servo patterns 561 recorded by a known magnetic transcribing process, or other method, rotation symmetrically in the information recording region to be used for the place setting at recording/reproducing of information. The disc portion 2 is determined in the phase using a disc inner circumferential marker 562 and a disc outer circumferential marker 563, 564. Further, the center of disc portion 2 and the center of servo pattern 561 are made to be concentric by detecting the outer circumference of the disc portion 2 by a mechanical or an optical method. When fixing a disc portion 2 having a servo pattern already recorded on the rotating axle 3, the phase setting and the centering are conducted following the same principle used earlier for recording the servo pattern 561. In this way, the rotating axis 4 of the rotating axle portion 3 can be aligned to be concentric with the center of servo pattern 561 recorded in the disc portion 2. Or, instead of using the inner circumference marker 562, the two outer circumference markers 563 and 564 can be used for aligning. In this case, however, the two markers 563 and 564 need to be located at respective places not symmetric to each other.

The above description has been based on a supposition that a servo pattern 561 was already recorded in the disc portion 2. However, when using a so-called servo track writer like in the conventional known technology, where a head arm unit (not shown) is moved forcedly for recording a servo pattern after a disc portion 2 and a recording/reproducing head (not shown) are attached, it is not necessary to use the disc inner circumference marker 562 or the disc outer circumference marker 563, 564.

The material and the method for assembling and fixing a disc portion 2, a rotating axle 3, a yoke support plate 552 and a thrust flange 553 described earlier in the embodiments 1 through 7 may be used also in the present embodiment 8 subject to necessary adaptations.

As described in the above, in a disc device in the present embodiment 8, a disc portion 2 is formed of a round plate, a round yoke support plate having a hole at the center is engaged to the pedestal of rotating axle, a rotor yoke is fixed to the yoke support plate, and the disc portion is connected glued with the rotating axle at one end face to be concentric with the rotating axis. Meanwhile, the rotating axle is provided with groove for dynamic pressure generating at the other end face, and a round thrust flange having a diameter greater than that of rotating axle fixed concentric with the rotating axis. The above configuration can suppress an adverse influence caused by distortion due to expansion/shrinkage arising out of the result of fixing a rotor yoke to a disc portion in an area corresponding to the recording medium. This leads to an increased recording density. Furthermore, since the dynamic pressure generating means can have a greater area in the surface opposing to the thrust plate, the deviation in the rotating disc can be suppressed quite effectively.

(Embodiment 9)

Figure 31:
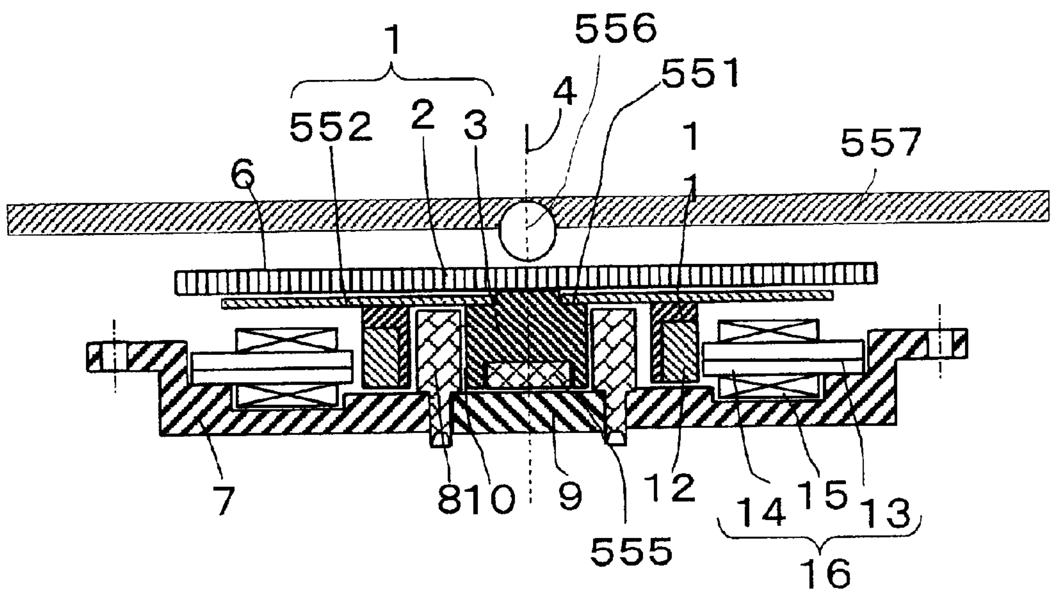
FIG. 31 Cross sectional view used to describe the structure of information-recording/-reproducing device in accordance with a ninth exemplary embodiment of the present invention.
Figure 32A:
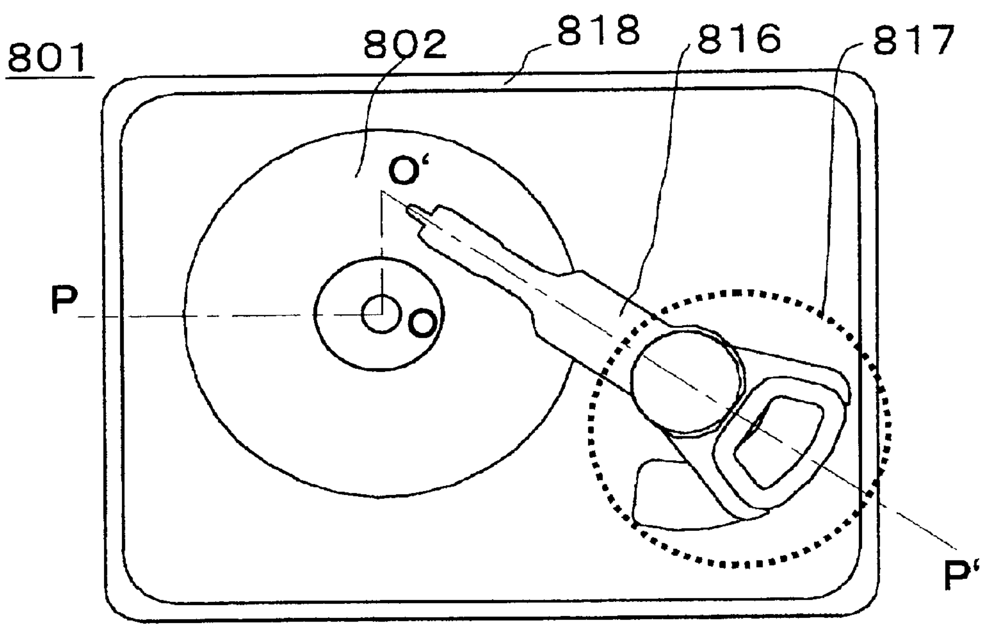
FIG. 32(*a*) Plan view showing a conventional information-recording/-reproducing device.
Figure 32B:
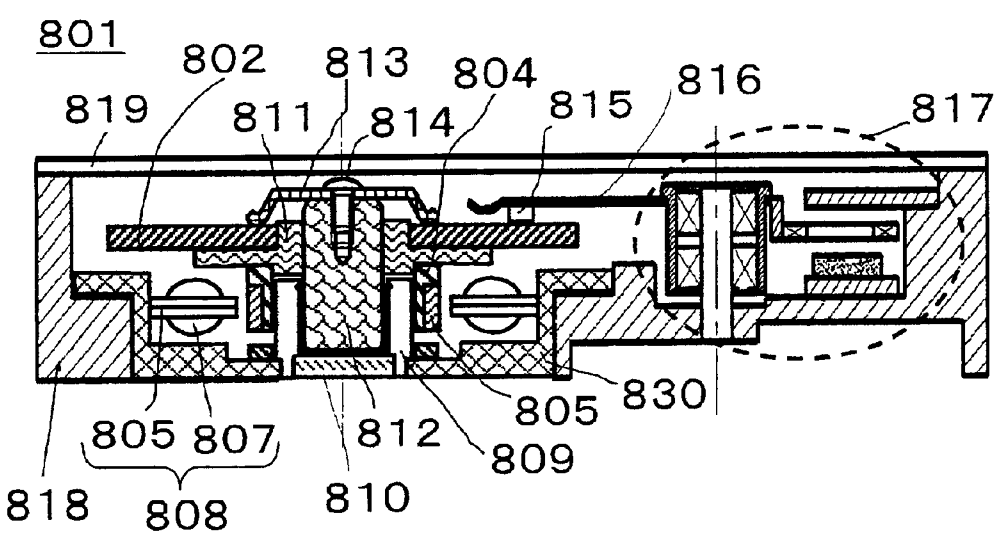

FIG. 31 is a cross sectional view showing the structure of a disc device in accordance with a ninth exemplary embodiment of the present invention.

The rotor assembly 1 in the present embodiment 9 is a partial modification in the structure of the aforementioned embodiments 1 through 8. In FIG. 31, the portions identical to those in the above-described examples are represented by using the same symbols.

In the present embodiment 9, the disc portion 2 is formed, like in the embodiment 8, with a round disc, a round yoke support plate 552 having a first hole at the center is engaged to the pedestal 551 which is provided in the rotating axle 3, a rotor yoke 11 is fixed to the yoke support plate 552 and then the disc portion 2 and one end face of the rotating axle 3 are glued together after making these concentric with the rotating axis 4.

A significant point of difference from the other examples is that the rotating axle 3 in the present embodiment 9 is provided at the other end face having no pedestal 551 with a second hole of certain specific diameter, and a round magnet plate 555 is fitted in the hole concentric with the rotating axis 4. The other end face of rotating axle 3 opposing to a thrust plate 9 is provided also with groove for dynamic pressure generating in an rink-shaped area without having the round magnet plate 555. The groove for dynamic pressure generating may be provided instead on the thrust plate. The groove for dynamic pressure generating and a dynamic pressure lubricant 10 filling the groove constitute a hydrodynamic bearing in the thrust direction for rotating the round column 3 smoothly. When the thrust plate 9 is formed of a magnetic material, the round magnet plate 555 produces a thrust attraction force, which means there is no need of producing a thrust attraction force by means of a thrust attraction plate and a rotating magnet 12 as described in the embodiments 1 through 7.

Furthermore, while the deviation in the rotating surface due to tilting of rotating axle 3 was suppressed in the radial hydrodynamic bearing of conventional spindle motors, where a rotating axle is supported at the outer circumferential surface, by using an axle of longer length, a spindle motor in the present embodiment 9 is provided with a thrust attraction force working at the central part in the rotating axis (in other examples, a thrust ring is provided in a circumference outer than a bearing sleeve 8). Therefore, the structure in the present embodiment 9 is more effective in suppressing the deviation in the rotating surface. Describing more in detail, in the configuration where a magnetic attraction means is disposed in a place outer than a bearing sleeve 8, when a rotor assembly is tilted by an external vibration, etc. to a certain direction of rotating phase, distance between the thrust plate and the attracting magnet in that phase is narrowed to an increased magnetic attraction force. The tilting force gets greater accordingly. As a result, it turns out to be necessary to provide a moment that is sufficient to cancel the tilt of rotating axle 3 caused by the variation in the magnetic attractive force, in addition to offsetting the tilt caused by an external force. In the configuration in embodiment 9, however, variation in the gap at the center is negligibly small, so the resultant variation in the attraction force is also negligible. What is needed here is to provide the thrust bearing with a moment that is needed to offsetting the tilt of rotating axle 3 caused by an external factor alone. Thus the deviation in the rotating surface can be suppressed effectively.

Under the above structure, the thrust attraction plate can be replaced with a round magnet plate. Which leads to a reduced size and pieces of components and to a spindle motor still thinner design.

The round magnet plate 555 should preferably be laid in the rotating axle 3 in the hole provided at one end face having no pedestal to be fixed in there by the magnetic force. However, considering the mutual influence between magnetic material and lubricant 10, the magnet may be fixed by adding an adhesive agent.

Referring to FIG. 31, a small ball 556 disposed on the disc portion at the center is aimed to prevent the disc portion 2 from withdrawing. The small ball 556 is expected to provide the same effect as a protrusion provided on the main surface of disc portion at the center, as described in the embodiment 4. A lid 557 of case opposes to the disc portion 2 and is provided with a dent for keeping the small ball at the place crossing with the rotating axis 4. The small ball 556 is staying in the dent, with a clearance of several tens of $\mu$m to the disc portion 2 for not disturbing free rotation of the disc portion 2. In place of the small ball 556, a spherical protrusion or a round cone shape protrusion may be formed on the lid 557. These anti-withdrawal means may of course be applied to disc devices described in the embodiments 1 through 3.

Material and method of assembling and fixing a disc portion 2, a rotating axle 3, a yoke support plate 552 and a thrust flange 553 as described in the embodiments 1 through 8 may be used also in the present embodiment 9 subject to necessary adaptations.

As described in the above, in a disc device in the present embodiment 9, a disc portion 2 is formed of a round plate, a round yoke support plate having a hole at the center is engaged to the pedestal of rotating axle, a rotor yoke is fixed to the yoke support plate, and the disc portion is glued with the rotating axle at one end face to be concentric with the rotating axis. Meanwhile, the rotating axle is provided with a round magnet plate 555 laid in at the other end face to be concentric with the rotating axis 4. The round magnet plate 555 produces a thrust attraction force at the central part of rotating axle when the thrust plate 9 is made of a magnetic material. With this configuration, the deviation in the rotating surface of disc portion can be suppressed more effectively as compared to other examples in which a thrust attraction plate is disposed in a ring arrangement opposing to a rotating magnet. The thrust attraction plate can be eliminated to a reduced parts count. In addition, elimination of a space occupied by the thrust attraction plate enables to design a disc device in a slimmer shape.

In the foregoing embodiments 1 through 9, some of the application examples of the present invention have been described. Now in the following, some more description will be made on the materials and the common formation/assembly method of the present invention. A rotor assembly (also called as rotating disc) of the present invention formed of a disc portion and a rotating column, or a rotating cylindrical portion, can be manufactured through a press formation method. A press mold is made of such master materials as tungsten carbide, cermet, zirconia, silicon carbide, or other ceramic materials. The most preferred, among others, is a super hard alloy made mainly of fine grains of tungsten carbide containing metal coupling phase formed of cobalt or the alloy. It is preferred that content of the coupling phase metal is 2–10 weight %; if it is less than 2 weight % the mechanical strength such as anti-breakage property deteriorates, and it easily reveals a bit fault, a tip crack, etc. during machining or surface polishing of a mold. Thus it can not be a material suitable for a press mold for forming glass substrates for magnetic disc. On the other hand, if it is more than 10% by weight the mechanical strength of a mold increases, but it readily gets magnetized because of the coupling phase metal. As a result, particles generated during machining operation tend to stick firmly on the surface of the material causing increased foreign items on the surface. Also, it is easily oxidized easily at a high temperature, so it can not be a material suitable to a press mold for forming glass substrates for magnetic disc.

It is also needed for a press mold of super hard alloy to have a protective surface layer superior in such properties as separation, anti-oxidation and less-reactive, in order to protect the mold itself and avoiding sticking of glass at separation. A thin film of precious metal system alloy containing at least one among the group of elements consisting of platinum (Pt), palladium (Pd), rhodium (Rh), ruthenium (Ru), iridium (Ir), osmium (Os), rhenium (R) and tantalum (Ta) may be used for the protective layer.

The separator needs to contain paraffinic oil and higher fatty acid metallic salt. For the higher fatty acid metallic salt, such metallic salts as lithium, sodium, potassium, magnesium or calcium of the higher fatty acids as myristic acid, palmitic acid, stearic acid, behenic acid are effective. Preferred quantity of the higher fatty acid metallic salt is 1 to 30% by weight in paraffinic oil. Preferred coating thickness of the separator is 0.1 $\mu$m to 0.5 $\mu$m.

Most preferred material for the rotating disc is glass; for example, soda lime glass, aluminosilicate glass, aluminoborosilicate glass and borosilicate glass may be used. Among these glass materials, aluminosilicate glass is preferred, because of its significant anti-alkali resolving property provided by a chemical reinforcement process.

The chemical reinforcement process is performed through an ion exchange method, in which a glass substrate is immersed in a chemical reinforcement liquid melted by heat to have the ion in the surface layer of glass substrate exchanged with ion in the chemical reinforcement liquid. In the ion exchange method, it is immersed in a chemical reinforcement liquid in a temperature range lower than the glass transition temperature (Tg), so that the alkaline metallic ion disposed in the vicinity of a glass substrate surface is replaced with an alkaline metallic ion of a greater ion radius; for example, lithium ion is replaced with sodium ion, or sodium ion is replaced with potassium ion. The increased volume in the ion-exchanged place produces a strong compressive stress in the surface of glass, resulting in a reinforced glass surface.

For the chemical reinforcement liquid, fused salts of potassium nitrate ($KNO_3$), sodium nitrate ($NaNO_3$), potassium carbonate ($K_2CO_3$) or a fused salts of mixture of these salts (e.g. $KNO_3$+$NaNO_3$, $KNO_3$+$K_2CO_3$, etc.) may be used.

As to the temperature of the chemical reinforcement liquid, the higher the better for expediting an ion exchange. However, in view of preventing deformation of the glass substrate, it should preferably be lower than the glass transition temperature; normally it is within a range 350° C.–700° C., more preferably 350° C.–450° C.

Although the description in the embodiments 1 through 7 is based on an example of hard disc drive which records/reproduces information in an information recording layer of disc portion using a magnetic head, application of the present invention is not limited to such already existing devices. It can be applied to any type of information recording media of disc shape, and disc devices incorporating the recording medium, such as those of magneto-optical recording system, a recording system making use of a variation in the phase, in so far as they use their own respective non-exchangeable recording medium.

As describe in the foregoing, in a rotor assembly or a disc device of the present invention, the rotor assembly is integrally formed of a disc portion and a rotating column, or a rotating cylindrical portion, or provided by unitizing these into a single component. Therefore, accuracy of the right angle in the main surface of disc portion having information recording layer relative to the rotating axis has been realized at a significantly high precision level, as compared with conventional disc devices where a disc medium is coupled on a flange of turntable of a disc driving motor. As a result, the deviation in the rotating surface due to an error in the formation of the right angle can be significantly deduced, and the out-of-surface vibration can be suppressed. These factors altogether contribute to an increased recording density. Also, since the deviation in the radius direction can be suppressed to be small, the deviation of the rotating center of servo signal already recorded for the purpose of precise tracking of a plurality of recording tracks provided concentric on an information recording layer of disc portion from the rotating center of the operating disc portion can be made smaller. This also contributes to increase the recording density. Furthermore, since a clamping device for clamping a disc on the flange of a turntable of disc driving motor can be eliminated, even the turntable itself can be eliminated, the number of parts count can be significantly reduced, and a disc drive can be designed to be thinner and inexpensive.

A rotor assembly in the present invention is formed so that it is provided with a flat surface on one surface while it is provided on the other surface with a slope where the disc thickness in an inner region at a certain distance from the center is gradually decreasing towards the outer circumferential edge, and a rotating axle is connected to the surface at the center of the surface having the slope.

In a disc device incorporating a rotor assembly of the above configuration, amount of disc deformation remains small, and the tensile stress and the compressive stress can also be suppressed to be small even when the disc device is hit by a substantial physical shock e.g. when a device is dropped on the ground. So, it does not get broken easily, and the overall contour can be made designed slimmer and lighter in weight. Thus the integral rotor assembly formed as a single component, or by unitizing a disc portion and an axle by gluing, enables to design a disc device in a still thinner shape. An expanding field of application in the portable apparatus will be provided for the disc devices reduced in the size and the weight.

In a device having an outer casing for housing a disc portion, a highly reliable rotor assembly can be implemented in accordance with the present invention by providing the disc portion at the center of the main surface opposing to the wall of the casing with a protrusion, and with a ramp portion of truncated cone shape at the innermost part of the information recording region, or a slope ramp portion at the outer circumference; in which a possible collision of a head with the information recording layer caused by vibration, etc. and a resultant damage on the information recording layer as well as a destruction of data can be prevented. The reliable rotor assembly makes it possible to implement a reliable disc device.

An integrated structure, or unitized structure, of disc portion and rotating column portion, or rotating cylindrical portion, contributes to decrease the deviation in the rotating surface. This at the same time leads to an increased recording density, a significantly reduced parts count, a slim design and a lower cost of a rotor assembly. The disc devices incorporating the rotor assembly thus implemented offer the same advantages.

Still further, the present invention offers a method of assembling a rotor assembly, with which method the overlaying of magnetic noise caused by magnetic fields escaping during assembly from a magnet of the driving motor or other constituent magnetic components ill-affecting the information-recording/-reproducing layer can be suppressed either.

What is claimed is:

1. A rotor assembly for use in an information-recording/-reproducing device, which device rotating a disc portion having an information recording layer on the main surface for recording/reproducing information stored in said information recording layer by means of a head disposed to face said information recording layer and driven by head actuator for scanning said information recording layer, wherein said disc portion is provided with a rotating axle portion, said disc portion being integrated at a surface opposite to said main surface with said rotating axle so that the rotating axis crosses at right angle with said main surface at the center of rotation, wherein thickness of said disc portion at a circle of certain specific distance from the center decreases towards the outer circumference edge.

2. The rotor assembly of claim 1, wherein said thickness in a stepping arrangement towards the outer circumference edge.

3. The rotor assembly of claim 1, wherein said thickness decreases continuously towards the outer circumference edge.

4. A rotor assembly for use in an information-recording/-reproducing device, which device rotating a disc portion having an information recording layer on the main surface for recording/reproducing information stored in said information recording layer by means of a head disposed to face said information recording layer and driven by head actuator for scanning said information recording layer, wherein said disc portion is provided with a rotating axle portion, said disc portion being integrated at a surface opposite to said main surface with said rotating axle so that the rotating axis crosses at right angle with said main surface at the center of rotation, said disc portion is provided at the center of said main surface with a protrusion.

5. The rotor assembly recited in claim 4, wherein the rotating axle portion is formed in a round column shape or a round cylindrical shape, and the disc portion and said rotating axle are connected together using a junction material of different composition than said disc portion and said rotating axle portion.

6. The rotor assembly recited in claim 4, wherein the rotating axle portion is formed in a round column shape or a round cylindrical shape, and the disc portion and said rotating axle are connected together by insert formation, the disc portion extends into an indentation in said axle.

7. A rotor assembly recited in claim 5, wherein a recording layer on said disk portion, said disk portion including material extending from below a recorded portion of said recording layer to a protrusion extending above said recording layer:

1) at a center of said recording layer; and 2) through an opening in said recording layer.

8. A rotor assembly for use in an information-recording/-reproducing device, which device rotating a disc portion having an information recording layer on the main surface for recording/reproducing information stored in said information recording layer by means of a head disposed to face said information recording layer and driven by head actuator for scanning said information recording layer, wherein said disc portion is provided with a rotating axle portion, said disc portion being integrated at a surface opposite to said main surface with said rotating axle so that the rotating axis crosses at right angle with said main surface at the center of rotation, said disc portion is provided on the main surface with a ramp portion in axis symmetry, which ramp portion having a disc thickness that is different from that of information recording layer, for providing a head with a place for sheltering from said information recording layer while the head is out of recording/reproducing operation.

9. The rotor assembly of claim 8, wherein the ramp portion is formed on the main surface of said disc portion either at the central part in a truncated cone shape where a disc thickness increases continuously towards the innermost, or at the outer circumference in a slope shape where a disc thickness increases continuously towards the outermost, or at the outer circumference in a slope shape where the disc thickness decreases continuously towards the outermost.

10. A rotor assembly for use in an information-recording/-reproducing device, which device rotating a disc portion having an information recording layer on the main surface for recording/reproducing information stored in said information recording layer by means of a head disposed to face said information recording layer and driven by head actuator for scanning said information recording layer, wherein said disc portion is provided with a rotating axle portion, said disc portion being integrated at a surface opposite to said main surface with said rotating axle so that the rotating axis crosses at right angle with said main surface at the center of rotation, said rotating axle portion is provided at an end to be connected with said disc portion with a step along the outer circumference, a yoke support plate having a round hole at the center is fixed to said rotating axle by engaging said round hole with said step of rotating axle, said rotating axle portion is provided at the other end with a round disc thrust flange fixed thereto, diameter of said thrust flange being greater than that of said rotating axle portion, and said thrust flange is provided with a groove for dynamic pressure generating in either of the surfaces; a surface opposite to the surface having the rotating axle fixed thereto, or a rink form area of the surface having rotating axle extruding out of said rotating axle.

11. A rotor assembly for use in an information-recording/-reproducing device, which device rotating a disc portion having an information recording aver on the main surface for recording/reproducing information stored in said information recording layer by means of a head disposed to face said information recording layer and driven by head actuator for scanning said information recording layer, wherein said disc portion is provided with a rotating axle portion, said disc portion being integrated at a surface opposite to said main surface with said rotating axle so that the rotating axis crosses at right angle with said main surface at the center of rotation, said rotating axle portion is provided at an end to be connected with said disc portion with a step along the outer circumference, a yoke support plate having a first round hole at the center is fixed to said rotating axle by engaging said first round hole with said step of rotating axle, said rotating axle portion is provided at the other end with a second round hole having a diameter smaller than that of said rotating axle, a round magnet plate is inlayed and fixed in said second hole, and a groove for dynamic pressure generating is provided in a rink shape on the end face in an area formed between the end of said second hole and the outer circumferential edge of said rotating axle.

12. A rotor assembly for use in an information-recording/-reproducing device, which device rotating a disc portion having an information recording layer on the main surface for recording/reproducing information stored in said information recording layer by means of a head disposed to face said information recording layer and driven by head actuator for scanning said information recording layer, wherein said disc portion is provided with a rotating axle portion, said disc portion being integrated at a surface opposite to said main surface with said rotating axle so that the rotating axis crosses at right angle with said main surface at the center of rotation, wherein the disc portion is provided at the central part of the main surface with a hollow in an area corresponding to the rotating axle disposed underneath on the opposite surface.

13. The rotor assembly recited in claim 12, wherein the rotating axle portion is formed in a round column shape or a round cylindrical shape, and the disc portion and said rotating axle are connected together using a junction material of different composition than said disc portion and said rotating axle portion.

14. The rotor assembly recited in claim 12, wherein the rotating axle portion is formed in a round column shape or a round cylindrical shape, and the disc portion and said rotating axle are connected together by insert formation, the disc portion extends into an indentation in said axle.

15. An information-recording/-reproducing device comprising an integrated rotor assembly formed of a disc portion having information recording aver provided on the main surface and a rotating axle portion, said rotating axle portion being connected with said disc portion in a surface opposite to said main surface so that the rotating axis crosses at right angle with said main surface at the center or rotation, a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, wherein the rotor assembly is formed so that thickness of said disc portion at the outer circumference edge is thinner than that at a circle of a certain specific distance from the center, the disc thickness at said circle of a certain specific distance from the center decreasing towards the outer edge either in a stepping arrangement or continuously.

16. The information-recording/-reproducing device of claim 15, wherein the bearing portion is consisting of a radial bearing portion the inner circumferential surface of which portion facing to the outer circumferential surface of a round column-shape rotating axle, and a thrust bearing portion comprising a thrust support plate opposing to an end face, or the thrust surface, of said round column-shape rotating axle, said radial bearing portion and said thrust bearing portion are provided respectively with a dynamic pressure generating means, and said dynamic pressure generating means is formed of a protruding line whose cross sectional shape is either a triangle or a trapezoid.

17. The information-recording/-reproducing device of claim 15, wherein the bearing portion is consisting of a radial bearing portion the outer circumferential surface of which portion facing to the inner circumferential surface of a round cylindrical-shape rotating axle, and a thrust bearing portion opposing to an end face, or the thrust surface, of said round column-shape rotating axle, said radial bearing portion and said thrust bearing portion are provided respectively with a dynamic pressure generating means, and said dynamic pressure generating means is formed of a protruding line whose cross sectional shape is either a triangle or a trapezoid.

18. An information-recording/-reproducing device comprising an integrated rotor assembly formed of a disc portion having information recording layer provided on the main surface and a rotating axle portion, said rotating axle portion being connected with said disc portion in a surface opposite to said main surface so that the rotating axis crosses at right angle with said main surface at the center of rotation, a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, wherein the rotor assembly is provided with a protrusion disposed at the central part on the main surface of said disc portion.

19. The information-recording/-reproducing device of claim 18, wherein the bearing portion is consisting of a radial bearing portion the inner circumferential surface of which portion facing to the outer circumferential surface of a round column-shape rotating axle, and a thrust bearing portion comprising a thrust support plate opposing to an end face, or the thrust surface, of said round column-shape rotating axle, said radial bearing portion and said thrust bearing portion are provided respectively with a dynamic pressure generating means, and said dynamic pressure generating means is formed of a protruding line whose cross sectional shape is either a triangle or a trapezoid.

20. The information-recording/-reproducing device of claim 18, wherein the bearing portion is consisting of a radial bearing portion the outer circumferential surface of which portion facing to the inner circumferential surface of a round cylindrical-shape rotating axle, and a thrust bearing portion opposing to an end face, or the thrust surface, of said round column-shape rotating axle, said radial bearing portion and said thrust bearing portion are provided respectively with a dynamic pressure generating portion, and said dynamic pressure generating portion is formed of a protruding line whose cross sectional shape is either a triangle or a trapezoid.

21. An information-recording/-reproducing device comprising an integrated rotor assembly formed of a disc portion having information recording aver provided on the main surface and a rotating axle portion, said rotating axle portion being connected with said disc portion in a surface opposite to said main surface so that the rotating axis crosses at right angle with said main surface at the center of rotation, a bearing portion for supporting said axle portion of said disc portion rotatable, a rotating magnet fixed to a rotor yoke and a stator disposed facing to said rotating magnet, a motor for rotating said disc portion with said rotating axis of said rotating axle as the center of rotation; and a head disposed facing to the information recording layer and a head actuator for making said head to scan said information recording layer, wherein said disc portion is provided on the main surface with a ramp portion in axis symmetry arrangement which ramp portion having a disc thickness that is different from that of the information recording layer, and said head scans said information recording layer for the recording/reproducing operation, while said head is in a state of out of the operation for a certain specific moment said head takes shelter on said ramp portion.

22. The information-recording/-reproducing device of claim 21, comprising a disc portion having a ramp portion where a disc thickness is thicker than that of information recording layer, wherein the head actuator is provided with a protrusion which rides on said ramp portion when the head takes shelter, so that the pressing force of head on said information recording layer is alleviated, or said head is separated from said information recording layer.

23. The information-recording/-reproducing device of claim 21, wherein the ramp portion is formed on the main surface of disc portion either at the central part in a truncated cone shape where the disc thickness increases continuously towards the innermost, or at the outer circumference in a slope shape where the disc thickness increases continuously towards the outermost, or at the outer circumference in a slope shape where the disc thickness decreases continuously towards the outermost.

24. The information-recording/-reproducing device of claim 22, wherein the ramp portion is formed on the main surface of disc portion either at the central part in a truncated cone shape where the disc thickness increases continuously towards the innermost, or at the outer circumference in a slope shape where the disc thickness increases continuously towards the outermost.

25. The information-recording/-reproducing device recited in claim 18 further provided with an outer case for housing the device, wherein a gap is provided between a protrusion, or a ramp portion, disposed on the main surface of disc portion and the opposing inner wall of said outer case, the gap being 0.2 mm or less.

26. The information-recording/-reproducing device of claim 21, wherein the bearing portion is consisting of a radial bearing portion the inner circumferential surface of which portion facing to the outer circumferential surface of a round column-shape rotating axle, and a thrust bearing portion comprising a thrust support plate opposing to an end face, or the thrust surface, of said round column-shape rotating axle, said radial bearing portion and said thrust bearing portion are provided respectively with a dynamic pressure generating portion, and said dynamic pressure generating portion is formed of a protruding line whose cross sectional shape is either a triangle or a trapezoid.

27. The information-recording/-reproducing device of claim 21, wherein the bearing portion is consisting of a radial bearing portion the outer circumferential surface of which portion facing to the inner circumferential surface of a round cylindrical-shape rotating axle, and a thrust bearing portion opposing to an end face, or the thrust surface, of said round column-shape rotating axle, said radial bearing portion and said thrust bearing portion are provided respectively with a dynamic pressure generating portion, and said dynamic pressure generating portion is formed of a protruding line whose cross sectional shape is either a triangle or a trapezoid.

28. The information-recording/-reproducing device of claim 22, wherein the bearing portion is consisting of a radial bearing portion the inner circumferential surface of which portion facing to the outer circumferential surface of a round column-shape rotating axle, and a thrust bearing portion comprising a thrust support plate opposing to an end face, or the thrust surface, of said round column-shape rotating axle, said radial bearing portion and said thrust bearing portion are provided respectively with a dynamic pressure generating means, and said dynamic pressure generating portion is formed of a protruding line whose cross sectional, shape is either a triangle or a trapezoid.

29. The information-recording/-reproducing device of claim 22, wherein the bearing portion is consisting of a radial bearing portion the outer circumferential surface of which portion facing to the inner circumferential surface of a round cylindrical-shape rotating axle, and a thrust bearing portion opposing to an end face, or the thrust surface, of said round column-shape rotating axle, said radial bearing portion and said thrust bearing portion are provided respectively with a dynamic pressure generating portion, and said dynamic pressure generating portion is formed of a protruding line whose cross sectional shape is either a triangle or a trapezoid.

30. The information-recording/-reproducing device of claim 23, wherein the bearing portion is consisting of a radial bearing portion the inner circumferential surface of which portion facing to the outer circumferential surface of a round column-shape rotating axle, and a thrust bearing portion comprising a thrust support plate opposing to an end face, or the thrust surface, of said round column-shape rotating axle, said radial bearing portion and said thrust bearing portion are provided respectively with a dynamic pressure generating portion, and said dynamic pressure generating portion is formed of a protruding line whose cross sectional shape is either a triangle or a trapezoid.

31. The information-recording/-reproducing device of claim 23, wherein the bearing portion is consisting of a radial bearing portion the outer circumferential surface of which portion facing to the inner circumferential surface of a round cylindrical-shape rotating axle, and a thrust bearing portion opposing to an end face, or the thrust surface, of said round column-shape rotating axle, said radial bearing portion and said thrust bearing portion are provided respectively with a dynamic pressure generating portion, and said dynamic pressure generating means is formed of a protruding line whose cross sectional shape is either a triangle or a trapezoid.

32. An information-recording/-reproducing device comprising an integrated rotor assembly formed of a disc portion having information recording layer provided on the main surface and a rotating axle portion, said rotating axle portion being connected with said disc portion in a surface opposite to said main surface so that the rotating axis crosses at right angle with said main surface at the center of rotation.

a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, wherein the rotor assembly is formed in a configuration, where said rotating axle portion is provided at an end to be connected with said disc portion with a step along the outer circumference, a yoke support plate having a round hole at the center is fixed to said rotating axle by engaging said round hole with said step of rotating axle, said rotating axle portion is provided at the other end with a round disc thrust flange fixed thereto, diameter of said thrust flange being greater than that of said rotating axle portion, and a groove for dynamic pressure generating is provided in either one of the surfaces of said thrust flange, a surface opposite to the surface having said rotating axle portion fixed thereto, or a rink form area of the surface having rotating axle extruding out of said rotating axle portion; or a surface of thrust plate of said bearing portion facing to said thrust flange; or a surface of bearing sleeve of said bearing portion facing to a part of said thrust flange extruding form said rotating axle portion.

33. An information-recording/-reproducing device comprising an integrated rotor assembly formed of a disc portion having information recording layer provided on the main surface and a rotating axle portion, said rotating axle portion being connected with said disc portion in a surface opposite to said main surface so that the rotating axis crosses at right angle with said main surface at the center of rotation, a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, wherein the rotor assembly is formed in a configuration, where said rotating axle portion is provided at an end to be connected with said disc portion with a step along the outer circumference, a yoke support plate having a first round hole at the center is fixed to said rotating axle by engaging said first round hole with said step of rotating axle, said rotating axle portion is provided at the other end with a second round hole having a diameter smaller than that of said rotating axle, a round magnet plate is inlayed and fixed in said second hole, and a groove for dynamic pressure generating is provided in a rink shape on the end face in an area formed between the end of said second hole and the outer circumferential edge of said rotating axle, or on the thrust plate of said bearing portion facing to said end face.

34. An information-recording/-reproducing device comprising an integrated rotor assembly formed of a disc portion having information recording layer provided on the main surface and a rotating axle portion, said rotating axle portion being connected with said disc portion in a surface opposite to said main surface so that the rotating axis crosses at right angle with said main surface at the center of rotation, a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, wherein the rotating axle is formed in a round column shape or a round cylindrical shape, and the disc portion and said rotating axle portion are connected together to form a single component using a junction material of different composition than said disc portion and said rotating axle portion.

35. An information-recording/-reproducing device comprising an integrated rotor assembly formed of a disc portion having information recording layer provided on the main surface and a rotating axle portion, said rotating axle portion being connected with said disc portion in a surface opposite to said main surface so that the rotating axis crosses at right angle with said main surface at the center of rotation, a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, wherein the rotating axle is formed in a round column shape or a round cylindrical shape, and the disc portion and said rotating axle portion are connected together to form a single component by insert formations, the disc portion extends into an identification in said axle.

36. An information-recording/-reproducing device comprising an integrated rotor assembly formed of a disc portion having information recording layer provided on the main surface and a rotating axle portion, said rotating axle portion being connected with said disc portion in a surface opposite to said main surface so that the rotating axis crosses at right angle with said main surface at the center of rotation, a bearing portion for supporting said axle portion of said disc portion rotatable, a rotating magnet fixed to a rotor yoke and a stator disposed facing to said rotating magnet, and a motor for rotating said disc portion with said rotating axis of said rotating axle as the center of rotation, further comprising an outer case for housing the device, wherein an anti-withdrawal member is provided between a lid of the outer case and main surface of the disc portion at a center of said disc portion.

* * * * *